US012559227B1

(12) United States Patent
Moore et al.

(10) Patent No.: US 12,559,227 B1
(45) Date of Patent: Feb. 24, 2026

(54) UNIFORM EXHAUST SHEET AND FLOW TURNING CONTROL

(71) Applicant: Whisper Aero Inc., Crossville, TN (US)

(72) Inventors: Mark Douglass Moore, Crossville, TN (US); Ian Andreas Villa, Nashville, TN (US); Devon Jedamski, Nashville, TN (US); Andrew Stephen Hahn, Yorktown, VA (US); Aaron Timothy Perry, Franklin, TN (US); Jonathan Jeffrey Paravano, Brentwood, TN (US); Xiaofan Fei, Bellevue, WA (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/967,410

(22) Filed: Dec. 3, 2024

Related U.S. Application Data

(63) Continuation of application No. 29/965,640, filed on Sep. 27, 2024, and a continuation of application No.
(Continued)

(51) Int. Cl.
B64C 15/02 (2006.01)
B64D 27/18 (2006.01)

(52) U.S. Cl.
CPC .............. B64C 15/02 (2013.01); B64D 27/18 (2013.01)

(58) Field of Classification Search
CPC ....... B64C 15/02; B64C 29/0066; B64C 9/38; B64D 27/18
See application file for complete search history.

(56) References Cited

U.S. PATENT DOCUMENTS 2,910,254 A * 10/1959 Razak ..................... B64C 23/00
244/45 R
3,330,500 A * 7/1967 Winborn ............. B64C 29/0066
D12/333
(Continued)

FOREIGN PATENT DOCUMENTS

CN 104943851 A 9/2015
CN 206344647 U 7/2017
(Continued)

OTHER PUBLICATIONS

Glahn, V. and Uwe, H. "Use of the Coanda Effect for Jet Deflection and Vertical Lift with Multiple-flat-plate and Curved-plate Deflection Surfaces" NACA TN 4377, Sep. 1, 1958.
(Continued)

*Primary Examiner* — William L Gmoser
(74) *Attorney, Agent, or Firm* — Banner & Witcoff, Ltd.

(57) ABSTRACT

An aircraft may comprise propulsors. The propulsors may be integrated into an array of propulsors. An array of propulsors may be integrated in an airfoil of the aircraft. The aircraft may include a flow turning control system. The flow turning control system may include an end wall and one or more movable flaps. The flow turning control system may enable selective flow turning of the flow of propelled by the array of propulsors. The selective flow turning may include actuating the one or more movable flaps. The selective flow turning may achieve flow turning of over a trailing edge of a movable flap.

20 Claims, 35 Drawing Sheets

Related U.S. Application Data

29/965,665, filed on Sep. 27, 2024, and a continuation of application No. 29/945,234, filed on May 31, 2024.

(60) Provisional application No. 63/685,236, filed on Aug. 20, 2024.

(56) References Cited

U.S. PATENT DOCUMENTS

| | | | |
|---|---|---|---|
| 3,658,279 A * | 4/1972 | Robertson ........... | B64C 29/0066 244/207 |
| 4,205,813 A * | 6/1980 | Evans ..................... | F02K 3/025 239/265.29 |
| 4,301,980 A | 11/1981 | Bradfield et al. | |
| 4,426,054 A * | 1/1984 | Wang ........................ | B64C 3/38 244/215 |
| 4,505,443 A * | 3/1985 | Bradfield ........... | B64C 29/0066 60/230 |
| 4,709,880 A * | 12/1987 | Bradfield ........... | B64C 29/0066 244/12.5 |
| 5,992,792 A * | 11/1999 | Arnason ................. | B64C 39/12 244/215 |
| 6,381,950 B1 * | 5/2002 | Whaites ................. | B64D 33/04 239/265.17 |
| 7,823,838 B1 * | 11/2010 | De ning .................. | B64C 15/02 244/55 |
| 8,087,618 B1 * | 1/2012 | Shmilovich .............. | B64C 9/38 244/215 |
| 10,926,874 B2 * | 2/2021 | Giannini ................ | B64U 20/65 |
| 11,548,621 B1 * | 1/2023 | Robinson ................ | B64C 21/08 |
| 11,597,509 B1 | 3/2023 | Alfaro | |
| 11,802,485 B2 | 10/2023 | Moore et al. | |
| 12,420,936 B2 | 9/2025 | Gusman et al. | |
| 2009/0090817 A1 * | 4/2009 | Monka .................... | B64C 15/02 244/76 R |
| 2013/0062455 A1 | 3/2013 | Lugg et al. | |
| 2015/0226155 A1 | 8/2015 | Klingels et al. | |
| 2017/0203839 A1 | 7/2017 | Giannini et al. | |
| 2019/0195169 A1 | 6/2019 | Montes et al. | |
| 2019/0217937 A1 | 7/2019 | Wiegand | |
| 2020/0331589 A1 * | 10/2020 | Cummings ............ | B64D 27/32 |
| 2022/0266979 A1 | 8/2022 | Bansal et al. | |
| 2022/0281594 A1 | 9/2022 | Ochoa De Eribe Martínez et al. | |
| 2023/0075112 A1 * | 3/2023 | Zha ............................ | B64C 9/38 |
| 2023/0086655 A1 | 3/2023 | Wang | |
| 2024/0002034 A1 | 1/2024 | Moore et al. | |
| 2024/0375780 A1 * | 11/2024 | Gusman .................... | B64C 3/32 |

FOREIGN PATENT DOCUMENTS

| | | |
|---|---|---|
| CN | 113291459 A | 8/2021 |
| WO | 2024010834 A1 | 1/2024 |

OTHER PUBLICATIONS

"Powered-Lift Aerodynamics and Acoustics" NASA SP-406, Langley Research Center Conference May 24-26, 1976.

Agard, "The Aerodynamics of V/STOL Aircraft" NATO, May 1968.

Langley Research Center, "NASA Conference On V/Stol Aircraft—A Compilation of the Papers Presented" NASA, Nov. 1960.

Phelps, A.E. and Johnson, J. L. and Margason, R. J., "Summary of Low-Speed Aerodynamic Characteristics of Upper-Surface-Blown Jet-Flap Configurations" N78-24050.

"Ball-Bartoe Jetwing." Wikipedia. Retrieved from [https://en.wikipedia.org/wiki/Ball-Bartoe_Jetwing] on Oct. 23, 2024.

"AMPERE: The distributed electric propulsion challenge." Onera. Apr. 2017.

"ONERA's AMPERE Flies on Distributed Electric Thrust." Dean Sigler. Sustainable Skies. Jun. 30, 2017.

Sep. 9, 2025—(WO) International Search Report and Written Opinion—App PCTUS2025031447.

"This Over-Wing Engine Setup Helped Boeing's YC-14 Master Short Runways" [https://www.jalopnik.com/1964717/boeing-yc-14-over-wing-engine-design/] Last accessed Sep. 22, 2022.

"Pioneering concepts for Personal Air Transport Systems." Onera. Retrieved from [http://www.nianet.org/ODM/ODM%20Wednesday%20presentations%20Final/13%20LeTallec%20ONERA.pdf] on Oct. 23, 2024.

Lilium Jet air taxis close to take off | CNN, https://www.cnn.com/travel/article/lilium-electric-vtol-jet/index.html, retrieved May 29, 2025, 8 pages.

Lilium Jet—Wikipedia, https://en.wikipedia.org/wiki/Lilium_Jet, retrieved May 29, 2025, 4 pages.

Five seater self-flying air taxi unveiled, https://www.bbc.com/news/business-48297440, retrieved May 29, 2025, 4 pages.

ECO-150 | ESAero—Empirical Systems Aerospace, https://www.esaero.com/core-technology-innovations/eco-150, retrieved May 29, 2025, 3 pages.

Blown flap—Wikipedia, https://en.wikipedia.org/wiki/Blown_flap, retrieved May 29, 2025, 6 pages.

Aug. 14, 2025—(WO) International Search Report and Written Opinion—App PCT/US2025/031744.

* cited by examiner

UNIFORM EXHAUST SHEET AND FLOW TURNING CONTROL

CROSS-REFERENCE TO RELATED APPLICATIONS

This application claims the benefit of U.S. Provisional Patent Application No. 63/685,236, filed on Aug. 20, 2024 and titled "UNIFORM EXHAUST SHEET AND FLOW TURNING CONTROL," and which is incorporated herein by reference in its entirety for any and all non-limiting purposes. This application also claims the benefit of U.S. Design application Ser. No. 29/945,234, filed on May 31, 2024, titled, "AIRCRAFT," U.S. Design application Ser. No. 29/965,665, filed on Sep. 27, 2024, titled, "AIR-CRAFT," and U.S. Design application Ser. No. 29/965,640, filed on Sep. 27, 2024 titled, "AIRCRAFT."

BACKGROUND

Technical Field

The present disclosure generally relates to aircraft that include one or more efficient propulsion technologies that may utilize clean energy sources (e.g., electric ducted fans utilizing electricity). The disclosure more particularly relates to selective flow turning control of the aircraft. The disclosure relates to on board measures aiming to increase energy efficiency by improving flow turning efficiency.

Description of the Related Art

Conventional takeoff and landing jets may utilize propulsion systems including propulsors. The propulsors may utilize a static or movable flap configured to turn the flow of air downstream of the propulsor. These types of conventional propulsion systems have reached the limits of what can be achieved in terms of efficient flow turning. For example, conventional propulsion systems are unable to reliably turn the flow of the jet more than 90 degrees over a trailing edge of the static or movable flap. Attempts to achieve flow turning over 90 degrees using conventional propulsion systems have resulted in a ratio of actual thrust produced over ideal thrust (i.e., the gross thrust coefficient) that is insufficient for takeoff and landing. Additionally, in order to produce thrust efficiently in hover and forward flight modes, some conventional propulsion systems must mechanically change the pitch of an open rotor or propeller. Conventional systems for achieving the mechanical change of the pitch are complex and may result in an increase in noise pollution.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome the challenges described above, and to overcome other challenges that will be apparent upon reading and understanding the present specification, aspects described herein are directed towards systems and methods for producing a uniform exhaust sheet and/or for selective flow turning control. Aspects relate to novel propulsors, propulsion systems, and vehicles (also referred to herein as "aircraft") configured for airborne travel. In some embodiments, an aircraft may comprise the ability to transition between modes of flight (e.g., a forward flight mode, a hover mode, a vertical takeoff and landing (VTOL) mode, reverse thrust mode, and/or other modes). Aircraft disclosed herein may comprise one or more propulsion systems. Propulsion systems may include, but are not limited to, arrays of propulsors. For example, propulsion systems may comprise arrays of ducted fans integrated into an airfoil (such as for example, a wing, tail, or other component of an aircraft). Such integrations or systems may, in some examples, be referred to herein as a jetfoil. In some embodiments, the propulsion systems may comprise arrays of different propulsors powered by different sources.

Aspects disclosed herein also relate to one or more movable trailing edges (e.g., flaps) of an aircraft that can be moved to both control dimensions (e.g., height) of an exhaust area to produce a uniform exhaust sheet of air flow generated by the propulsors or propulsion systems and control flow turning over the trailing edge. In some embodiments, propulsion systems may comprise an array of propulsors utilizing end walls to prevent non-uniform air flow, producing the uniform exhaust sheet. In some embodiments, the use of an array of propulsors with or without end walls may be combined with optimization of flap radius-to-exhaust height ratio, optimization of trailing edge length-to-exhaust height ratio, and/or optimization of a ratio of end wall height to exhaust height to achieve a desired degree of flow turning. In some embodiments, the exhaust height may be a reference exhaust height, selected during design of the propulsion system, that remains constant during articulation of the one or more movable trailing edges a first position and a second position. Additionally or alternatively, the exhaust height may be an instantaneous exhaust height that is modified by articulation of the one or more movable trailing edges a first position and a second position.

Aspects relate to a novel jetfoil system, in which the intakes of the propulsors are positioned such that the intakes are integrated into the leading edge of an airfoil (such as a wing) and the propulsors' exhausts provide exhaust over an upper surface of the airfoil.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

FIGS. 1A, 1B, 1C, 1D, 1E, 1F, and 1G illustrate different views of an aircraft 100 with ducted wings. As used herein, the general term aircraft is used to include both manned and unmanned crafts or vehicles. Some vehicles may be fully controllable by one or more individuals within the vehicle, such as a traditional pilot and/or driver. Others may have at least one aspect controlled or be maneuverable by at least one instruction or operation originating from outside of the vehicle. An instruction may be transmitted via one or more networks, from one or more remote operators. Certain vehicles or craft recited herein may be at least partially controllable or operable via inputs derived from human controllers, non-human inputs, and combinations thereof. In this regard, aircraft 100 and/or any craft herein may be outfitted with one or more sensors (either physically located on or in the craft, or remote with respect to the craft) that may be used by one or more human or non-human operators to control, maneuver, and/or alter one aspect of the craft's operation. This skilled in the art will appreciate that an auto-pilot or other feature may be selectively activated.

For example, an aircraft 100 may be an aircraft as described in U.S. patent application Ser. No. 18/208,181, filed on Jun. 9, 2023 and titled "DUCTED WING WITH FLAPS," which claims the benefit of U.S. Provisional Patent Application No. 63/356,891, filed on Jun. 29, 2022 and titled "CTOL JET," each of which is hereby incorporated by reference in its entirety. The aircraft 100 may be a passenger aircraft or a drone aircraft. Depending on the orientation of one or more flaps of the ducted wings, the aircraft 100 may operate in one of a plurality of different takeoff and landing modes such a conventional takeoff and landing (CTOL), a vertical takeoff and landing (VTOL) mode, and a short takeoff and landing (STOL) mode as described herein.

Figure 1A:
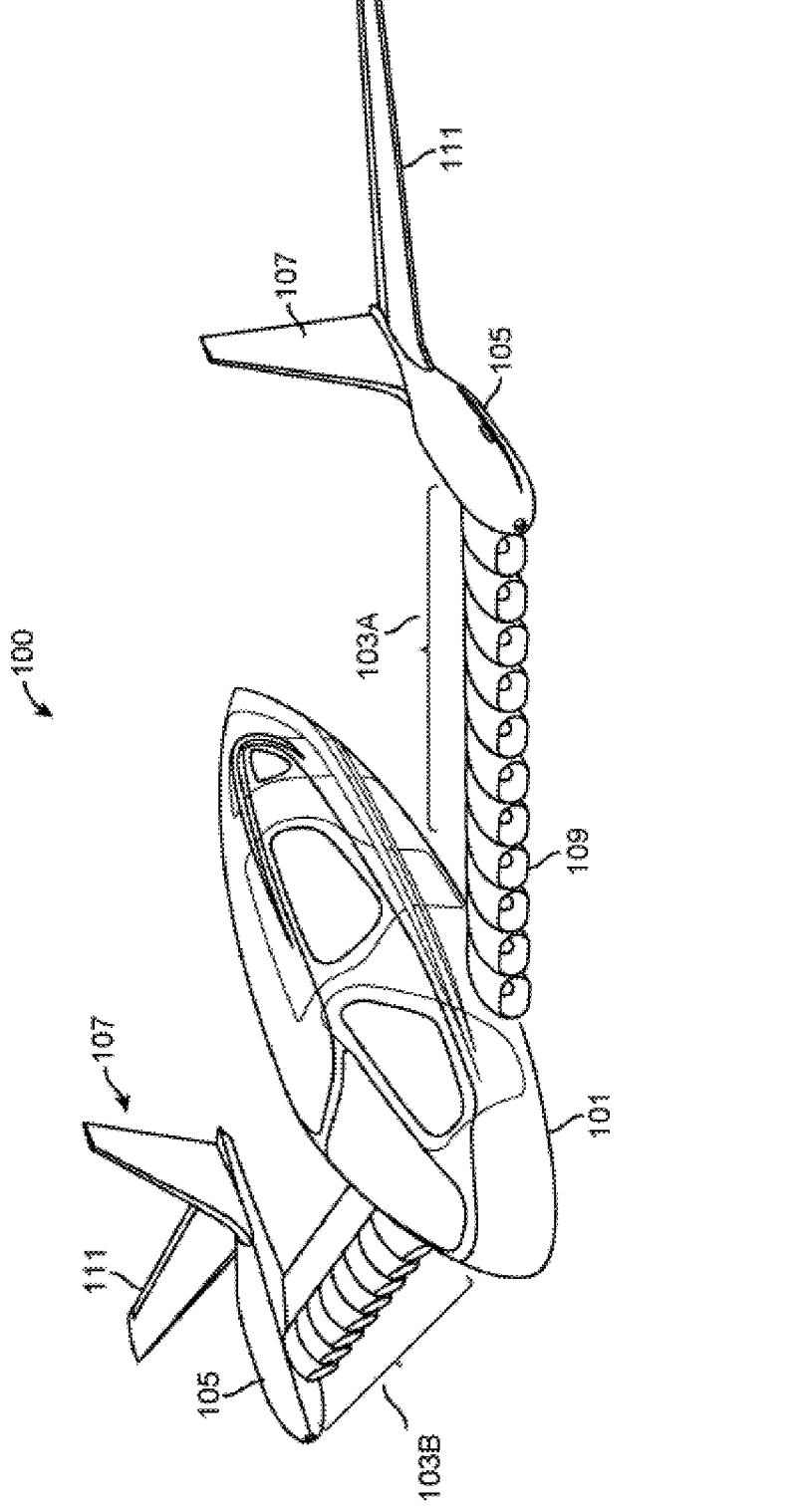
FIG. 1A illustrates a top-front-right perspective view of an example aircraft with a ducted wing according to one or more example arrangements.
Figures 1B, 1C, 1D:
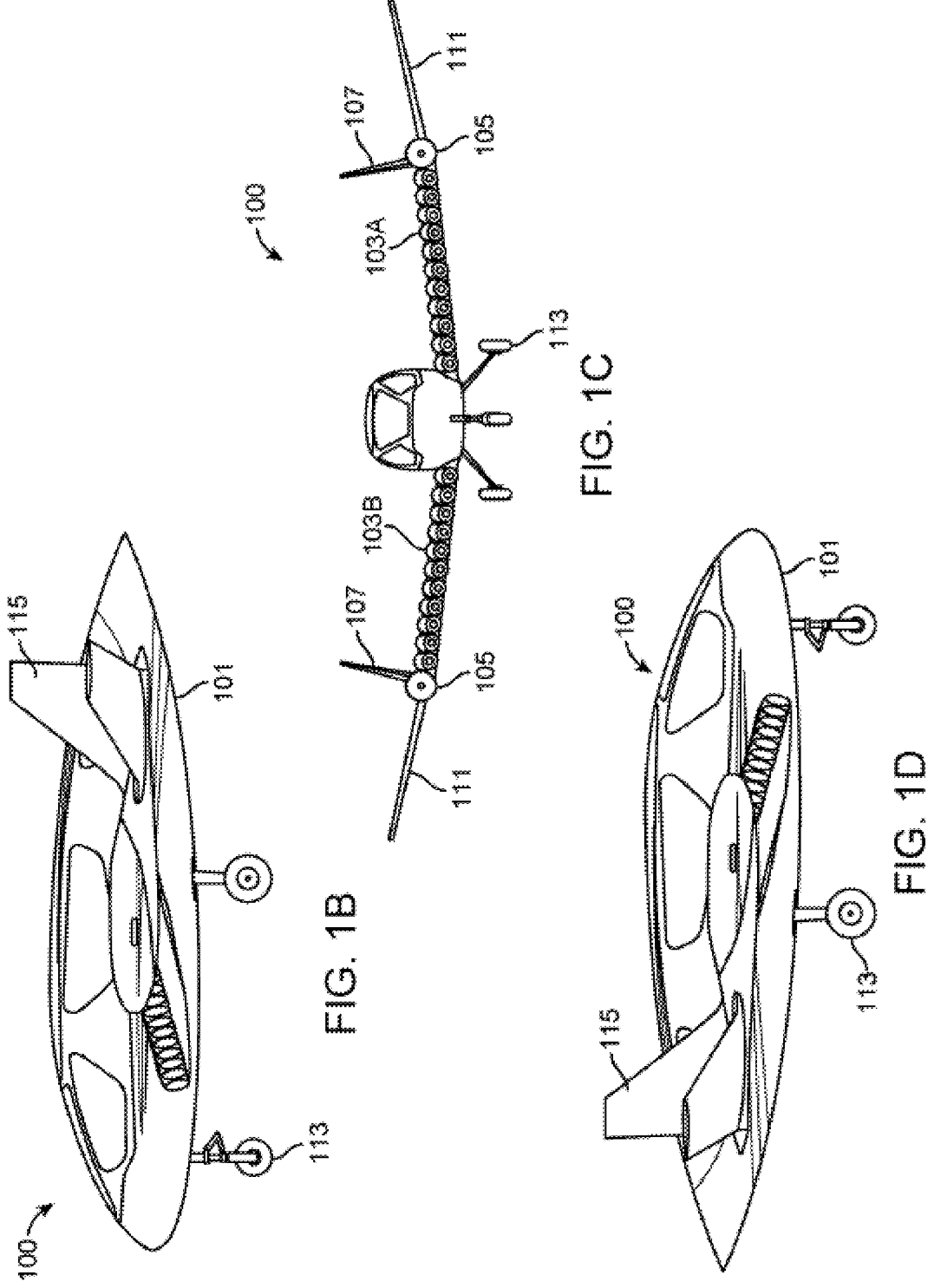
FIGS. 1B, 1C, 1D, 1E, 1F, and 1G respectively illustrate a right-side view of an example aircraft with a ducted wing, a front view of an example aircraft with a ducted wing, a left-side view of an example aircraft with a ducted wing, a rear view of an example aircraft with a ducted wing, a bottom view of an example aircraft with a ducted wing, and a top view of an example aircraft with a ducted wing each according to one or more example arrangements.
Figures 1E, 1F, 1G:
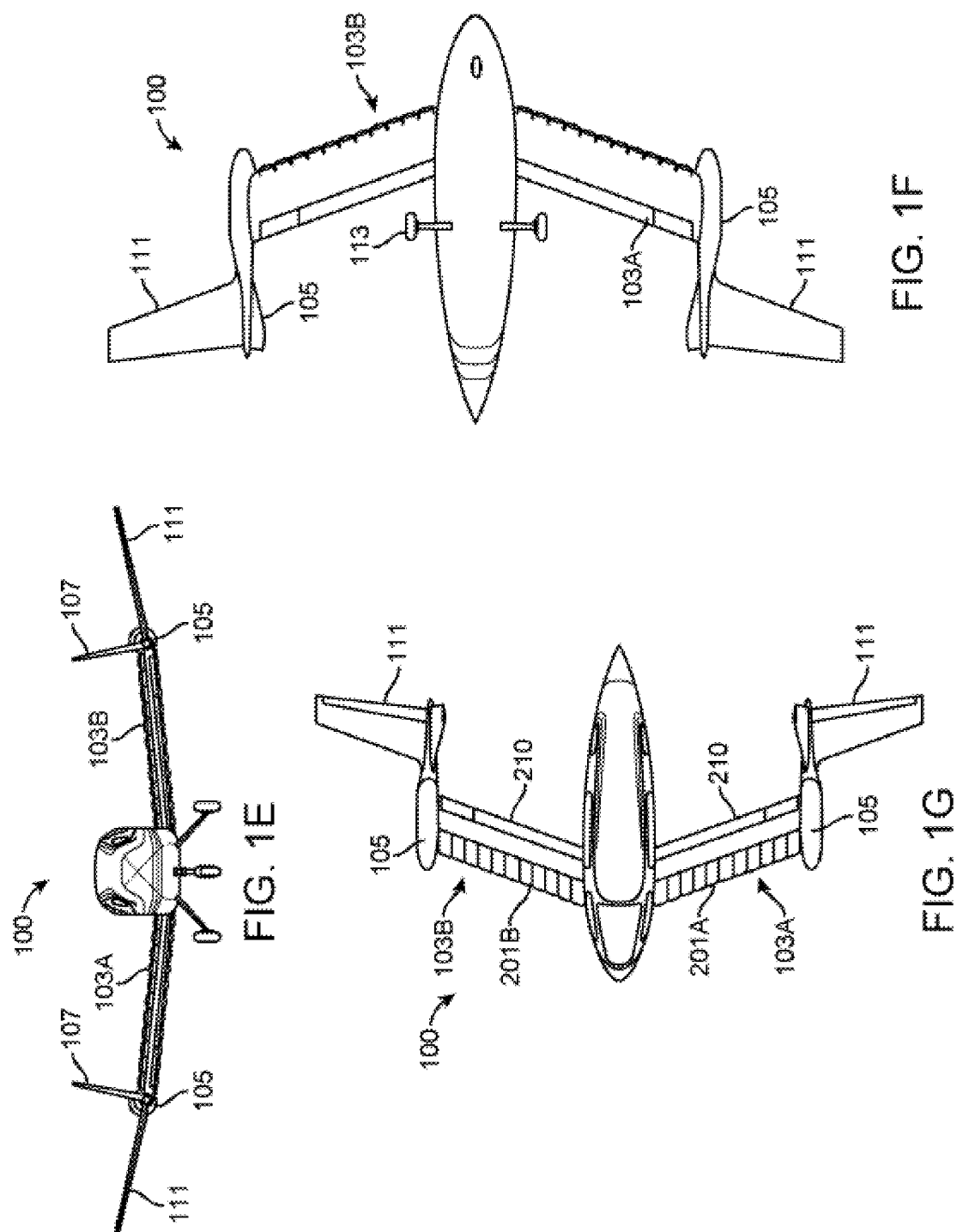

Specifically, FIG. 1A illustrates a top-front-right perspective view of the aircraft 100, FIG. 1B illustrates a right-side view of the aircraft 100 with the ducted wing, FIG. 1C illustrates a front view of the aircraft 100 with the ducted wing, FIG. 1D illustrates a left-side view of the aircraft 100 with the ducted wing, FIG. 1E illustrates a rear view of the aircraft 100 with the ducted wing, FIG. 1F illustrates a bottom view of the aircraft 100 with the ducted wing, and FIG. 1G illustrates a top view of the aircraft 100 with the ducted wing. In some examples, the use of flaps included in a ducted wing allows for the aircraft 100 to transition between CTOL, STOL, and VTOL modes depending on the required application.

In some examples, the aircraft 100 may be a regional aircraft capable of carrying passengers and cargo. For example, the aircraft 100 may be configured to carry a plurality of passengers such as 5 to 30 plus passengers depending on the configuration of the aircraft 100. In some examples, the aircraft 100 may be a remotely controlled drone aircraft. The aircraft 100 may be configured to carry a payload (e.g., a package, or the like). In some examples, the aircraft 100 may be all-electric with a first range, such as a visual flight rules (VFR) range (e.g., less than 200 miles and/or other ranges). In some examples, the aircraft 100 may be hybrid-electric (e.g., using a range extender) to achieve a second range (e.g., up to 500 miles according to instrument flight rules (IFR), and/or other ranges). In some examples, the aircraft 100 may be non-electric to achieve distances greater than 500 miles, and/or other ranges.

An all-electric aircraft 100 may include a battery pack. For example, the aircraft 100 may include a battery pack with a 384-kWh capacity, 255 Whr/kg @ pack level that is liquid cooled, propagation resistant, and quad redundant. The battery pack may include battery cells. For example, the battery pack may include battery cells with a Farasis cylindrical production, 305 Watt-hour per kilogram (Whr/kg) at cell level, 2C discharge/recharge, and 2000 cycle life. A hybrid electric aircraft 100 may use a range extender such as a Rolls-Royce 250 kilowatt (kW) turbogenerator.

The aircraft 100 (e.g., an aircraft) may comprise a fuselage 101, a plurality of ducted wings 103, an array of jetfoils 109, a plurality of booms 105, a plurality of horizontal tails 111 (e.g., wings), a plurality of vertical tails 107 (e.g., wings), and one or more landing mechanisms 113. The horizontal tails 111 and vertical tails 107 collectively form empennages of the aircraft 100. Note that in other embodiments, the aircraft 100 may include additional and/or alternative components to those shown in FIGS. 1A to 1E.

The fuselage 101 is a main body of the aircraft 100. The fuselage 101 may be a hollow structure. The fuselage 101 may be one continuous structure or may be a modular structure comprising multiple components that collectively form the fuselage 101. In some examples, the fuselage 101 contains one or more payloads. In some examples, the aircraft 100 is all-electric. In some examples, the aircraft 100 may utilize a hybrid electric system to enable longer endurance, more payload, and/or longer range as described herein.

In some examples, the fuselage 101 may comprise electrical components for control of the aircraft 100. Examples of electrical components for controlling the aircraft 100 include one or more controllers such as one or more processors and memory device(s) which are used to control the array of jetfoils 109. and the electrical components may be used to actuate one or more control surfaces of the aircraft 100 (e.g., control of ailerons, rudder, elevator, tabs, flaps, spoilers, slats, etc.).

Figure 2:
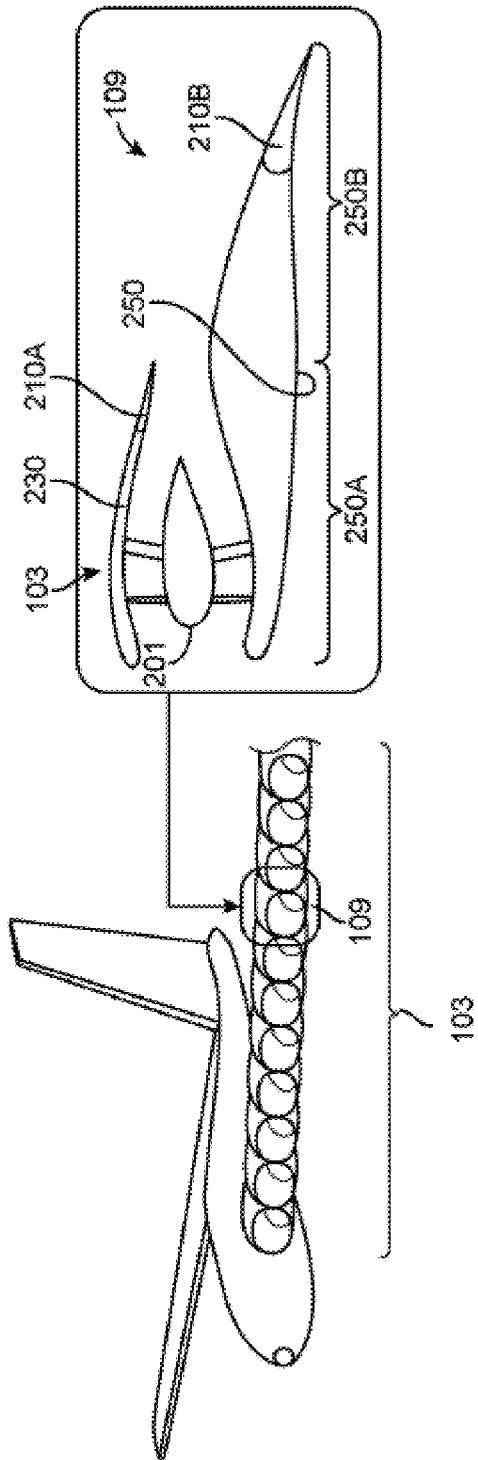
FIG. 2 illustrates a cross-sectional view of an example jetfoil according to one or more example arrangements.

The array of jetfoils 109 that is integrated into the ducted wings 103 may include a plurality of propulsors 201 (e.g., as shown in FIG. 2). In some examples, each jetfoil comprises a portion of the ducted wing 103 and a corresponding propulsor 201 within a duct of the jetfoil 109. Each jetfoil 109 may be configured to connect to at least one other jetfoil 109. For example, a plurality of jetfoils 109 may be connected to collectively form the ducted wings 103. An example propulsor 201 is described at U.S. Provisional Patent application No. 63/356,891 filed on Jun. 29, 2022, which is incorporated by reference in its entirety.

In some examples, the propulsors 201 are integrated into the leading edge of the ducted wings 103 rather than the trailing edge of the ducted wings 103. Integrating the array of propulsors 201 into the leading edge of the ducted wings 103 rather than the trailing edges of the ducted wings may provide a number of advantages. For example, the propulsors 201 integrated into the leading edge of the ducted wings 103 have less boundary layer ingestion compared to propulsors located at the trailing edge of the wing. The ducted wings 103 shield people located on the ground from jet noise generated by the propulsors 201 since the trailing edge of the ducted wing 103 functions as a noise shield. Thus, the aircraft 100 reduces noise pollution due to the ducted wing 103. Furthermore, the ducted wing 103 has high lift augmentation from the Coanda effect, less total wetted area than a wing with separate podded propulsors, and reduced inflow distortion at higher angles of attack due to the inlet of the ducted wing 103.

The number of propulsors 201 that are included in the ducted wings 103 is dependent on the application of the aircraft 100. For example, 32 propulsors may be used in the ducted wings 103, but any number of propulsors may be used in other embodiments. The plurality of propulsors 201 may generate 835 kW continuous/1128 kW continuous power with a maximum static thrust of 4465 lb., for example.

One or more landing mechanisms 113 may be attached to a bottom surface of the fuselage 101. The landing mechanisms 113 may be a landing gear (e.g., a tricycle gear), a landing skid, and/or other types of landing gear.

The ducted wing 103 is the main inboard wing of the aircraft 100. The ducted wing 103 is the central element connecting together the fuselage 101, the booms 105, the horizontal tails 111, and the vertical tails 107. The ducted wing 103 is located between a first end (e.g., a front) and a second end (e.g., a back) of the fuselage 101. The ducted wing 103 is configured to provide lift for the aircraft 100 for flight and has a dihedral with respect to the fuselage 101 to provide for stability in some examples. However, in other examples the ducted wing 103 may have an anhedral with respect to the fuselage 101. The ducted wing 103 may be made of a composite material such as carbon fiber, metal (e.g., aluminum or titanium), or an alloy.

In some examples, the ducted wing 103 includes a first side 103A disposed at a first side of the fuselage 101 (e.g., the right side) and a second side 103B that is disposed at a second side of the fuselage 101 (e.g., the left side). The first side 103A of the ducted wing 103 includes a first plurality of integrated propulsors 201A that are sequentially disposed across the length of the first side 103A of the ducted wing 103. Similarly, the second side 103B of the ducted wing 103 includes a second plurality of integrated propulsors 201B that are sequentially disposed across the length of the second side 103B of the ducted wing 103. The different sets of propulsors 201 integrated in each of the first side 103A and the second side 103B of the ducted wing 103 can be individually controlled. For example, the first plurality of integrated propulsors 201A can be controlled separately from the second plurality of integrated propulsors 201B.

In some examples, the first side 103A and the second side 103B of the ducted wing 103 are connected to the bottom surface of the fuselage 101 as shown in FIGS. 1A to 1G. In some examples, the first side 103A and the second side 103B of the ducted wing 103 may be connected to the upper surface of the fuselage 101 which allows for improved ground clearance, passenger ingress/egress, cargo loading/unloading, and package delivery. As described herein, the ducted wing 103 includes one or more control surfaces such as flaps and ailerons to control the aircraft 100 during flight as well as during takeoff and landing.

The first side 103A and the second side 103B of the ducted wing may be configured as one continuous structure that is connected to the bottom surface or upper surface of the fuselage 101. Alternatively, the first side 103A and the second side 103B of the ducted wing 103 may be separate structures, each coupled to the bottom surface or the upper surface of the fuselage 101.

In some examples, the aircraft 100 includes booms 105 that are connected to tips of the ducted wing 103. The main body of each boom 105 extends rearward with respect to the front of the fuselage 101 such that an end of each boom is located before the end of the fuselage 101 as shown in the side views of the aircraft in FIGS. 1B and 1D. The tip of the nose of the boom 105 comprises a toroidal volume that can be utilized for forward facing camera and sensor systems. Aft of this toroidal volume is space to place primary battery systems. Placing batteries aft of the toroidal volume allows span loading weight tuned to the structural, aero-elastic, and natural harmonic characteristics of the ducted wing 103. Volume in the booms 105 can be utilized for additional sensors (e.g., optical, aural, visual, olfactory, and/or other sensors) as well as navigation lights. The booms 105 also may include an intake for cooling of battery and sensor components.

In some examples, the aircraft 100 includes the horizontal tails 111 that are attached to the ends of the booms 105. As shown in FIGS. 1A to 1D, the horizontal tails 111 are arranged in an outboard horizontal tail arrangement. That is, each horizontal tail 111 extends in a horizontal direction away from a side surface of the boom 105 that is connected to the horizontal tail 111. The outboard horizontal tail arrangement of the horizontal tails 111 reduces the wetted area for drag and mass reduction as compared to a conventional fuselage mounted horizontal stabilizer. Moving the combined tails 115 outboard also moves the tails away from the downwash of the array of propulsors 201 that complicates control at low-speed and takeoff.

The horizontal tails 111 affixed at the end of the booms 105 feature elevator surfaces to provide longitudinal stability at all phases of flight. By placing the horizontal tails 111 outboard, the horizontal tails 111 are not in the downwash of the propulsors 201 that complicates control at low-speed and takeoff, necessitating larger variations to trim. Thus, the length of the booms 105 are determined according to air flow modeling that indicates the location of the downwash of the jetfoil 109. The length of the booms 105 are also determined according to the air flow modeling such that the horizontal tails 111 are positioned in an upwash field of the vortex roll-up off of the ducted wing 103 around the boom 105. The effectiveness of the horizontal tails 111 is thus increased as the vortex roll-up provides additional lift. At cruise conditions, the horizontal tails have a net lift vector pointed towards the forward flight direction, with a positive thrust component thereby reducing battery consumption. In some examples, the horizontal tails 111 include a dihedral of approximately 5 degrees to help with horizontal tip strike during landing of the aircraft 100. The horizontal tails 111 may have flaps that can be actuated with electromechanical actuators, for example.

The vertical tails 107 (e.g., vertical stabilizers) are located at the aft end of the booms 105 on the upper surface of the booms 105 to reduce boom and tail strike concerns. In some examples, a single vertical tail is attached to an upper surface of a corresponding boom 105 and extends in an upward direction towards the sky from the upper surface of the boom 105 so that the vertical tail 107 is above the boom 105. Each vertical tail 107 may have a movable control surface such as rudder that enables yaw control. The movable control surfaces of the vertical tails 107 pivot about an end that is connected to the portion of the vertical tail 107 to keep the aircraft 100 in line with the direction of motion of the aircraft 100. To change the direction of motion (e.g., yaw control) of the aircraft 100, the movable control surface may move (e.g., pivot). Vortex roll up off the booms 105 also aids in the effectiveness of the vertical tails 107. Further aerodynamic optimization of the vortex roll-up can allow the vertical tails 107 to be undersized (e.g., have smaller tail volume coefficients) relative to conventional aircraft designs while maintaining similar or better performance.

FIG. 2 provides an example of a cross-sectional view of a jetfoil. A jetfoil 109, from the array of jetfoils 109 and as illustrated in FIG. 2, may be integrated into the ducted wing 103. By directly integrating the duct into the leading edge of jetfoil 109 to form at least a portion of the ducted wing 103, duct drag and weight is minimized while providing minimum fan inflow distortion for lowest noise. The ducted wing 103 aligns the air flow and voids the need for high lift slats. In some examples, each jetfoil 109 includes a propulsor 201 that is configured to generate thrust, an upper wing portion 230, lower wing portion 250, and one or more flaps 210.

In some examples, the upper wing portion 230 of a jetfoil 109 comprises the upper half of the duct that is included in the jetfoil 109. The upper wing portion 230 is configured to control the exhaust flow of the propulsor 201. The lower wing portion 250 is configured to control the different takeoff and landing modes of the aircraft 100. The lower wing portion 250 includes a first lower wing portion 250A at the leading edge of the lower wing portion 250 and extends to a location that is aligned with the aft end 6 of the upper wing portion 230. In some embodiments, the lower wing portion 250 may include a flap configured to pivot between different angles in which specific angles may be associated with specific takeoff and landing modes. For example, one angle of the flap may be associated with a conventional takeoff and landing mode, another angle of the flap may be associated with a vertical takeoff and landing mode, and yet another angle may be associated with a short takeoff and landing mode.

The first lower wing portion 250A overlaps the upper wing portion 230 and is connected to the upper wing portion 230. The upper wing portion 230 and the first lower wing portion 250A collectively form the integrated duct of the jetfoil 109. The propulsor 201 is disposed between the upper wing portion 230 of the jetfoil 109 and the first lower wing portion 250A of the lower wing portion 250.

The lower wing portion 250 also includes a second lower wing portion 250B. The second lower wing portion 250B extends from the end of the first lower wing portion 250A to the trailing edge of the lower wing portion 250. As shown in FIG. 2, the second lower wing portion 250B is non-overlapping with the upper wing portion 230.

In one embodiment, one or more flaps 210 are connected to the upper wing portion 230 and the lower wing portion 250. In one embodiment, flaps 210 include a first flap 210A configured to be attached to the upper wing portion 230 and a second flap 210B configured to be attached to the lower wing portion 250. One end of each flap 210 is configured to be attached to an edge of the ducted wing 103. In one embodiment, one end of one of the flaps 210 is configured to be attached to the trailing edge of the ducted wing 103. In another embodiment, one end of one of the flaps 210 is configured to be attached to the leading edge of the ducted wing 103. Each flap 210 is configured to pivot about the attachment point to the edge of the ducted wing 103. The flap 210 may have a different configuration based on its attachment point.

In some examples, the second flap 210B is configured to pivot about the attachment point to the trailing edge of the lower wing portion 250 and may be configured to direct the air flow from the propulsors 201 to control the lift and drag. The second flap 210B allows for a plurality of takeoff modes, including VTOL, STOL, and CTOL by controlling the direction of air flow from the propulsors 201. In some examples, the first flap 210A is configured to pivot about the attachment point to the trailing edge of the upper wing portion 230 and is configured to control the area of the outlet of the exhaust of the propulsors 201 thereby controlling mass flow conditions for efficient fan operation, and subsequently thrust. In some examples, each flap 210 is a single-element flap. In other embodiments, some of the flaps 210 are a multi-element flap.

In some examples, the ducted wing 103 augments low speed lift from a conventional CLmax of 1.8 to, for example, over 6.0. This enables three times higher wing loading but with three times smaller wing area compared to conventional wing designs. Directly integrating the duct into the airfoil leading edge of the ducted wing 103 also reduces drag at high-speed cruise (e.g., greater than 40%) when compared to conventional wing designs. High lift is achieved without adding a high pitching moment. Furthermore, the integration of the duct into the jetfoil leading edge of the ducted wing 103 improves ride quality and enables a low stall speed of, for example, 61 knots with less than 3,000 takeoff and landing balanced field length.

The array of jetfoils 109 included in the ducted wing 103 augment lift of the wing across multiple speeds and provide thrust throughout the flight envelope. By embedding the array of jetfoils 109 into the ducted wing 103, drag is reduced while simultaneously maximizing the efficiency of thrust generated. In some embodiments, the ducted wing 103 also includes ailerons for roll control as well as additional flaps for trim across various stages of flight.

Flaps 210, including both first flap 210A at the top trailing edge of the ducted wing 103 (e.g., the upper wing portion 230) as well as the second flap 210B at the bottom trailing edge of the ducted wing 103, can deflect in order to tailor the area ratio of the exhaust to the particular cruising speed and ensure that the propulsor exhaust flow remains attached to the upper surface of the lower wing. Tailoring the area ratio ensures optimal efficiency at all cruise speeds without the need for variable pitch propulsor blades. The deflection of the flaps 210 may be automatically scheduled, as a function of the airspeed, mechanically or electronically.

In some examples, due to the propulsor integration into the leading edge of the ducted wing 103, the upper wing portion 230 and the lower wing portion 250 act like a biplane where the vertical portions of the duct array add to the structural rigidity of the structure. As shown in FIG. 2, the lower wing portion 250 is longer than the upper wing portion 230 such that the lower wing portion 250 extends past the end of the first flap 210A that is attached to the upper wing portion 230. The leading-edge integration also ensures that distortion into the propulsor 201 face is reduced across angles of attack and flight speeds. This design improves over designs with integration aft of the leading edge that require additional pylons to avoid boundary layer ingestion, resulting in more drag.

In some examples, a ducted wing 103 may comprise a primary spar and at least two secondary spars for rigidity. The ducted wing 103 may feature as many as 50 propulsors to provide multi-engine redundancy, for example. Each of these propulsors are driven with the same signal(s) from a FADEC (Full Authority Digital Engine Control) so that the pilot can control the thrust across the array of propulsors 201 with a single throttle. Each of the propulsors 201 included in the array of jetfoils 109 is replaceable. The leading edge of the array of propulsors 201 can pivot for maintenance purposes to enable access to maintainers to remove the fan, stators, or electric motor as required. The propulsors 201 might not pivot during each of the different takeoff and landing modes. Sweep can be introduced to the ducted wing 103 to co-locate the center of lift with the center of thrust to avoid large nose down pitching moments across the speed regime. In some examples, depending on the relative arrangement of the booms and tails to the inboard wing, structural weight benefits may also be realized.

As described herein, each duct of the array of jetfoils 109 transitions from an elliptical shape at the inlet lip, to a cylindrical section from the fan face to the stator region, and then into a rectangular cross section that allows the exhaust of the aircraft 100 to form a clean sheet that smoothly attaches to the upper surface of the lower airfoil. The jetfoil 109 is designed to balance aero and thrust considerations without introducing pitching moment. Within the duct is a center body which houses an electric motor that drives each propulsor 201. Wiring to the motor is directed through one or more stators for power and active cooling, if required. In some embodiments, the upper wing portion 230 and the lower wing portion 250 may contain one or more payloads, such as electronics, sensors, fuel, cargo, or mechanical elements.

FIGS. 3A to 3F illustrate different views of an example application of the ducted wings 103 of the aircraft 100. As shown in FIGS. 3A to 3F, the ducted wings 103 includes a plurality of second flaps 210B which can rotate independently of each other. As shown in FIGS. 3A to 3F, the second flaps 210B rotate into a range of positions to allow for a range of takeoff modes.

The combination of the propulsors 201 into an array opens up several control and thrust vectoring opportunities. Thrust can simply be varied between each individual propulsor 201 to induce yawing, rolling, or pitching moments. Relative spanwise pitch differences between the jetfoils 109 can be used to catalyze faster climbs and descents. within some examples, additional control surfaces may be installed at the trailing edge.

The spanwise combination of ducts within the jetfoils 109 support integration along the wing and/or as a biplane wing itself. The array can be arranged and extended as a biplanar wing with sweep, stagger, dihedral and taper to fit system needs. The choice to integrate the array of propulsors 201 as a full biplanar wing is dependent on the amount of thrust (minus drag) required as well as the relative size of the propulsor 201.

Figure 3A:
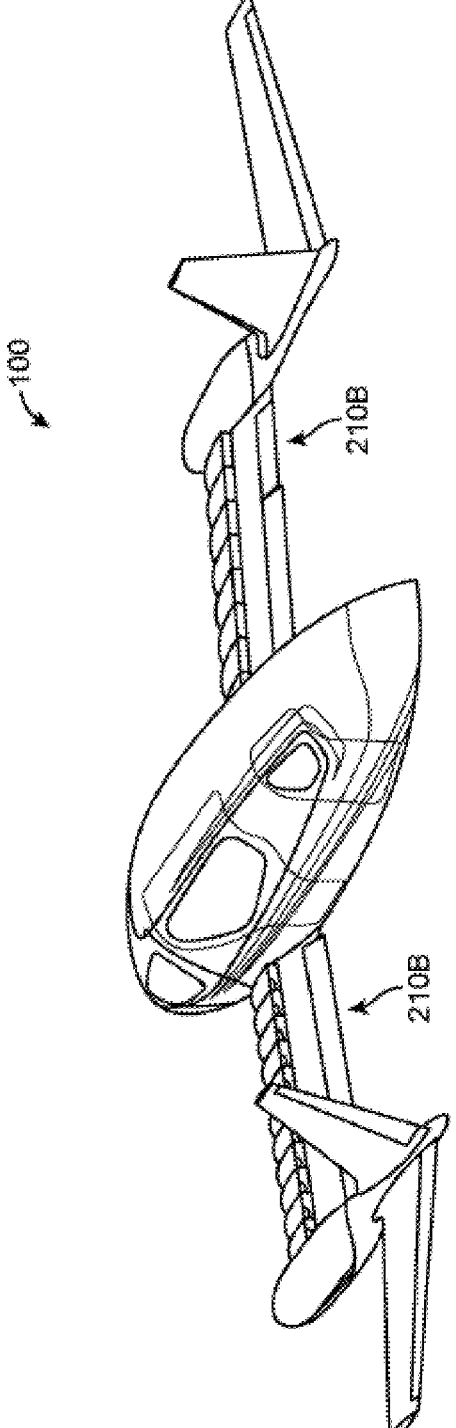
FIGS. 3A, 3B, 3C, 3D, 3E and 3F illustrate various back and side views of an example aircraft in which flaps are set at various angles for different takeoff and landing modes, each according to one or more example arrangements.

For example, FIG. 3A illustrates the position of the second flaps 210B on the lower wing portion 250 for CTOL or during the cruise portion of flight. As shown in FIGS. 3A, 3E, and 3F, the second flaps 210B are in a first position (e.g., a first angle) while the aircraft is in the CTOL mode. The first position of the second flaps 210B is optimized for CTOL or cruising during flight. In one embodiment, the default position of the second flaps 210B maximizes the overall length of the ducted wing 103. The second flaps 210B may be controlled independently of other flaps 210, such as first flaps 210A.

Figure 3B:
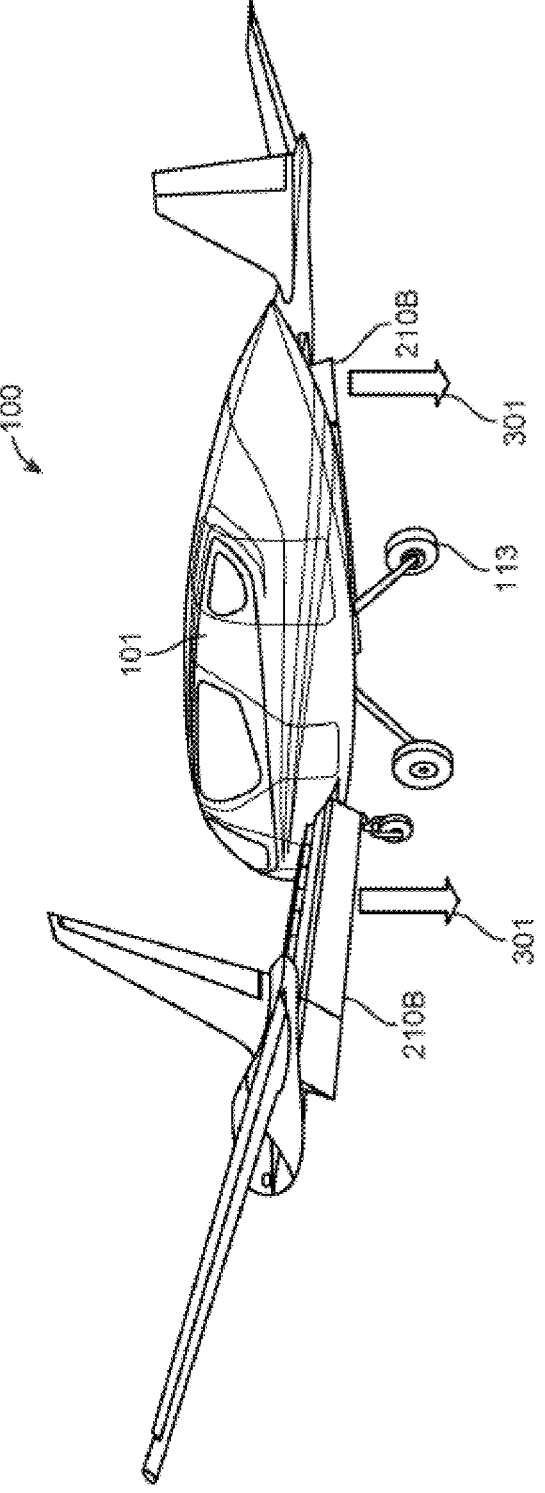
Figures 3C, 3D, 3E, 3F:
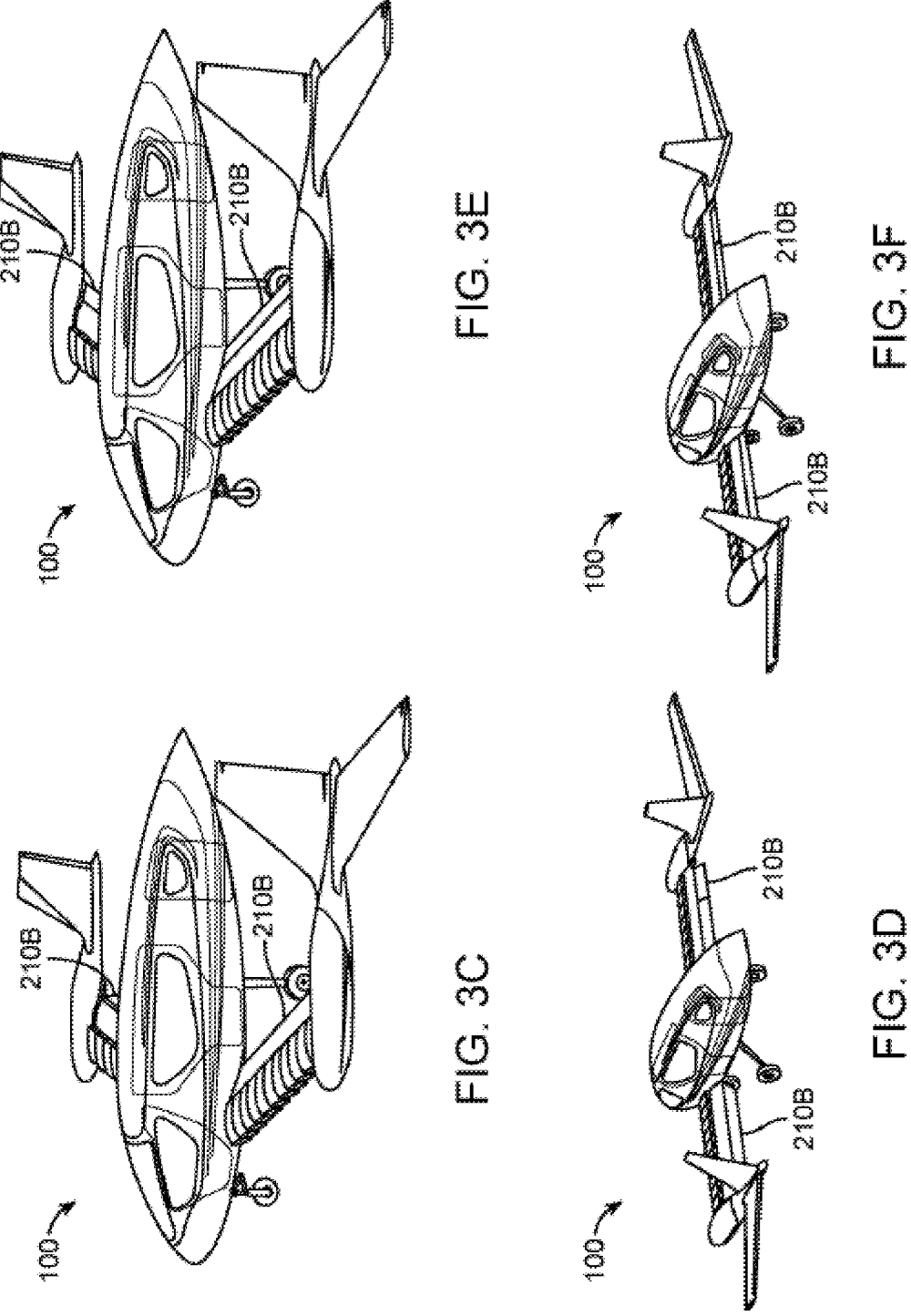

FIG. 3B illustrates a second position of the second flaps 210B on the lower wing portion 250 for VTOL. While the aircraft is in VTOL mode, the second flaps 210B are angled (e.g., pivoted) downward at a maximum angle (e.g., a second angle) of possible pivot of the second flaps 210B to direct the direction of thrust generated by the propulsors 201 in the downward direction as indicated by arrows 301. By directing the thrust downwards, the aircraft 100 is configured for VTOL. In some examples, the maximum angle of pivot of the second flaps 210B is a 45-degree angle. If an angle greater than 45 degrees is used, there may be a loss in efficiency.

FIGS. 3C and 3D illustrate a third position of the second flaps 210B on the lower wing portion 250 for STOL. In some examples, the STOL ability of the aircraft 100 enables the aircraft 100 to take off and clear an obstruction with a predetermined height (e.g., 50 feet, and/or other heights) in a predetermined distance (e.g., 1,500 feet, and/or other distances) from the start of the takeoff run and be able to stop within the predetermined distance after crossing the obstacle.

While in the STOL mode, the second flaps 210B are at the third position which is an intermediate position between the first position of the second flaps 210B for CTOL and the second position of the second flaps 210B for VTOL. In some examples, the second flaps 210B are at an intermediate angle between the maximum possible pivot angles of the second flaps 210B for VTOL and the angle of the second flaps 210B for CTOL. FIGS. 3E and 3F illustrate the second flaps 210B on the lower wing portion 250 for CTOL, in the position optimized for CTOL, as a comparison to FIGS. 3C and 3D.

Note that in some examples, in the CTOL mode, the STOL mode, and the VTOL mode, the angle of the propulsors 201 that are integrated into the ducted wing 103 is fixed. That is, the propulsors 201 do not rotate to change the direction of thrust to allow for CTOL, STOL, or VTOL. Rather, the position (e.g., angle) of the second flaps 210B changes to enable each mode of the aircraft 100 and the propulsors 201 maintain a fixed angle during the different modes of the aircraft 100.

Figures 4A, 4B:
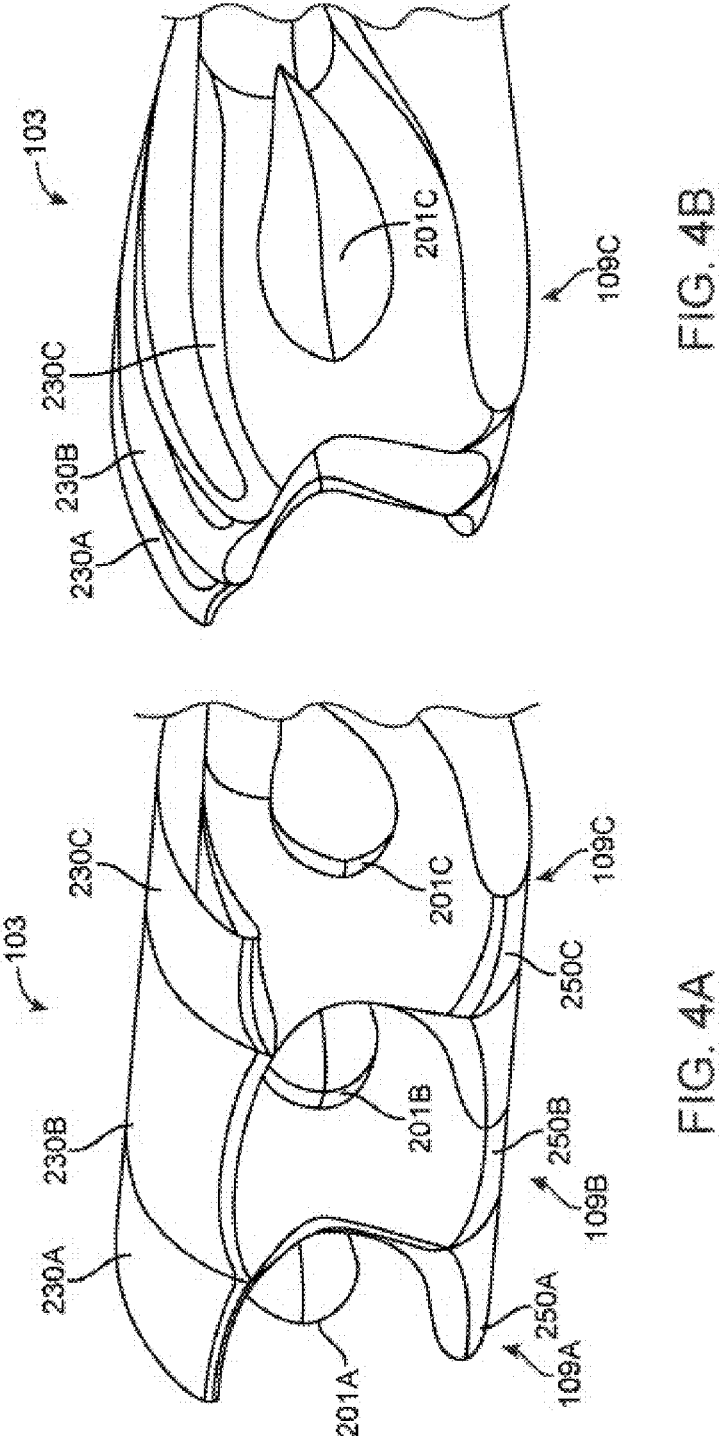
FIGS. 4A and 4B respectively illustrate a perspective view and a side view of an example array of jetfoils, each according to one or more example arrangements.

FIGS. 4A and 4B respectively illustrate a perspective view and a cross-sectional view of an array of jetfoils 109 that form the ducted wing 103. FIGS. 4A and 4B illustrate the different jetfoils 109 that collectively make up the ducted wing 103. In some examples, the array of jetfoils 109 includes a first jetfoil 109A, a second jetfoil 109B, and a third jetfoil 109C that are laterally arranged to form a portion of the ducted wing 103. The first jetfoil 109A includes a first propulsor 201A, a first upper wing portion 230A, and a first lower wing portion 250A. In some examples, the second jetfoil 109B includes a second propulsor 201B, a second upper wing portion 230B that is connected to an extends from an end of the first upper wing portion 230A of the first jetfoil 109A, and a second lower wing portion 250B that is connected to and extends from an end of the first lower wing portion 250A of the first jetfoil 109A. In some examples, the third jetfoil 109C includes a third propulsor 201C, a third upper wing portion 230C that is connected to an extends from an end of the second upper wing portion 230B of the second jetfoil 109B, and a third lower wing portion 250C that is connected to an extends from an end of the second lower wing portion 250B of the second jetfoil 109B. While there are three jetfoils 109 shown in FIGS. 4A and 4B, it should be understood that there can be any number of jetfoils in the array of jetfoils 109 without departing from the scope of this disclosure.

In some embodiments, as shown in FIGS. 4A and 4B, the connections between the first upper wing portion 230A, the second upper wing portion 230B, and the third upper wing portion 230C, as well as between the first lower wing portion 250A, the second lower wing portion 250B, and the third lower wing portion 250C, respectively, are curved rather than straight rectangular lines and edges. As shown in FIGS. 4A and 4B, in certain embodiments the elliptical inlet of the propulsors 201 may be designed/constructed such that the adjacent inlets merge together. In some examples, the elliptical inlets may be large enough such that the inlets effectively form a single rectangular region spanning the length of the wing. In these embodiments, the inlets and outlets of the corresponding propulsor 201 may comprise a conical shape, and the flaps 210 which follow those edges may be similarly curved. One benefit of this curve is that it may require less material, and have corresponding weight benefits. In other examples not shown, the connections between propulsors 201 may be smoother, leading to a straight-line edge between each of the upper wing portions 230 and lower wing portions 250. In these examples, in which the upper wing portion 230 has an edge that is not curved, but instead straight, and the lower wing portion 250 has an edge that is not curved, but instead straight, the air flow over the ducted wing 103 will be more uniform and resemble more of a 2-dimensional flow across the full ducted wing 103. Further, in these embodiments with straighter edges, the corresponding flaps 210 will match the shape of the edges of the upper wing portion 230 and lower wing portion 250.

Figure 5A:
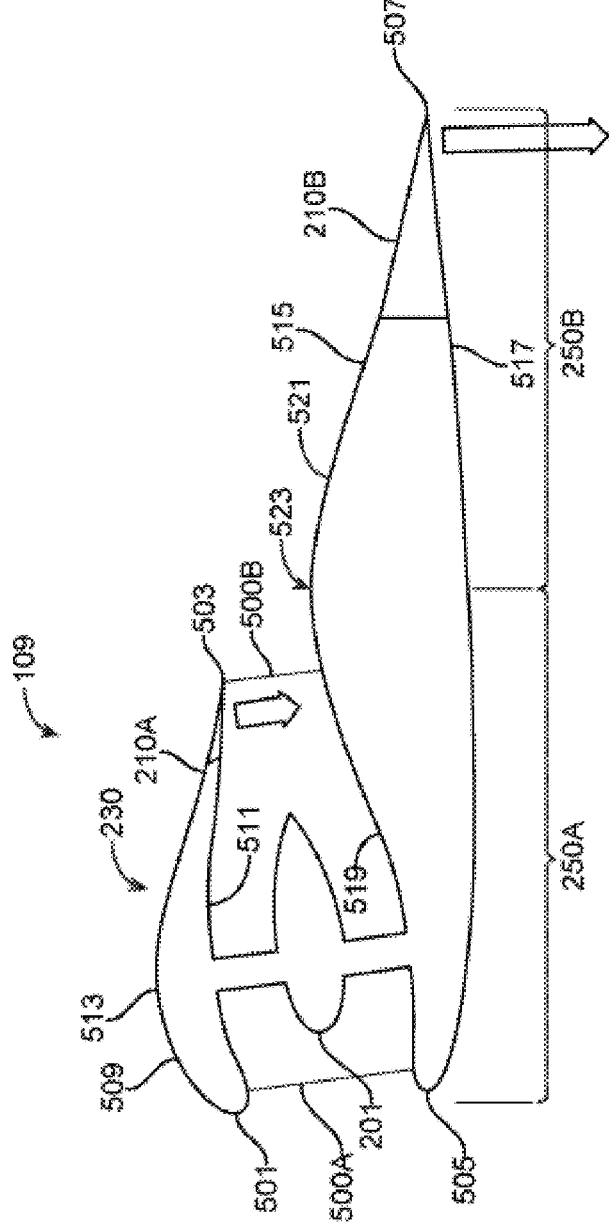
FIGS. 5A, 5B, 5C, and 5D respectively illustrate a cross-sectional view of an example jetfoil of a ducted wing with flaps at the trailing edges of the jetfoil, a cross-sectional view of an example jetfoil of a ducted wing with flaps at the trailing edge and a leading edge of the jetfoil, a cross-sectional view of an example jetfoil of a ducted wing with flaps at the trailing edges and another leading edge of the jetfoil, and a cross-sectional view of an example jetfoil of a ducted wing with flaps at the trailing edges and the leading edges of the jetfoil, each according to one or more example arrangements.
Figure 5B:
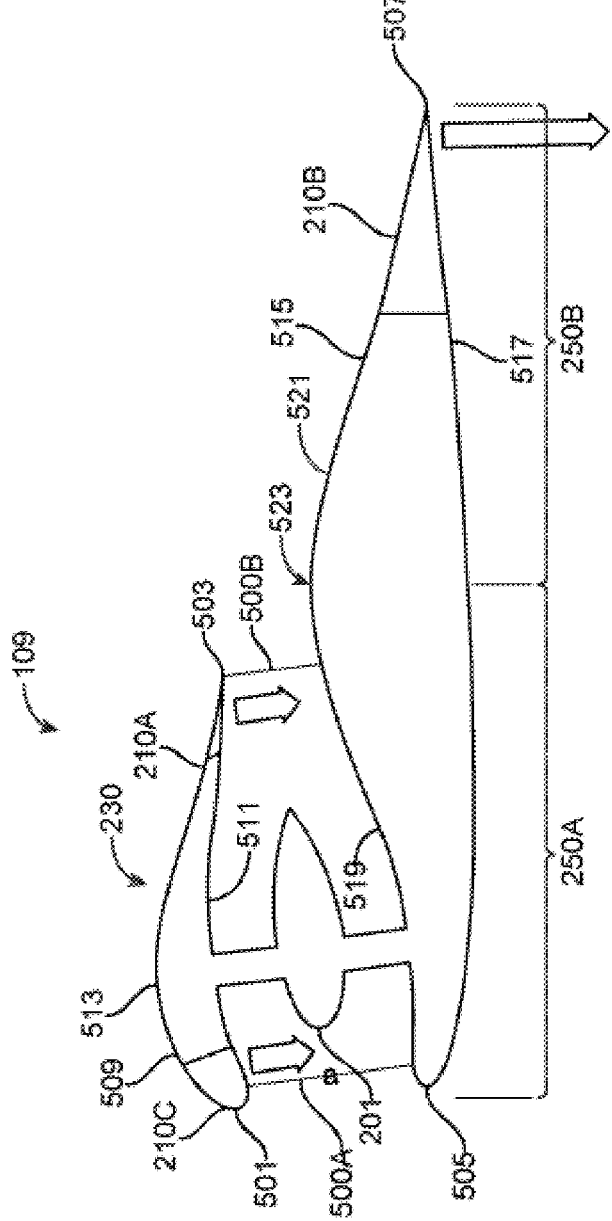
Figure 5C:
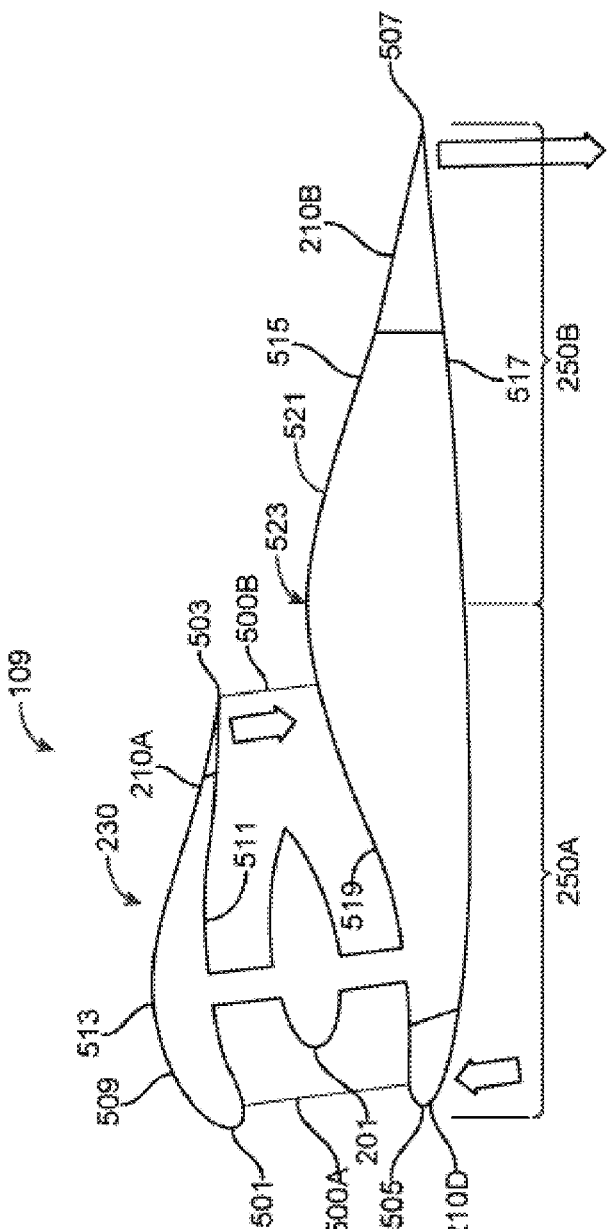
Figure 5D:
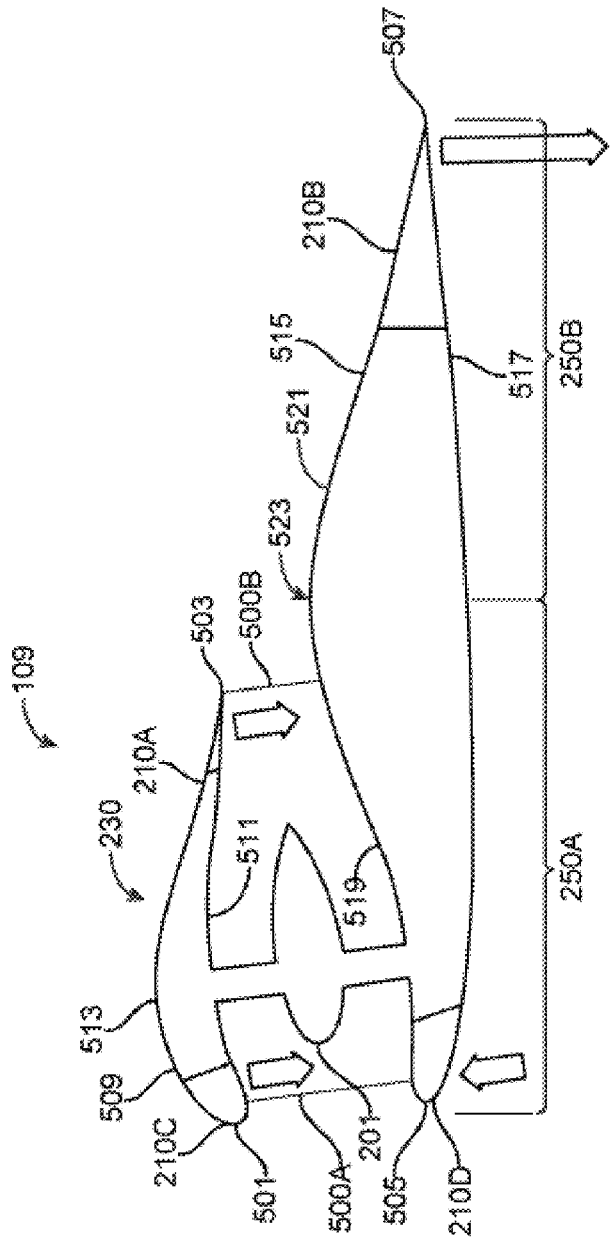

FIGS. 5A to 5D illustrate cross-sectional views of a jetfoil 109 included in the ducted wing 103 according to some examples, with a variety of flap arrangements. Specifically, FIG. 5A illustrates a cross-sectional view of a jetfoil 109 including the first flap 210A and the second flap 210B as previously described above. FIG. 5B illustrates a cross-sectional view of a jetfoil 109 also including a third flap 210C in addition to the first flap 210A and the second flap 20B. FIG. 5C illustrates a cross-sectional view of a jetfoil 109 also including a fourth flap 210D in addition to the first flap 210A and the second flap 20B. FIG. 5D illustrates a cross-sectional view of a jetfoil 109 including both the third flap 210C and the fourth flap 210D in addition to the first flap 210A and the second flap 20B. Each of the plurality of flaps 210 are controlled independently of each other.

Referring to FIG. 5A, in some examples, each jetfoil 109 includes a propulsor 201 with an inlet area and an outlet area. The jetfoil 109 has an inlet 500A with a corresponding inlet area and an outlet 500B with a corresponding outlet area with a default position in which the inlet area exceeds the outlet area.

The upper wing portion 230 includes a first end 501 and a second end 503 that is opposite the first end 501. The lower wing portion 250 also includes a first end 505 and a second end 507 that is opposite the first end 505 of the lower wing portion 250. In some examples, each of the first end 501 of the upper wing portion 230 and the first end 505 of the lower wing portion 250 is rounded as shown in FIG. 5A.

In some examples, the first end 501 (i.e., leading edge) of the upper wing portion 230 is forward of the first end 501 (i.e., leading edge) of the lower wing portion 250. That is, the first end 501 of the upper wing portion 230 extends past the first end 505 of the lower wing portion 250 such that the first end 501 of the upper wing portion 230 is non-overlapping with the first end 505 of the lower wing portion 250.

This results in an inlet area of the jetfoil 109 which is canted, rather than perpendicular to the flow of air. The canted inlet area aids low speed performance and reduces inlet flow field distortion.

In some examples, the upper wing portion 230 has an outer surface 509 that is convex in shape and an inner surface 511 that is concave in shape. The outer surface 509 of the upper wing portion 230 is not parallel with the inner surface 511 of the upper wing portion 230 as shown in FIG. 5A. In some examples, the thickness of the upper wing portion 230 varies from the first end 501 of the upper wing portion 230 to the second end 503 of the upper wing portion 230. For example, the thickness of the upper wing portion 230 may increase from the first end 501 of the upper wing portion 230 to an intermediate portion 513 of the upper wing portion 230 that is between the first end 501 and the second end 503 of the upper wing portion 230. In some examples, the intermediate portion 513 corresponds to (e.g., overlaps) the location of the propulsor 201 within the jetfoil 109. In these examples, the thickest portion of the upper wing portion 230 is aligned with the propulsor 201. The thickness of the upper wing portion 230 decreases from the intermediate portion 513 of the upper wing portion 230 to the second end 503 of the upper wing portion 230.

The lower wing portion 250 has an inner surface 515 that faces the inner surface 511 of the upper wing portion 230. The inner surface 515 of the lower wing portion 250 is connected to the inner surface 511 of the upper wing portion 230 to collectively form the inner surface of the duct of the jetfoil 109 in which the propulsor 201 is disposed. The inner surface 515 of the lower wing portion 250 includes a first portion 519 that is concave in shape and a second portion 521 that is convex in shape.

In some examples, the concave first portion 519 of the inner surface 515 of the lower wing portion 250 overlaps the concave inner surface 511 of the upper wing portion 230. In some examples, the concave first portion 519 of the inner surface 515 of the lower wing portion 250 is included in the first lower wing portion 250A described herein. The propulsor 201 is disposed between the concave first portion 519 of the inner surface 515 of the lower wing portion 250 and the concave portion of the inner surface 511 of the upper wing portion 230 that form the duct of the jetfoil 109. In some examples, the duct formed by the upper wing portion 230 and the lower wing portion 250 has a maximum inner area in the concave first portion 519 of the inner surface 515 of the lower wing portion 250 and the concave inner surface 511 of the upper wing portion 230 that overlaps the propulsor 201. As shown in FIG. 5A, the propulsor 201 is closer to the inlet 500A than the outlet 500B of the duct.

The convex second portion 521 of the upper inner surface 515 of the lower wing portion 250 is included in the second lower wing portion 250B and is thus non-overlapping with the upper wing portion 230. The lower wing portion 250 also has an outer surface 517. The outer surface 517 of the lower wing portion 250 is convex in shape from the first end 505 of the lower wing portion 250 to the second end 507 of the lower wing portion 250.

In some examples, the thickness of the lower wing portion 250 varies from the first end 505 of the lower wing portion 250 to the second end 507 of the lower wing portion 250. For example, the thickness of the lower wing portion 250 may increase from the first end 505 of the lower wing portion 250 to an intermediate portion 523 of the lower wing portion 250 that corresponds to (e.g., overlaps) the second end 503 of the upper wing portion 230. In these examples, the thickest portion of the lower wing portion 250 is aligned with the second end 503 of the upper wing portion 230. The thickness of the lower wing portion 250 decreases from the intermediate portion 523 of the lower wing portion 250 to the second end 507 of the lower wing portion 250.

As a result of the concave and convex shapes of both of the inner surface 511 of the upper wing portion 230, and the inner surface 515 of the lower wing portion 250, an inner diameter (and therefore the area) of the duct of the jetfoil varies from both of the first end 501 of the upper wing portion 230, and the first end 505 the lower wing portion 250 to the second end 503 of the upper wing portion 230 and the intermediate portion 523 of the lower wing portion 250. As shown in FIG. 5A, the diameter (and therefore the area) of the duct increases from the inlet 500A of the jetfoil to a portion of the duct overlapping the intermediate portion 513 of the upper wing portion, and decreases from the intermediate portion 513 to the outlet 500B of the duct between the second end 503 of the upper wing portion 230 and the intermediate portion 523 of the lower wing portion 250.

As described herein, one or more flaps 210 may be connected to the jetfoil 109. In FIG. 5A, the second end 503 of the upper wing portion 230 includes a first flap 210A and the second end 507 of the lower wing portion 250 includes a second flap 210B. The first flap 210A is configured to control the outlet area of the outlet 500B (e.g., exhaust outlet) of the jetfoil 109. That area of outlet 500B may be decreased from its maximum area to a minimum outlet area by pivoting the first flap 210A downward thereby changing the angle of the first flap 210A, and changing the area of the outlet. Control of outlet area of the jetfoil 109 allows for optimized air flow at various speeds of the aircraft 100 and allows for maximum efficiency across various speeds.

In contrast, the second flap 210B controls the direction of the exhaust flow thereby changing the direction of thrust. As mentioned previously, the angle (e.g., position) of the second flap 210B corresponds to a particular mode of the aircraft 100. In FIG. 5A, the angle of the second flap 210B corresponds to the CTOL mode, but the second flap 210B may be angled downwards to a maximum angle corresponding to the VTOL mode of the aircraft 100 or an intermediate angle that corresponds to the STOL mode of the aircraft 100.

FIG. 5B illustrates another embodiment of the jetfoil 109. The embodiment shown in FIG. 5B is similar to the embodiment shown in FIG. 5A. Thus, components common to both the embodiments in FIGS. 5A and 5B are omitted from each description.

In the embodiment of FIG. 5B, a third flap 210C is added to the first end 501 of the upper wing portion 230. Thus, the jetfoil 109 in FIG. 5B includes the first flap 210A at the second end 503 of the upper wing portion 230, the second flap 210B at the second end 507 of the lower wing portion 250, and the third flap 210C at the first end 501 of the upper wing portion 230. The first flap 210A and the second flap 210B perform the same functions described above with respect to FIG. 5A. The third flap 210C may be configured to be positioned at different angles to change the inlet area of the inlet 500A of the jetfoil 109. For example, the angle of the third flap 210C may be changed downward toward a center of the propulsor 201 to control the inlet area of the inlet 500A of the jetfoil 109. Control of the inlet area in addition to the outlet area of the jetfoil 109 further optimizes the inlet air flow at various speeds of the aircraft 100 to maximize efficiency across the various speeds.

FIG. 5C illustrates another embodiment of the jetfoil 109. The embodiment shown in FIG. 5C is similar to the embodiment shown in FIG. 5A. Thus, components common to both the embodiments in FIGS. 5A and 5C are omitted for each of description.

In the embodiment of FIG. 5C, a fourth flap 210D is added to the first end 505 of the lower wing portion 250. Thus, the jetfoil 109 in FIG. 5C includes the first flap 210A at the second end 503 of the upper wing portion 230, the second flap 210B at the second end 507 of the lower wing portion 250, and the fourth flap 210D at the first end 505 of the lower wing portion 250. The first flap 210A and the second flap 210B perform the same functions described above with respect to FIG. 5A. The fourth flap 210D may be configured to be positioned at different angles to change the inlet area of the inlet 500A of the jetfoil 109. For example, the angle of the fourth flap 210D may be changed upward toward a center of the propulsor 201 to control the inlet area of the inlet 500A of the jetfoil 109. Control of the inlet area in addition to the outlet area of the jetfoil 109 further optimizes the inlet air flow at various speeds of the aircraft 100 to maximize efficiency across the various speeds.

FIG. 5D illustrates yet another embodiment of the jetfoil 109. The embodiment shown in FIG. 5D is similar to the embodiments shown in FIGS. 5A to 5C. Thus, components common to both the embodiments in FIG. 5A to 5C are omitted for each description.

In the embodiment of FIG. 5D, the third flap 210C is added to the first end 501 of the upper wing portion 230 and the fourth flap 210D is added to the first end 505 of the lower wing portion 250. Thus, the jetfoil 109 in FIG. 5D includes the first flap 210A at the second end 503 of the upper wing portion 230, the second flap 210B at the second end 507 of the lower wing portion 250, the third flap 210C at the first end 501 of the upper wing portion 230, and the fourth flap 210D at the first end 505 of the lower wing portion 250. The first flap 210A and the second flap 210B perform the same functions described above with respect to FIG. 5A. The third flap 210C and the fourth flap 210D may be configured to be positioned at different angles to change the inlet area of the inlet 500A of the jetfoil 109. By having both the third flap 210C and the fourth flap 210D, the inlet area of the inlet 500A of the jetfoil 109 can be adjusted more compared to the embodiments of FIGS. 5B and 5C with a single flap 210 at the inlet of the jetfoil 109 to further optimize the inlet air flow at various speeds of the aircraft 100.

In some examples, the ducted wing 103 may include a control mechanism connected to each flap 210 to control the angle of the flap 210. The control mechanism may include a servo motor and a rod. One end of the rod is connected to the servo motor and a second end of the rod is connected to the second flap 210B. The servo motor may extend the rod to pivot the flap 210 towards its maximum possible angle and may retract the rod to return the rod to its default position. Although FIGS. 2 to 5D and the accompanying descriptions reference the examples of an aircraft implementing a jetfoil as depicted in FIG. 2, it should be understood that these are merely illustrative examples of a jetfoil as described herein. It should be understood that aircraft may implement jetfoils, and associated structural elements, with one or more variations in design and/or function (e.g., as described herein with respect to FIGS. 6A to 16) to achieve the benefits associated with exhaust area and flow turning control without departing from the scope of this disclosure.

Figure 6A:
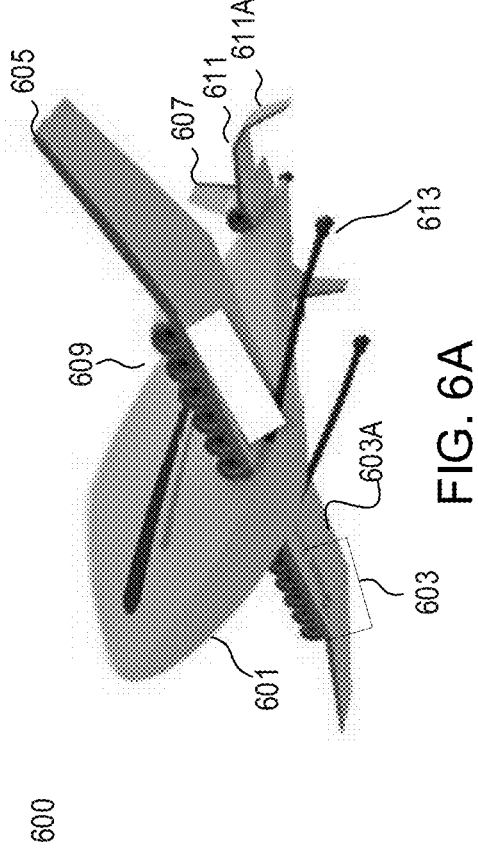
FIGS. 6A and 6B respectively illustrate a front view and a back view of an example aircraft with an integrated array of ducted fans in forward flight, each according to one or more example arrangements.
Figure 6B:
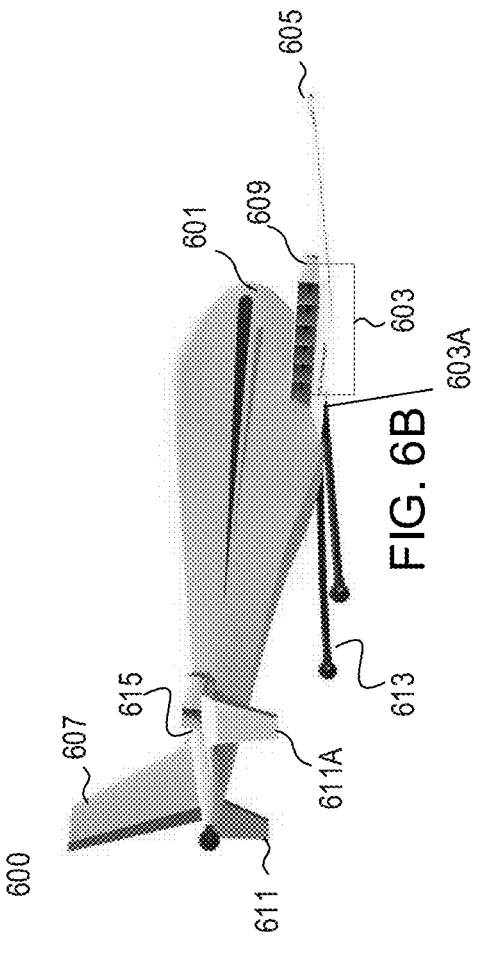

FIGS. 6A and 6B respectively illustrate a front view and a back view of an example aircraft 600 with an integrated array of ducted fans in forward flight. The aircraft 600 may be a passenger aircraft, a drone, and/or any other type of aircraft. It is to be noted that the views of aircraft 100 are for illustrative purposes and thus this disclosure is not to be limited to such dimensions, ratios, profiles, or the like. It should also be noted, however, that the ratios, profiles, dimensions, and/or other depicted characteristics shown or gleaned from the illustrated embodiments described herein may be novel features.

Figures 8A, 8B, 8C, 8D:
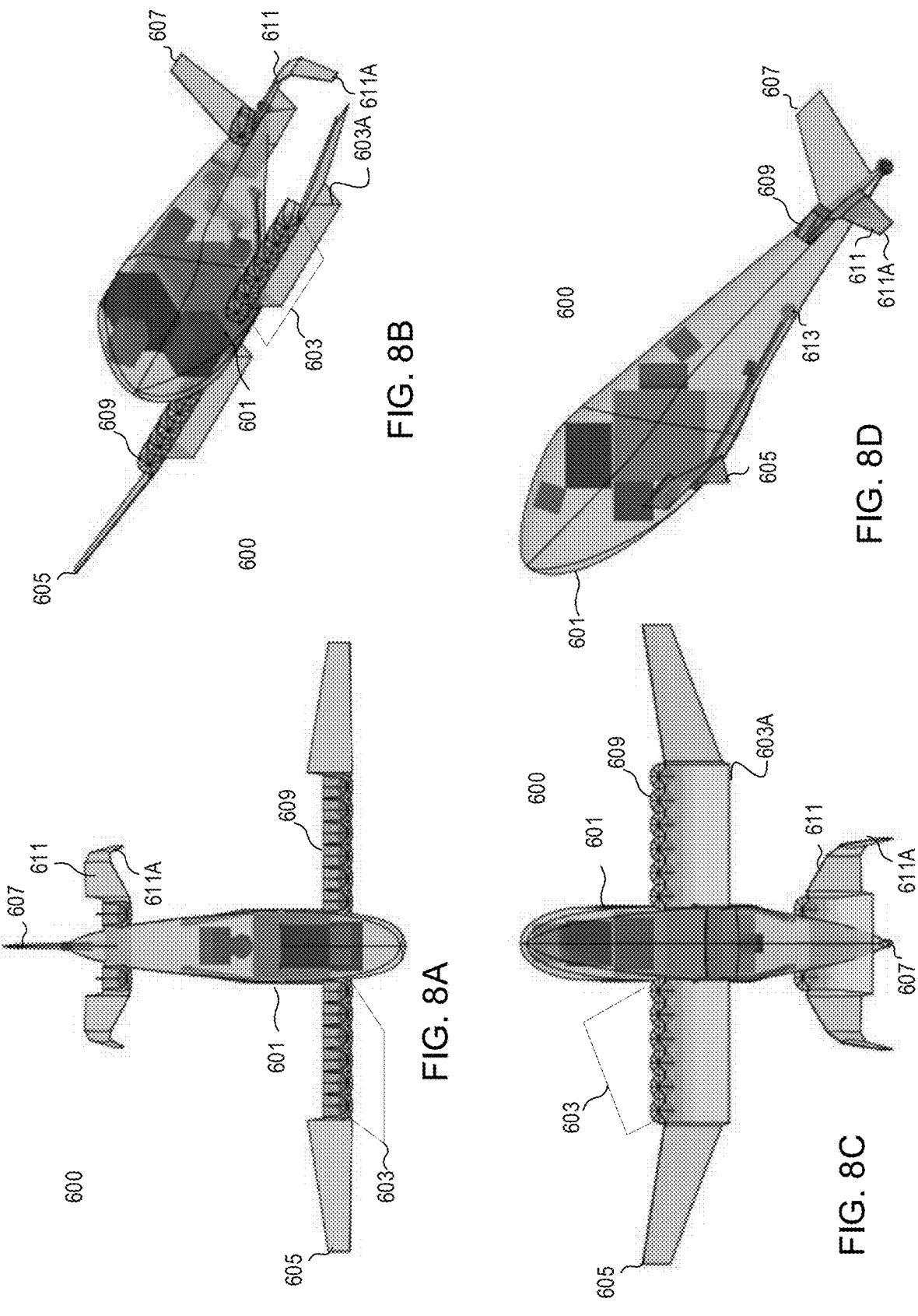
FIGS. 8A, 8B, 8C, and 8D respectively illustrate a top view, a front view, a bottom view, and a side view of an example aircraft with an integrated array of ducted fans in a hover mode, each according to one or more example arrangements.
Figures 9A, 9B, 9C, 9D:
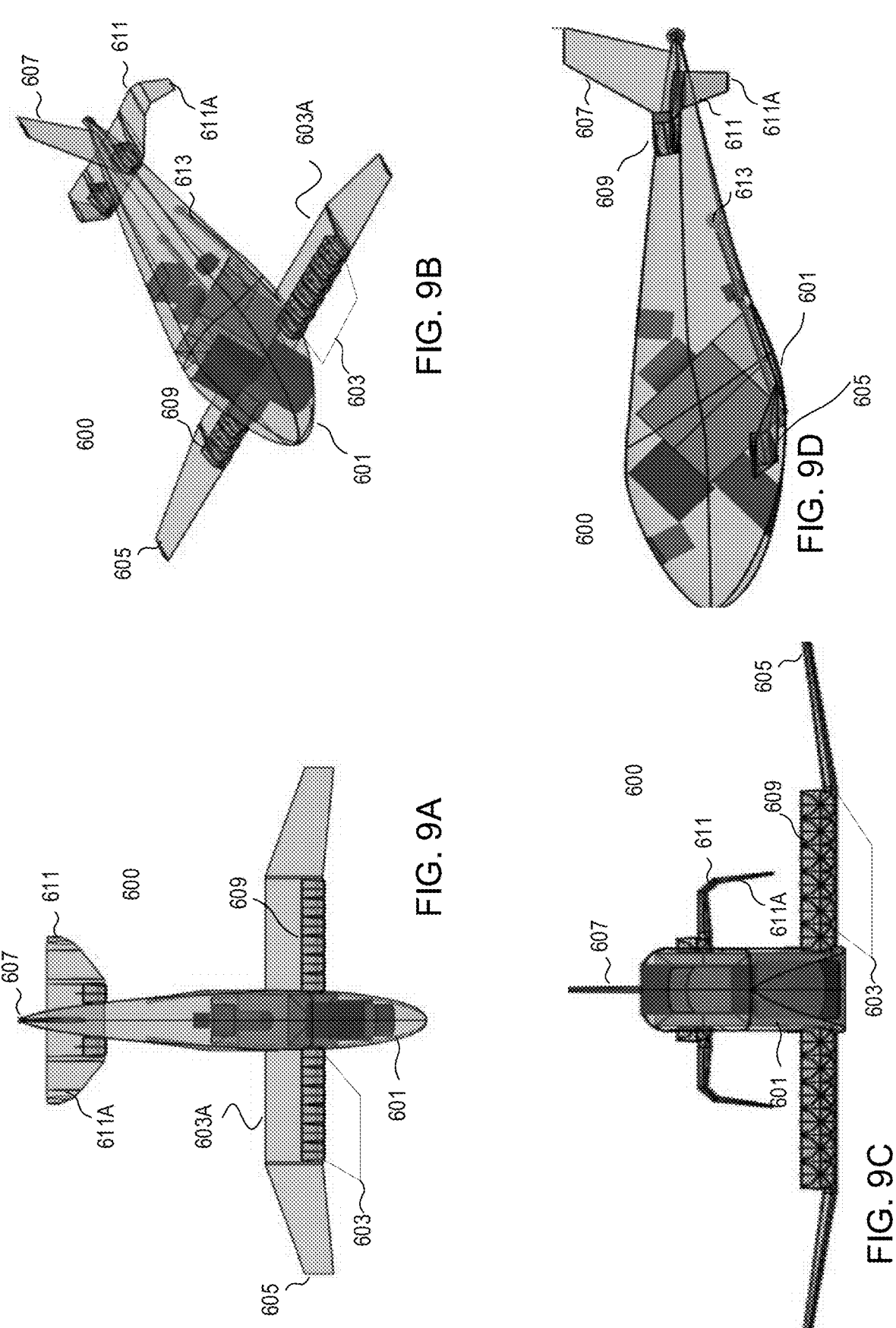
FIGS. 9A, 9B, 9C, and 9D respectively illustrate a top view, a front view, a rear view, and a side view of an example aircraft with an integrated array of ducted fans in a forward flight mode, each according to one or more example arrangements.

The aircraft 600 comprises a fuselage 601. The fuselage 601 may, in some examples, have a substantially teardrop-shaped profile when viewed at certain angles from the front (FIG. 6A), the back (FIG. 6B), the top (FIG. 8A), or the bottom (FIG. 8C). In some examples, the fuselage 601 may be sized such that the fuselage 601 has the capacity to include an avionics suite, one or more batteries, a payload (e.g., a number of passengers, a package, or the like), and/or other components of an aircraft as described herein. For example, the size of the fuselage 601 may be increased in some examples to facilitate easier battery swapping by giving a human operator more space to manipulate batteries within the fuselage 601. In some examples, the fuselage 601 may be sized to comply with one or more regulations, design preferences, or other parameters. For example, the fuselage 601 may be sized to ensure that a total weight of the aircraft 600 does not exceed a threshold weight (e.g., 55 pounds, and/or other thresholds).

The aircraft 600 also includes a main wing assembly 605. The main wing assembly 605 comprises a plurality of wings (e.g., two wings) attached to the fuselage 601. The main wing assembly 605 is be configured to facilitate takeoff, flight, and landing. The main wing assembly 605 may have a wingspan of less than 2.50 meters. The main wing assembly 605 comprises an integrated array of ducted fans 603. In some examples, the main wing assembly 605 may comprise two or more integrated arrays of ducted fans 603 on opposite sides of the fuselage 601. In some examples, an integrated array of ducted fans 603 is positioned at a leading edge of main wing assembly 605 (e.g., as shown in FIGS. 6A and 6B). In some examples, an integrated array of ducted fans 603 may be positioned abutting the fuselage 601 and/or connected to the fuselage 601 (e.g., as shown in FIGS. 6A and 6B). It should be noted that the integrated array of ducted fans 603 may be positioned at different locations of the main wing assembly 605 and at different locations relative to the fuselage 601 without departing from the scope of this disclosure. In some examples, the integrated arrays of ducted fans 603 occupy a majority of a length of the main wing assembly 605. For example, the integrated arrays of ducted fans 603 may occupy at least 80% of the main wing assembly 605, at least 90% of the main wing assembly 605, or substantially all of the main wing assembly 605. In some examples, the integrated arrays of ducted fans 603 may occupy a length less than 2.5 meters (e.g., between 2.46 and 2.49 meters). An integrated array of ducted fans may include a movable trailing edge. In some examples, the movable trailing edge may move via articulation. In some examples, the movable trailing edge may move via extension and retraction. The integrated array of ducted fans 603, in this example, includes a trailing edge 603A (e.g., a flap, or the like) that moves via articulation, which may be referred to as an articulatable trailing edge. For example, the integrated array of ducted fans 603 may include an articulatable trailing edge 603A spanning a length of the integrated array of ducted fans 603 (e.g., extending from a first terminal end of the integrated array of ducted fans 603 to a second terminal end of the integrated array of ducted fans 603). Each ducted fan included in the integrated array of ducted fans 603 may include and/or correspond to a portion of the articulatable trailing edge 603A.

An integrated array of ducted fans 603 may comprise a plurality of ducted fans 609 (e.g., a plurality of ducted fans integrated into a jetfoil, as described herein). Each ducted fan 609 may comprise a number of blades and be characterized by a particular blade passage frequency (BPF), including the example parameters disclosed herein. Each ducted fan 609 may comprise an articulatable edge that is articulated to achieve exhaust area and flow turning control as described herein. The articulatable edge of a ducted fan 609 may be and/or include a portion of the articulatable edge 603A of the integrated array of ducted fans 603. Thus, it should be understood that the articulatable edge of a given ducted fan 609 may be articulated together (e.g., simultaneously) with the articulatable edges of each ducted fan 609 when articulatable edge 603A is articulated. In some examples, the articulatable edge of a ducted fan 609 may additionally or alternatively be articulated independent of any articulatable edges of other ducted fans 609. Each ducted fan 609 may be aligned with a longitudinal axis of the aircraft 600 to eliminate the complexity of inlet lip separation required by some conventional aircraft. Main wing assembly 605 may, in some examples, extend straight (e.g., extending at a 90 degree angle) from the fuselage 601. It should be understood that in other examples the main wing assembly 605 may be characterized by a forward sweep, a backward sweep, an anhedral configuration, a dihedral configuration, and/or other by other relationships to the fuselage 601 without departing from the scope of this disclosure. In some examples, terminal ends of the main wing assembly 605 may comprise one or more additional elements, such as batteries, sensors, navigation lights, cargo/payloads, and/or other miscellaneous equipment specific to one or more functions or missions of the aircraft 600. For example, as illustrated in FIGS. 6A and 6B, the terminal ends of the main wing assembly 605 are and/or include navigation lights designed to assist with safe takeoff, flight, and landing of the aircraft 600. In some examples, the additional elements at the terminal ends of the main wing assembly 605 may be located with a boom or booms as described herein.

The aircraft 600 may additionally or alternatively comprise an empennage. For example, the aircraft 600 may include an empennage with one or more tails connected to a rear portion of the fuselage 601 and designed to improve stability of the aircraft 600. The empennage may include one or more vertical tails 607 and one or more horizontal tails 611. Vertical tails 607 provide yaw stability by preventing the aircraft 600 from rolling during flight. In some examples, a vertical tail 607 includes a rudder component that assists with turning of the aircraft 600 during flight and/or during a hover mode. For example, the rudder component allows the aircraft 600 to turn into a direction of wind flow during a hover mode to improve stability of the aircraft 600. The horizontal tails 611 may include a ducted fan 609 and/or an integrated array of ducted fans 603. For example, as illustrated in FIGS. 6A and 6B, the aircraft 600 may include two horizontal tails 611, each with a single ducted fan 609. In these examples, the articulatable edge of the ducted fan 609 on a horizontal tail 611 may be articulated independent of any other articulatable edges. In certain examples, a ducted fan 609 attached to a horizontal tail 611 includes a vertical vane 615. The vertical vane 615 may be positioned in a flow path of the air flow produced by a propulsor fan and/or other fan element of the ducted fan 609. The vertical vane 615 provides yaw control to improve stability of the aircraft 600 in high winds. For example, the vertical vane 615 may be manipulated/controlled to adjust an orientation of the aircraft 600 and prevent the aircraft 600 from rolling (e.g., due to wind and/or other flight conditions).

In some examples, the horizontal tails 611 may extend straight (e.g., at a 90 degree angle) from the rear portion of the fuselage 601. In some examples, a horizontal tails 611 may include a tail tip device ("taillet") 611A. The tail tip device 611A may have different shapes and different configurations (e.g., one or more curves, bends, or the like) designed to provide additional benefits. Tail tip devices 611A may include a single curve, bend, or the like forming a continuous angle/arc, or a number of curves, bends, or the like forming a number of different angles/arcs between the horizontal tail 611 and the tail tip device 611A. For example, as illustrated in FIGS. 6A and 6B, one or more horizontal tails 611 may include a dropped (e.g., downwardly curving or downwardly bending) tail tip device 611A positioned partway along a length of the horizontal tail causing a portion of the horizontal tail to achieve a perpendicular position relative to the ground during operation of the aircraft 600. In certain examples, a tail tip device 611A may produce benefits that are not achievable with a conventional straight horizontal tail 611. For example, the tail tip device 611A may be configured to include the curves, bends, or the like described herein to provide additional stability to the aircraft 600, produce lift, reduce drag, and/or otherwise improve the performance of the aircraft 600.

It should be understood that the wing assemblies 605 and horizontal tails 611 described herein may comprise any number of ducted fans 609. For example, as shown in FIGS. 6A to 6B, the main wing assembly 605 may include integrated arrays of ducted fans 603 comprising a total of 12 ducted fans 609. The horizontal tails 611 may each include a single ducted fan 609, resulting in a total of 14 ducted fans 609 attached to the aircraft 600. It should be understood that any number of alternative quantities or configurations of ducted fans 609 are included within this disclosure. For example the quantity of ducted fans included on the wing assembly and/or on a horizontal tail may be different than the quantity shown in the figures (e.g., FIGS. 6A to 6B). The wing assembly may include a different quantity of ducted fans on opposite wings. For example, the left wing may of a wing assembly may include more or fewer ducted fans than a right wing of the wing assembly. The horizontal tails may include a different quantity of ducted fans. For example, a left tail may include more or fewer ducted fans than a right tail of the aircraft. A left wing may include, for example, 1 to 16 ducted fans. A right wing may include, for example, 1 to 16 ducted fans. A left tail may include, for example, 0-4 ducted fans. A left wing, for example, may include 0-4 ducted fans.

In some examples, the aircraft 600 may include one or more landing mechanisms 613. The one or more landing mechanisms 613 may comprise wheels, support struts, landing gears, floats, pontoons, and/or other components used for landing and takeoff of the aircraft 600. The one or more landing mechanisms 613 may also include electronics, pneumatics, and/or other components designed to raise, retract, and/or otherwise move the landing mechanisms 613 between a plurality of configurations. For example, as shown in FIGS. 6A to 7B, the landing mechanisms 613 may comprise a plurality of support struts with components designed to move the landing mechanisms 613 between a first configuration for forward flight (FIGS. 6A and 6B) and a second configuration for landing or maintaining a position relative to a landing surface (e.g., grass, concrete, water, and/or other landing surfaces).

Figures 7A, 7B:
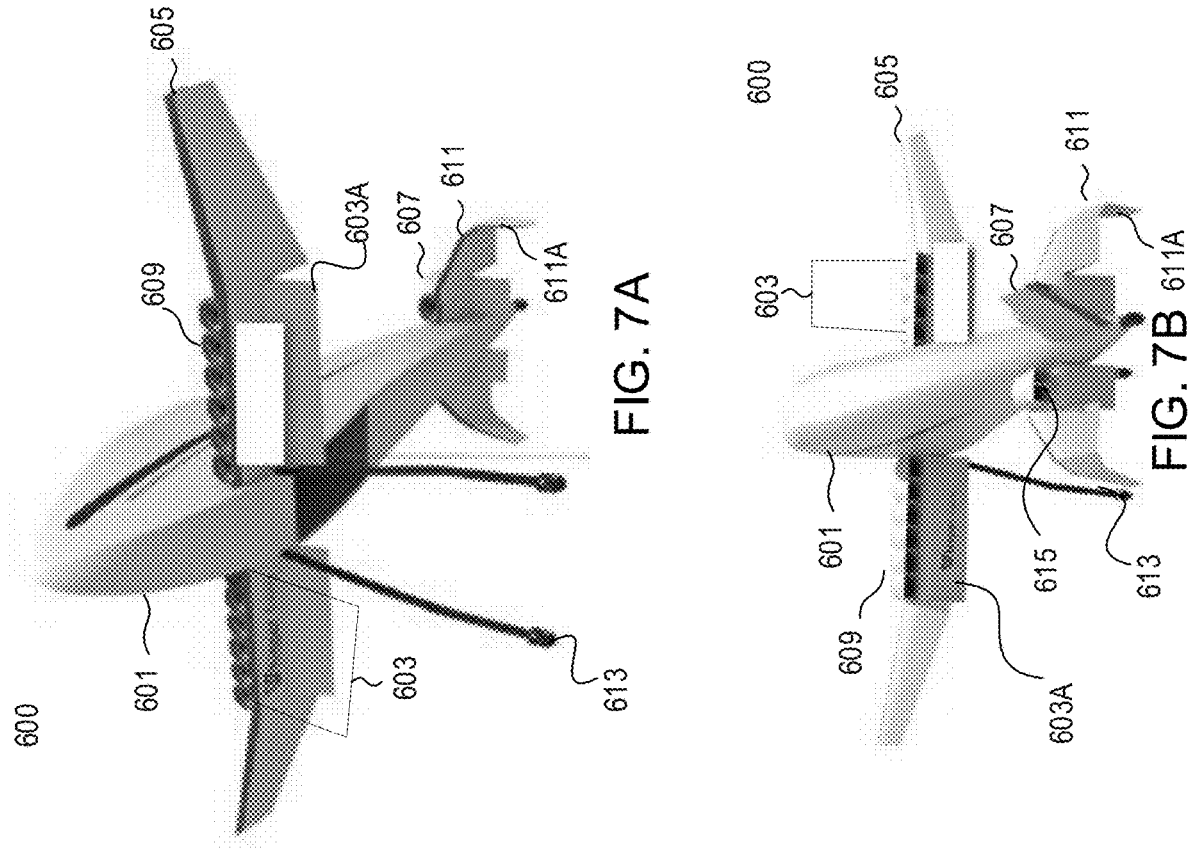
FIGS. 7A and 7B respectively illustrate a front view and a back view of an example aircraft with an integrated array of ducted fans in a landing configuration, each according to one or more example arrangements.

As described herein, FIGS. 6A and 6B respectively illustrate a front view and a back view of an example aircraft with an integrated array of ducted fans in forward flight. FIGS. 7A and 7B respectively illustrate a front view and a back view of an example aircraft with an integrated array of ducted fans in a landing configuration. For example, FIGS. 7A and 7B illustrate a front view and a back view of the aircraft 600. The landing configuration of the aircraft 600 includes the one or more landing mechanisms 613 positioned in a landing configuration providing two points of contacts with the landing surface. In some examples, a portion of the tail end of the fuselage 601 provides an additional point of contact with the landing surface to provide additional stability. The portion of the tail end may comprise additional landing mechanisms 613 (e.g., wheels or the like) to improve ground handling of the aircraft 600. The landing configuration of the aircraft 600 provides access to a bottom portion of the fuselage 601, which may include a cargo bay, a package attachment site, and/or other elements designed to receive and/or hold a payload of the aircraft 600. For example, in the landing configuration illustrated in FIGS. 7A and 7B, the landing mechanisms 613 maintain the fuselage 601 at a pitched angle (e.g., between 30 degrees and 60 degrees, preferably 45 degrees) relative to the landing surface. In some examples, the landing configuration of the aircraft 600 provides a human (or robotic) operator access to the aircraft 600 to load cargo, attach a payload, access internal components of the aircraft 600 (e.g., swap one or more batteries, activate a winch located in a cargo bay, and/or access other internal components) while maintain flight readiness.

Aircraft described herein are capable of multiple flight modes. For example, aircraft 600 is capable of operating in a forward flight mode, a hover mode, a VTOL mode, a CTOL mode, an STOL mode, and/or other modes. The aircraft 600 transitions between flight modes by articulating an articulatable edge of one or more ducted fans 609 to modify the exhaust area of one or more ducted fans 609 and/or modify a direction of flow of the exhaust area to control flow-turning, as described further herein. FIGS. 8A to 8D respectively illustrate a top view, a front view, a bottom view, and a side view of an example aircraft (e.g., aircraft 600) with an integrated array of ducted fans in a hover mode. The aircraft 600 maintains the hover mode by controlling thrust direction by articulating the articulatable edge of one or more ducted fans. For example, the aircraft 600 may articulate a single articulatable edge 603A of an integrated array of ducted fans 603 and/or an articulatable edge of an individual ducted fan 609. In some examples, the aircraft may pitch at an angle to maintain a stable position in the air. For example, aircraft 600 illustrated in FIGS. 8A to 8D may pitch a nose of the fuselage 601 upward at an angle (e.g., between about 30 degrees to about 60 degrees, preferably about 45 degrees) while articulating the articulatable edge of one or more ducted fans 609 or integrated arrays of ducted fans 603 to utilize the Coanda effect. The aircraft 600 illustrated in FIGS. 8A to 8D thus turns the exhaust area of the one or more ducted fans 609 or integrated arrays of ducted fans 603 by the pitch angle. The aircraft 600 also articulates the articulatable edge 603A of an integrated array of ducted fans 603, and/or articulates an articulatable edge of an individual ducted fan 609 to turn flow such that an optimal angle (e.g., about 90 degrees) between the flow and a surface below the aircraft 600 is achieved. In doing so, the aircraft 600 generates sufficient lift to maintain a hovering position relative to the surface. The aircraft 600 is capable of maintaining hover mode for a predetermined period of time based on a variety of factors including, but not limited to, the total weight of the aircraft 600, the weight of a payload of the aircraft 600, mission parameters, battery charge, a size of a propulsor included in one or more ducted fans 609, and/or other factors. For example, the aircraft 600 may be capable of maintaining hover for a period of two to four minutes, (e.g., about 2.25 minutes).

FIGS. 9A to 9D respectively illustrate a top view, a front view, a rear view, and a side view of an example aircraft with an integrated array of ducted fans in a forward flight mode. The aircraft transitions to forward flight mode from a hover mode, a VTOL mode, a CTOL mode, an STOL mode, and/or from other modes by articulating the articulatable edge of one or more ducted fans 609 or integrated arrays of ducted fans 603 to modify the exhaust area and flow-turning of each ducted fan, producing thrust. For example, as shown in FIGS. 9A to 9D, the articulatable edge of each of the one or more ducted fans 609 and/or an articulatable edge 603A of an integrated array of ducted fans 603 is articulated to produce lift while the ducted fans 609 produce thrust to propel the aircraft 600 in forward flight. In forward flight mode, the aircraft 600 raises, retracts, and/or otherwise moves the landing mechanisms 613 to improve aerodynamics of the aircraft 600 by reducing drag caused by air flow impacting the landing mechanisms 613.

Figure 10:
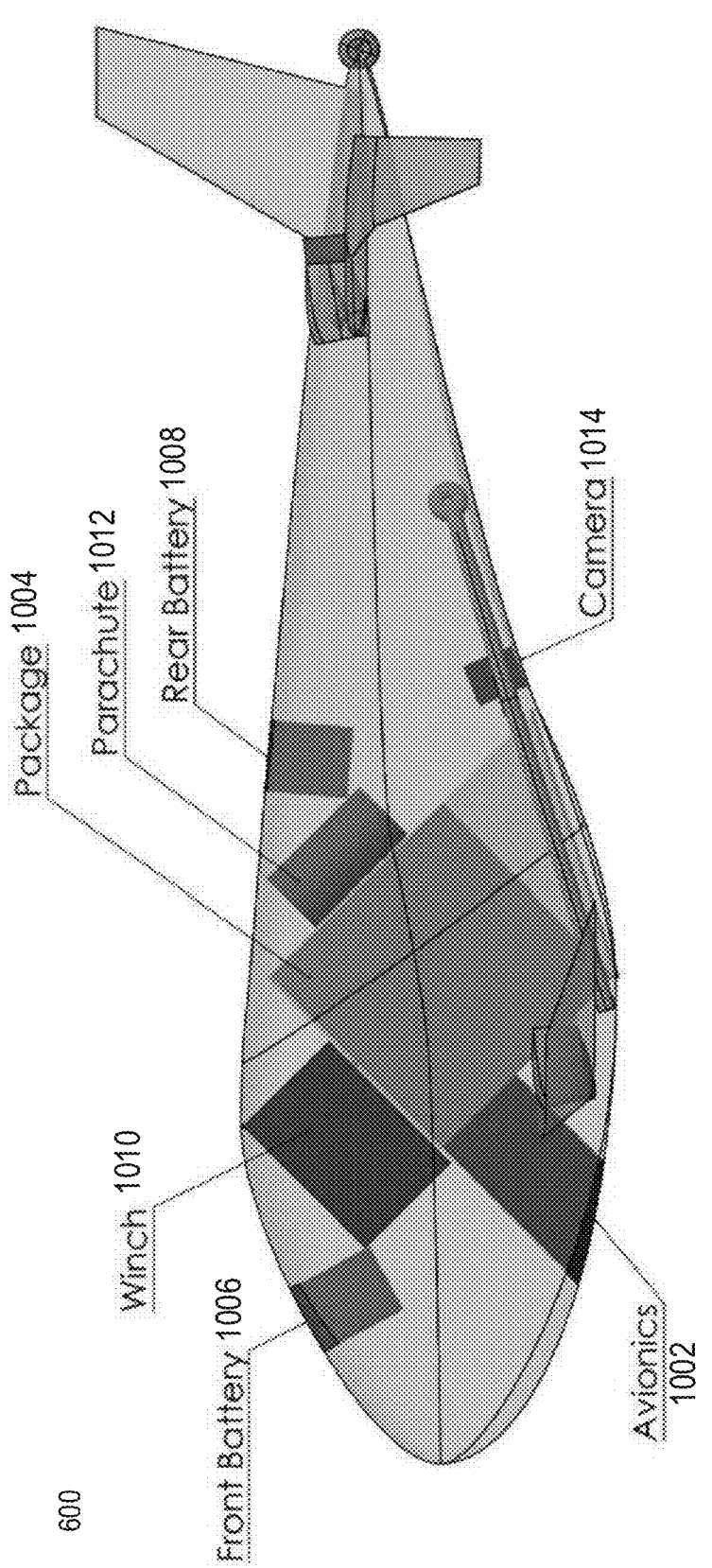
FIG. 10 illustrates a transparent view of internal components of an example aircraft with an integrated array of ducted fans according to one or more example arrangements.

An aircraft as described herein includes a number of internal components that assist with flight, payload delivery, takeoff/landing, and/or other mission parameters of the aircraft. FIG. 10 illustrates a transparent view of internal components of an example aircraft with an integrated array of ducted fans. The aircraft 600 comprises an avionics suite 1002 that provides control over a plurality of elements of the aircraft 600 (e.g., providing reliable global positioning system (GPS)/global navigation satellite system (GNSS) navigation, controlling navigation lighting, enabling main battery swapping while powering other avionic systems, and/or otherwise controlling elements of the aircraft 600). The avionics suite 1002, in some examples, has a weight of two pounds or less.

The avionics suite 1002 is designed to comply with any and all aircraft regulations (e.g., FAA regulations, NDAA regulations, or the like). The avionics suite 1002 comprises a number of interconnected electronic/electrical components. For example, the avionics suite 1002 may comprise a permanent avionics battery, a removable main battery, an autopilot computer, a companion computer, and/or other components or devices. The removable main battery allows for battery swapping while the permanent avionics battery maintains delivery of power to other elements of the avionics suite 1002, such as the autopilot computer and companion computer. In some examples, the removable main battery may be removed via a cargo bay or other opening located on the underside of the fuselage 601. In some examples, the removable main battery may be removed from a top side of the fuselage 601 (e.g., via a hatch or other opening located on the front top or rear top portion of the fuselage 601). The main battery may provide power to one or more propulsion systems (e.g., ducted fans 609, as described herein). The autopilot computer comprises one or more processors, memory, and/or other components configured to control systems such as a GPS, parachute deployment, control surfaces, airspeed sensors, and/or other systems enabling the aircraft 600 to perform autopiloted flight. The companion computer comprises one or more processors, memory, and/or other components configured to control radios, servos, winches, landing mechanisms, cameras, LED controllers, and/or other electronic components of the aircraft 600.

The aircraft 600 may further comprise a number of batteries. For example, the aircraft 600 may comprise a front battery 1006 and/or a rear battery 1008. In some examples, the either of the front battery 1006 or the rear battery 1008 may be a permanent avionics battery, a removable main battery, or the like. In some examples, either of the front battery 1006 or the rear battery 1008 may be installed on a top portion of an interior side of the fuselage 601. The aircraft 600 may further comprise a package 1004. The package may be a box, container, envelope, and/or any other payload of the aircraft 600. As shown in FIG. 10, the package 1004 may be held within the fuselage of the aircraft 600 (e.g., in a cargo hold, or the like). However, it should be understood that in some examples a package 1004 may additionally or alternatively be located on and/or otherwise attached to an outer surface of the aircraft 600 (e.g., as shown in FIG. 11) without departing from the scope of this disclosure.

Figure 11:
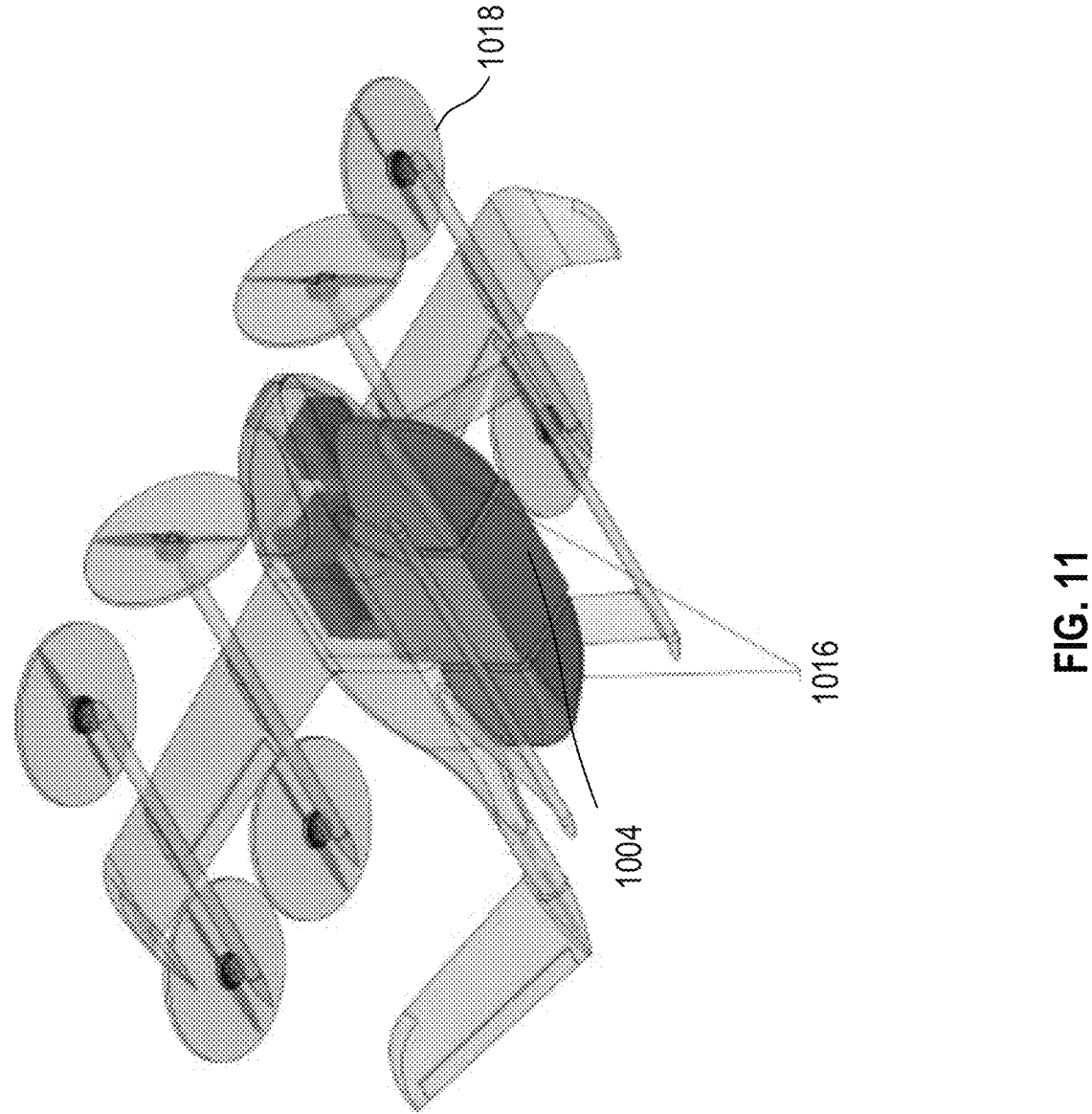
FIG. 11 illustrates an example aircraft utilizing inflatable fairings according to one or more example arrangements.

Referring to FIG. 11, in some examples, the package 1004 may be disposed fully or partially outside of the aircraft. For example, the package 1004 may hang from the fuselage of the aircraft. In some examples, the package 1004 may be connected to one or more inflatable fairings 1016. The inflatable fairings 1016 may comprise cloth and/or other inflatable materials. The aircraft may include one or more fans configured to selectively inflate and deflate (e.g., collapse) the inflatable fairings 1016 (e.g., a respective fan for each one of the inflatable fairings). For example, the inflatable fairings 1016 may be deflated such that they collapse against the fuselage when a package 1004 is not attached to the aircraft, improving aerodynamics. The inflatable fairings 1016 may be inflated to secure and protect the package 1004. It should be understood that, although FIG. 11 depicts the inflatable fairings 1016 attached to an aircraft with one or more rotors 1018, the inflatable fairings may similarly be attached to an aircraft without rotors 1018 (e.g., aircraft 600, as described herein).

Referring again to FIG. 10, the aircraft 600 may comprise a winch 1010. The winch 1010 may be used to load and unload the package 1004. The aircraft 600 may comprise a parachute 1012. The parachute 1012 may be attached to or otherwise integrated with the package 1004. The parachute may be controlled by the avionics suite 1002 to deploy or deliver the package 1004. For example, the avionics suite 1002 may cause the parachute to deploy to safely drop the package 1004 from the aircraft 600. Also or alternatively, a parachute 1012 may be attached to the fuselage of the aircraft 600. For example, the parachute 1012 may be attached to the fuselage such that, when deployed, the parachute supports the weight of the aircraft 600 to allow for safe recovery of the aircraft in an emergency. For example, the avionics suite 1002 may deploy the parachute 1012 when an emergency hampering or preventing flight of the aircraft 600 is detected during a flight or hover mode.

The aircraft 600 may comprise one or more cameras 1014. The cameras 1014 may be integrated with the avionics suite 1002 to provide information relevant to operation of the aircraft 600. The cameras 1014 may be fastened to an outer surface of the aircraft 600 (e.g., the fuselage 601, a terminal end of a main wing assembly 605, a terminal end of an integrated array of ducted fans 603, and/or other outer surfaces of the aircraft 600 as described herein). Also or alternatively, cameras 1014 may be located within the fuselage of the aircraft 600 and positioned to observe an area outside of the aircraft 600. A camera 1014 may be a complementary metal-oxide semiconductor (CMOS) camera, a stereo camera, an artificial intelligence/machine learning camera, and/or other types of camera. The camera 1014 may gather observational information used for guiding precision landing, obstacle avoidance, forward flight visibility, emergency landing zone detection, recognition of package delivery, in-flight navigation, and/or other functions. For example, the camera 1014 may be a CMOS camera used to relay observational information to one or more controllers and guide the aircraft 600 in a precision landing. The camera 1014 may be a stereo camera located on a terminal end of the wing assembly 605 and configured to provide observational information to a pilot or controller of the aircraft 600 in order to assist with object avoidance/detection, forward flight visibility, and/or detection of an emergency landing zone. The camera 1014 may be comprise an integrated artificial intelligence/machine learning model trained to verify successful package delivery. For example, the model may be trained to identify, based on observational information provided by the camera, whether a package 1004 was delivered to a target area, address, person, or the like. In some examples, the camera 1014 may compress and stream video or images to deliver the observational information to the avionics suite 1002, a remote observation post, and/or other destinations.

As described herein, an aircraft may comprise an integrated array of ducted fans. As shown by way of example in FIGS. 12-16, the aircraft includes at least one flap with an articulatable edge that can be articulated to modify a respective exhaust area of each ducted fan included in the integrated array (e.g., resulting in increasing or decreasing air flow) and simultaneously or near-simultaneously direct air flow by controlling flow-turning, such as by using the Coanda effect. For example, the articulatable edge may be articulated to selectively control flow turning and deflect air flow from a propulsor of a ducted fan or an array of ducted fans by as much as 180 degrees in some embodiments. An articulatable edge, in some examples, may extend along an entire length of the integrated array of ducted fans. In these examples, a respective portion of the articulatable edge corresponds to one of the ducted fans of the integrated array. In some examples, an aircraft may include multiple articulatable edges, for example, one articulatable edge for each ducted fan of the integrated array. In these examples, the respective articulatable edge may extend across the length of its respective ducted fan. In these examples, the articulatable edge of an individual ducted fan may be independently articulated to modify the individual exhaust area and control the flow turning of the individual air flow generated (e.g., propelled) by the ducted fan and/or may be collectively articulated to modify the collective exhaust area of the integrated array of ducted fans and control the flow turning of the collective air flow generated by the integrated array.

Figure 12:
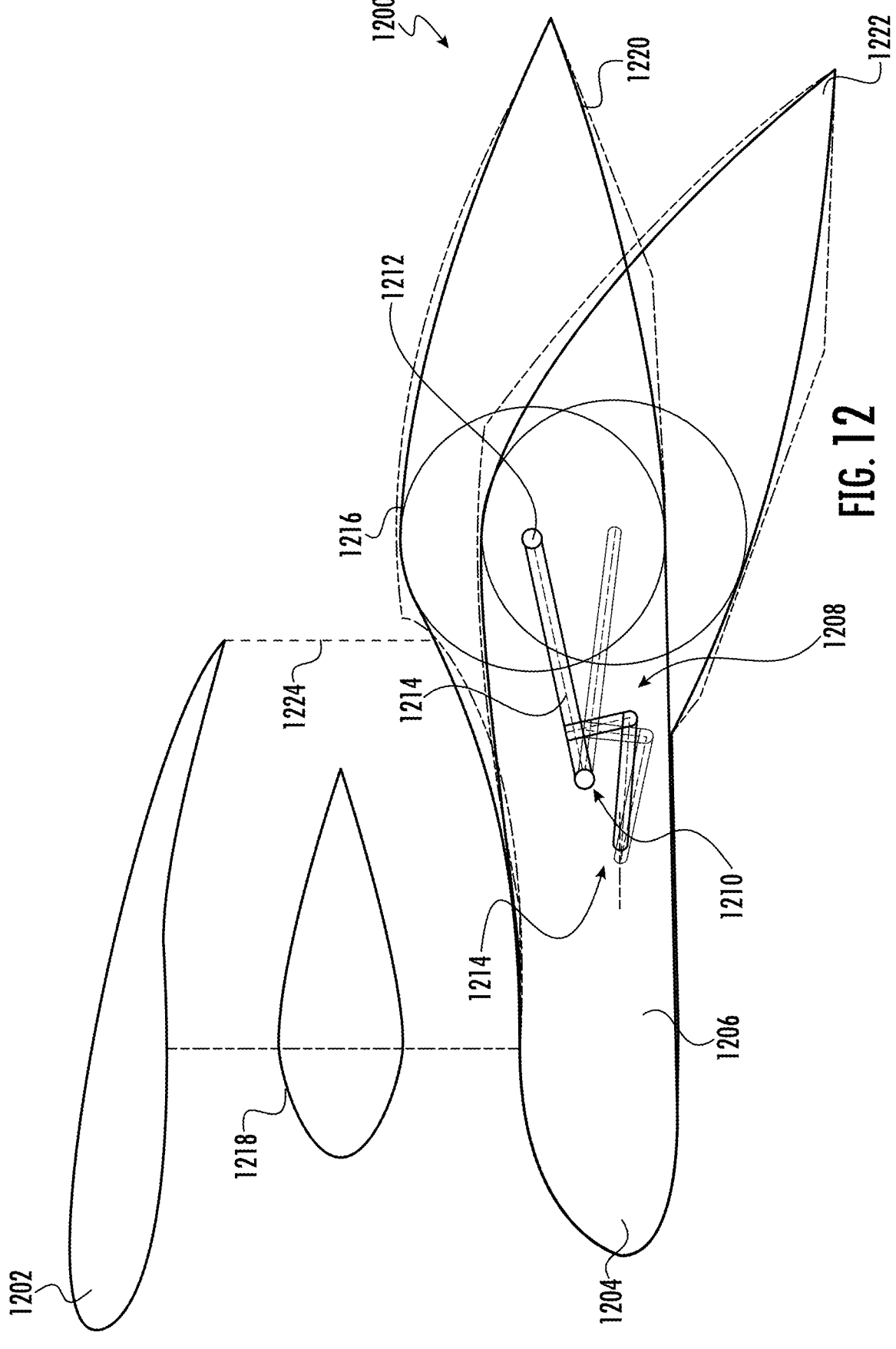
FIG. 12 is a diagram of a side cross-sectional view of an example jetfoil illustrating an example of a first articulated position of the jetfoil and an example of a second articulated position of the jetfoil according to one or more example arrangements.

FIGS. 12-16 show cross-sectional side views of an example jetfoil (e.g., comprising an integrated array of ducted fans) with an articulatable edge 1200 that may be used in certain implementations. Referring to FIG. 12, the articulatable edge 1200 may be connected at the trailing edge of a ducted fan comprising an upper surface portion 1202, a lower surface portion 1204, a leading edge 1206, a control assembly 1208, and a propulsor 1218. The articulatable edge 1200 may be and/or include a portion of a single articulatable edge of an integrated array of ducted fans as described herein. In some examples, the articulatable edge 1200 may include a linkage (e.g., a number of connected bars, hinges, and/or other mechanical components) configured to secure the articulatable edge 1200 to the lower surface portion 1204. The linkage may be included in the control assembly 1208. The linkage may facilitate articulation the articulatable edge 1200, as described further herein. In some examples, the articulatable edge 1200 may include features that allow it to fail in place or fail safely. For example, the articulatable edge 1200 may include a number of redundant linkages to reduce the risk of a single point of failure disabling the ducted fan and/or the aircraft. The propulsor 1218 may be or comprise an electric bladed fan. For example, propulsor 1218 may comprise an electrically-powered bladed disk configured to generate thrust. The bladed disk may, in some examples, have a diameter less than three inches. The propulsor 1218 may be characterized by BPF at or near an ultrasonic frequency. In some examples, the propulsor 1218 may have a diameter of three inches or less, providing reduced noise during operation of the aircraft. In some examples, the propulsor 1218 may be constructed from a material that is flexible with appropriate stiffness to accommodate an aerodynamic shape for the forward flight mode, the hover mode, VTOL mode, CTOL mode, STOL mode, and/or other modes of operation of an aircraft as described herein. The propulsor 1218 may be positioned in a duct of the ducted fan (e.g., between the upper surface portion 1202 and the lower surface portion 1204). The propulsor 1218 may define, rearward (aft) from the nose of the propulsor 1218, an exhaust area where air flow from the propulsor 1218 contacts the upper surface portion 1202 and/or the lower surface portion 1204. As described herein, the term exhaust area may refer to the point, plane, or the like at a longitudinal position, downstream of a propulsor (e.g., propulsor 1218) at which the distance between an upper surface (e.g., the upper surface portion 1202) and a lower surface (e.g., lower surface portion 1204) defining the region/zone/area downstream of the propulsor is measured. For example, the exhaust area may refer to exhaust area 1224 as shown in FIG. 12. The upper surface portion 1202 has a curvature designed to produce thrust and direct flow turning. The upper surface portion 1202 may protrude slightly ahead of the leading edge 1206 of the lower surface portion 1204 to aid in inflow conditions throughout transition between flight modes (e.g., forward flight, VTOL, and/or other modes). The lower surface portion 1204 has a curvature designed to produce thrust and direct flow turning. The lower surface portion 1204 comprises the articulatable edge 1200 and a leading edge 1206. The leading edge 1206 is fixed in a stationary position relative to the articulatable edge 1200.

The control assembly 1208 is configured to cause articulation of the articulatable edge 1200. In some examples, the articulatable edge 1200 of a single ducted fan may be a portion of a single articulatable edge of an integrated array of ducted fans. In these examples, the control assembly 1208 may control articulation of the articulatable edge 1200 by articulating the single articulatable edge of an integrated array of ducted fans, causing articulation of the respective articulatable edges 1200 of each ducted fan in the array. The control assembly 1208 may include a communication interface, receiver, or the like configured to receive (e.g., from a remote drone control device, from an avionics suite, from a cockpit control device, and/or from other sources) control signals (e.g., electrical signals, electromechanical signals, or the like) directing the control assembly to articulate the articulatable edge. The control assembly 1208 may articulate the articulatable edge 1200 to modify (e.g., change, vary, reduce, increase, and/or otherwise modify) a cross-sectional exhaust area of the propulsor 1218. The control assembly 1208, by articulating the articulatable edge 1200, also causes modification of the flow turning (e.g., by directing the flow of air caused by the ducted fan). For example, articulating the articulatable edge 1200 allows the ducted fan to utilize the Coanda effect of air flow blown over the upper surface portion 1202 to turn the flow of air downstream of the ducted fan. In some examples, the control assembly 1208 may control flow turning of air flow of an entire integrated array of ducted fans by articulating the single articulatable edge of the integrated array, thereby articulating the respective articulatable edges 1200 of each ducted fan in the integrated array.

As described in further detail below, the control assembly 1208 links modification of the cross-sectional exhaust area of the propulsor 1218 with modification of flow turning (e.g., by modifying a direction of air flow produced by the propulsor 1218 and/or by the ducted fan). By articulating the articulatable edge 1200, the control assembly 1208 simultaneously provides the modification of the cross-sectional exhaust area and the control over the flow turning described herein in a single movement or operation of the articulatable edge 1200. Thus, the use of the articulatable edge 1200 reduces design complexity, reduces a number of possible points of failure in aircraft design, and allows the ducted fan to operate at its peak efficiency over various operating conditions by combining actuation of the articulatable edge 1200 for flow turning control with modification of the exhaust area of the propulsor 1218. Additionally, the use of the articulatable edge 1200 provides efficient transition of the aircraft between flight modes (e.g., forward flight, VTOL, CTOL, STOL, hover mode, and/or other modes). For example, the control assembly 1208 may articulate the articulatable edge 1200 between a first position for causing forward flight of the aircraft and a second position for causing vertical liftoff (e.g., in a VTOL mode) of the aircraft. For example, the control assembly 1208 may articulate the articulatable edge 1200 to cause simultaneous modification of the exhaust area and of the flow turning of an integrated array of ducted fans and/or an individual ducted fan. The articulation may cause the integrated array of ducted fans and/or the individual ducted fan to transition between providing forward thrust and providing vertical lift relative to the ground based on the size of the exhaust area and the angle of the flow turning. Integrating the ducted fan with articulatable edge 1200 into an array of similar ducted fans as described herein allows for control of flow turning over a majority (e.g., 80% or more) of the upper surface of a wing of the aircraft, which reduces drag penalties and allows for extended flight durations and improved control of the aircraft during flight.

It should be understood that the first and second positions described above are merely examples and that the articulatable edge 1200 may be articulated to occupy additional or alternative positions. For example, the articulatable edge 1200 may be articulated to control flow turning (e.g., by deflect exhaust flow) to achieve an optimal angle for a VTOL mode (e.g., preferably 90 degrees) relative to the ducted fan, to partially deflect exhaust flow for a STOL mode, and/or to enable a CTOL mode by providing minimal or no articulation of the articulatable edge 1200 relative to a horizontal of the ducted fan. Articulation of the articulatable edge 1200 as described herein provides additional benefits over conventional wing-borne aircraft because no mechanical change of the pitch of rotor blades is required. Accordingly, the risk of exceeding desired noise levels is reduced or eliminated by utilization of the methods described herein. Additionally, by providing exhaust area and flow-turning control using a single articulatable edge 1200, the need for multiple different actuators in systems that utilize a number of articulatable edges is eliminated. Accordingly, the jetfoil comprising an array of integrated ducted fans with a single articulatable edge as depicted in FIGS. 12 to 16 provides savings in construction costs and reduces the weight of the aircraft, extending flight duration and/or increasing the maximum payload weight that might be carried by the aircraft.

In some examples, the control assembly 1208 may comprise components configured to pivot the articulatable edge 1200 about a number of pivot points. For example, the control assembly 1208 may comprise a bar configured to pivot the articulatable edge 1200 of an integrated array of ducted fans and/or of a ducted fan relative to at least one pivot point, at least one actuator configured to drive the bar, and a linkage assembly connecting the articulatable edge to a fixed position (e.g., the leading edge 1206). For example, the control assembly 1208 may include pivot points 1210 and 1212 and a bar 1214. The pivot points 1210 and 1212 and bar 1214 may together, with one or more connecting elements (e.g., hinges, mechanical arms, bars, or the like), form the linkage assembly linking the articulatable edge 1200 to the leading edge 1206 of the lower surface portion 1204 of the ducted fan. The control assembly 1208 may comprise one or more additional internal components (e.g., electronics, motors and/or other actuators, or the like) configured to articulate the articulatable edge 1200 as described herein.

In operation, the control assembly 1208 may move (e.g., translate) the bar 1214, causing the articulatable edge 1200 to rotate about a flap angle pivot point 1212, which may cause an arc 1216 of the articulatable edge 1200 to move toward or away from a center of the exhaust area of the propulsor 1218. By moving the arc 1216 of the articulatable edge 1200 the control assembly 1208 may modify the exhaust area. For example, moving the arc 1216 toward and/or into the center of the exhaust area (e.g., to a first position 1220) may decrease a cross-sectional area of the exhaust area and/or otherwise changes a shape of the cross-sectional area. Similarly, moving the arc 1216 downward away from, and/or extending away from, the center of the exhaust area (e.g., to a second position 1222) may increase a cross-sectional area of the exhaust area and/or otherwise change a shape of the cross-sectional area. The two positions 1220 and 1222 depicted in FIG. 12 may be the maximum (extreme) positions of the articulatable edge 1200. The bar 1214 may be moved (e.g., translated) about a pivot point 1210 in a first direction to cause the arc 1216 to decrease the cross-sectional area of the exhaust area and the bar 1214 may be moved (e.g., translated) about the pivot point 1210 in a second direction to cause the arc 1216 to increase the cross-sectional area of the exhaust area. Thus, pivot point 1210 may be referred to as a flap-arc translation pivot point (e.g., as seen in FIG. 12). Pivot point 1210 may be located at the center of a cross-sectional area (e.g., a circular cross-sectional area) of the root of the articulatable edge 1200 (e.g., the location where the articulatable edge 1200 meets the leading edge 1206). The arc 1216 of the articulatable edge 1200, in this example, is defined via the contour of the articulatable trailing edge. As seen in FIG. 12 and moving in an aftward direction, the articulatable edge 1200, in this example, tapers upward near the exhaust area of the propulsor 1218 until it reaches a peak of the arc 1216 at which point the articulatable edge tapers downward toward the end of the articulatable edge. Put differently, the top-to-bottom thickness of the articulatable edge 1200 may increase from the exhaust area of the propulsor 1218 to the peak of the arc 1216 where the thickness of the articulatable edge is maximal and then decrease from the peak of the arc to the end of the articulatable edge. As described herein, moving the articulatable edge 1200 may position the peak of the arc 1216 within (or closer to) the exhaust area of the propulsor 1218 (e.g., a center of the exhaust area) or outside (or further from) the exhaust area thereby modifying the exhaust area by changing its shape and/or dimensions.

In some examples, using the control assembly 1208 to articulate the articulatable edge 1200 achieves one or more additional effects. For example, in addition to modifying the cross-sectional area of the exhaust area, articulating the articulatable edge 1200 also controls flow turning as described herein (e.g., by modifying the angle at which air flow from the propulsor 1218 turns over the articulatable edge 1200). Controlling a single articulatable edge 1200 of a ducted fan or of an integrated array of ducted fans as described herein thus beneficially provides the dual effects of controlling the cross-sectional area of the exhaust area and of controlling flow turning via a single operation. For example, by articulating the single articulatable edge 1200 of an array of integrated ducted fans to move from a first position to a second position, simultaneous modification of the cross-sectional area of the exhaust area and control over the flow turning provided by the integrated array of ducted fans is achieved. The features described herein thus provide a high level of control over the flight of an aircraft while minimizing the number of components (and associated risks and costs) required to achieve that level of control.

Figure 13:
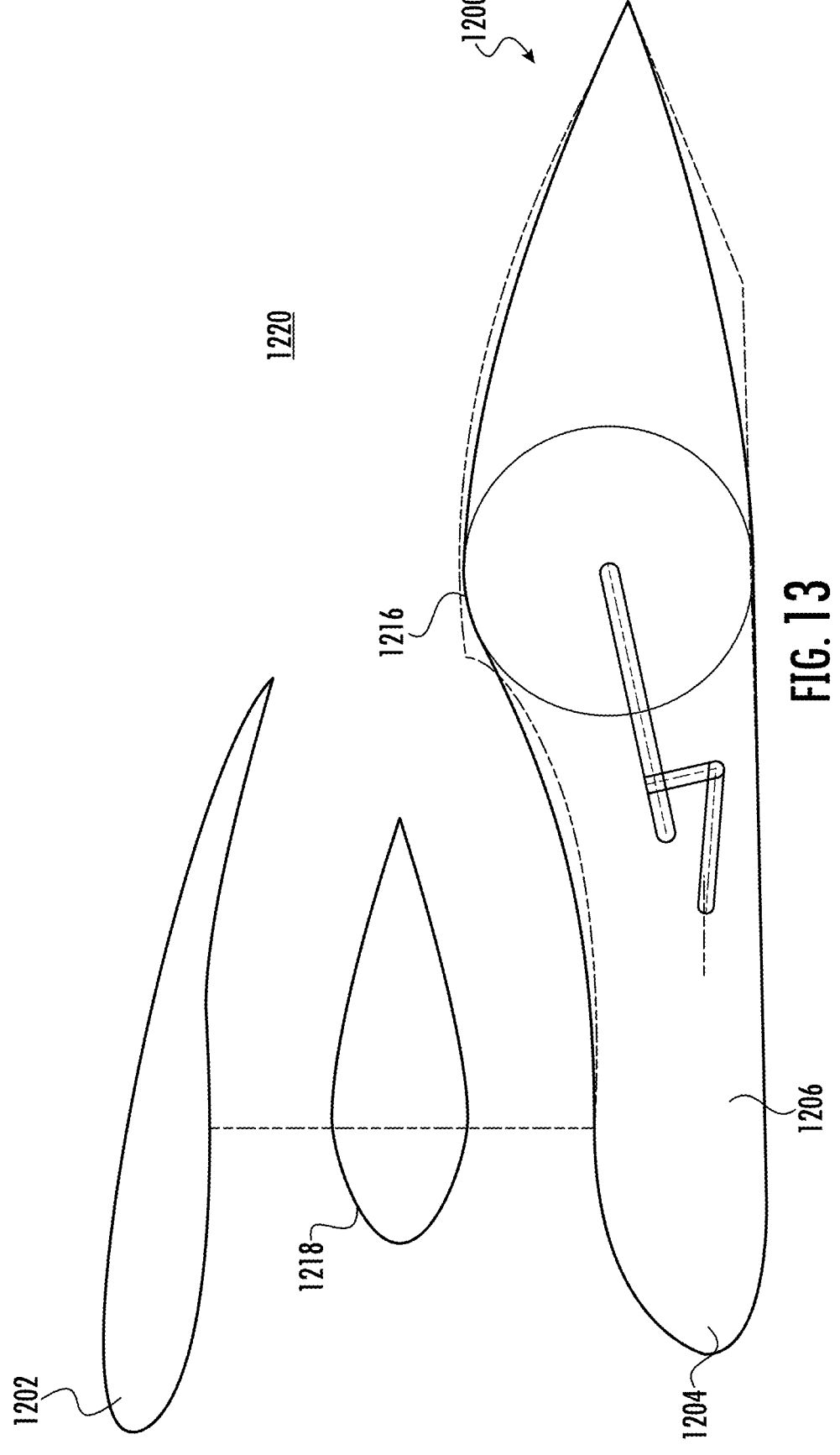
FIG. 13 is a diagram of a side cross-sectional view of a ducted fan illustrating an example of an articulated position of the jetfoil flap according to one or more example arrangements.

FIG. 13 is a diagram of a side cross-sectional view of a jetfoil flap illustrating an example of an articulated position of the ducted fan. First position 1220, as depicted in FIG. 13, may be used for a forward flight mode of operation. The first position 1220 may be achieved by sending a control signal to the control assembly of the ducted fan, and/or of an integrated array of ducted fans including the ducted fan, instructing the articulatable edge 1200 to decrease a cross-sectional area of the exhaust area. The first position 1220 of the articulated edge 1200 of the jetfoil flap may decrease a cross-sectional area of the exhaust area by moving the arc 1216 of the articulated edge 1200 upwardly into, or toward, the exhaust area, thereby changing the shape and dimensions of the exhaust area. The first position 1220 of the articulatable edge 1200 may reduce flow turning (e.g., to increase a speed of the aircraft and provide forward thrust) by decreasing a turning of the air flow over, or around, the articulatable edge 1200.

Figure 14:
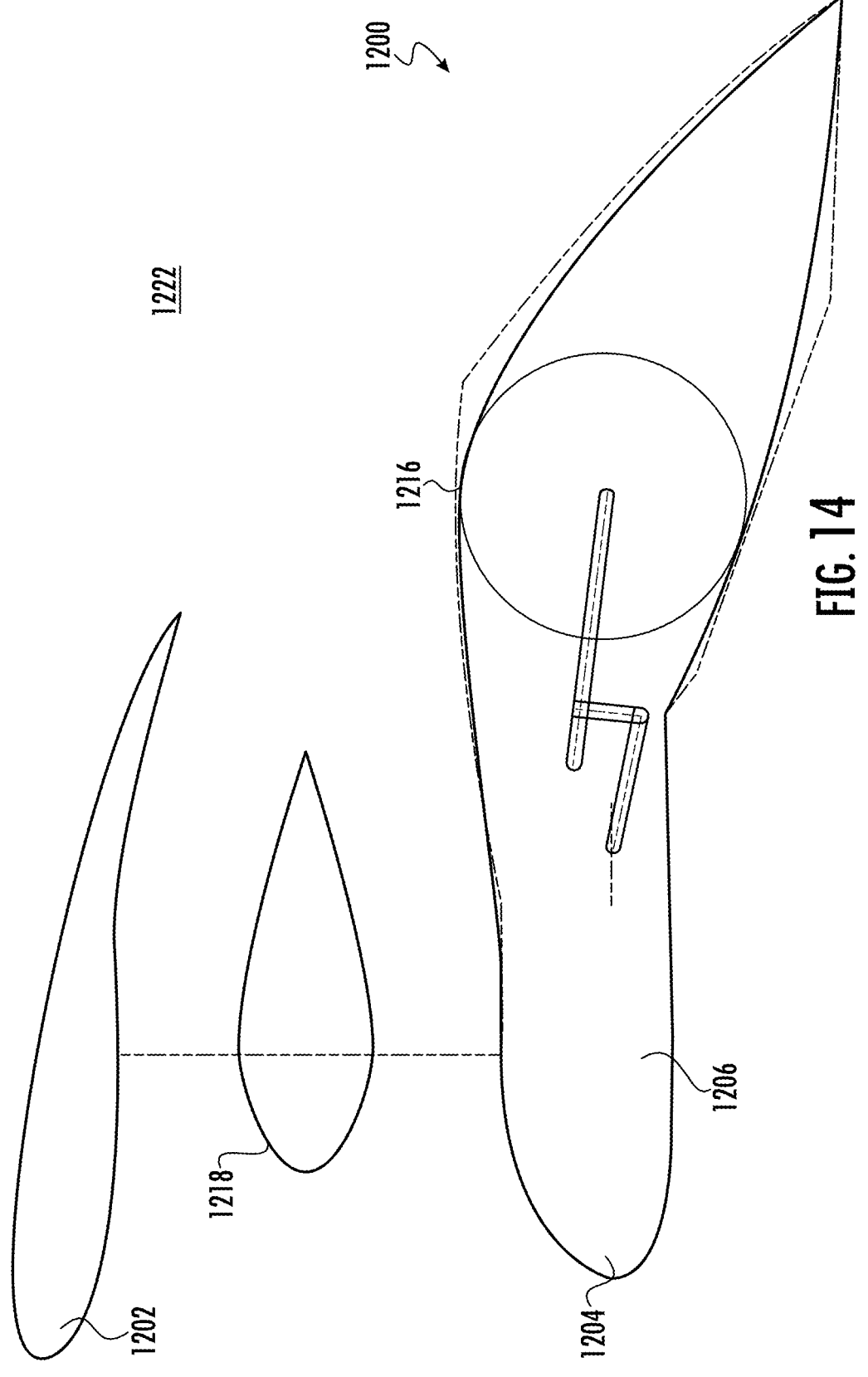
FIG. 14 is a diagram of a side cross-sectional view of a ducted fan illustrating an example of an articulated position of the jetfoil flap according to one or more example arrangements.

FIG. 14 is a diagram of a side cross-sectional view of a jetfoil flap illustrating an example of an articulated position of the ducted fan. Second position 1222, as depicted in FIG. 14, may be used for a hover mode of operation. The second position 1222 may be achieved by sending a control signal to the control assembly of the jetfoil flap instructing the articulatable edge 1200 to increase a cross-sectional area of the exhaust area. The second position 1222 may increase a cross-sectional area of the exhaust area by moving the arc 1216 of the articulated edge 1200 downwardly away from, or extending away from, the exhaust area, thereby changing the shape and dimensions of the exhaust area. The second position 1222 may increase flow turning over, or around, the articulatable edge 1200 to provide thrust vectoring (e.g., such that vertical lift is provided to an aircraft to maintain a hovering position).

Figure 15:
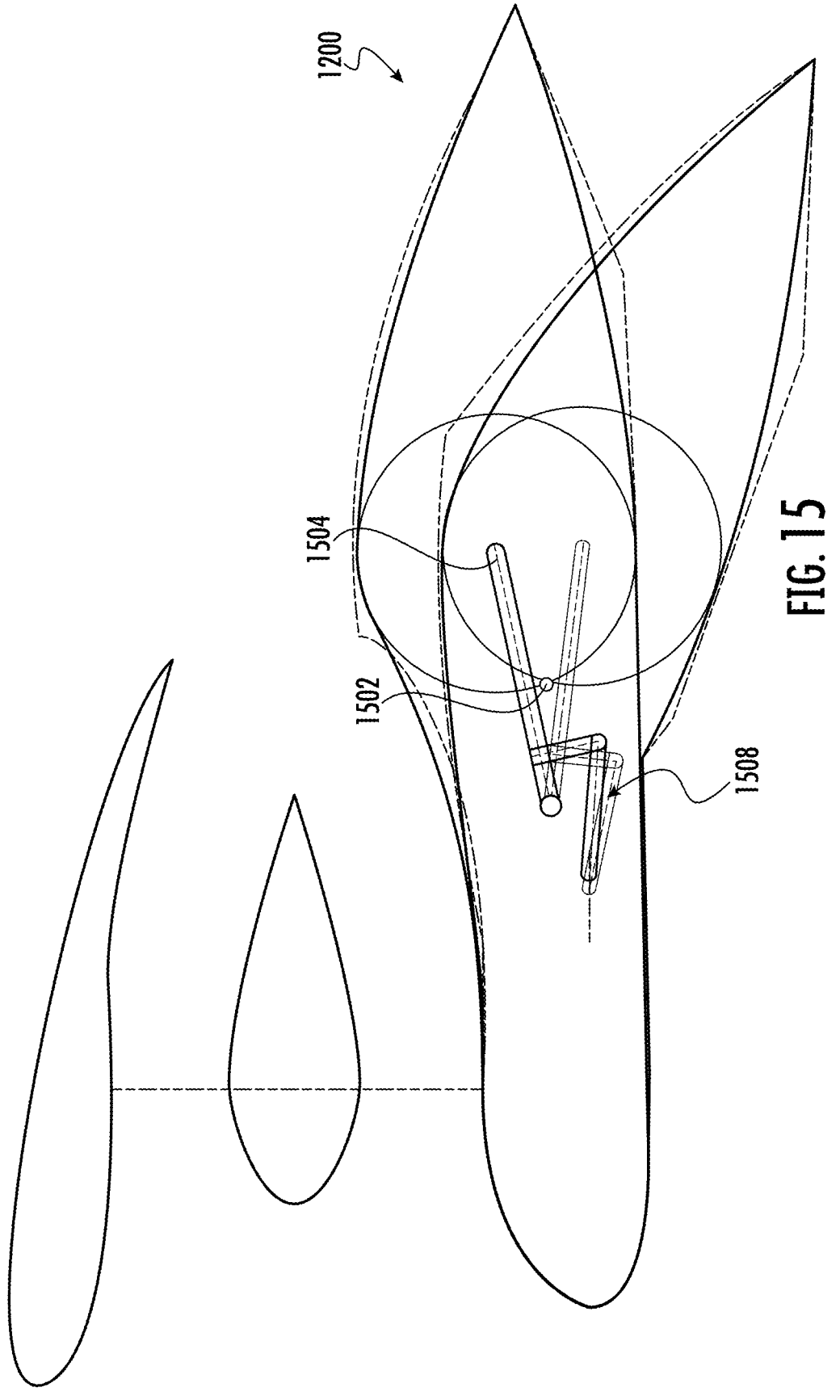
FIG. 15 is a diagram of a side cross-sectional view of a ducted fan illustrating an example of a first articulated position of the jetfoil flap and an example of a second articulated position of the jetfoil flap according to one or more example arrangements.

It should be understood that additional or alternative configurations of the control assembly 1208 are included within the scope of this disclosure. For example, an alternative configuration of control assembly 1208 corresponds to FIG. 15. FIG. 15 is a diagram of a side cross-sectional view of a jetfoil flap illustrating an example of a first articulated position of the jetfoil flap and an example of a second articulated position of the ducted fan. In FIG. 15, the articulatable edge 1200 (e.g., as described in FIGS. 12 to 14) is controlled by a control assembly 1508 comprising a pin 1502 and an actuator bar 1504. The pin 1502 defines a rotation point for a circular cross section of the root of the articulatable edge 1500. Rotation of an angle of the articulatable edge 1200 is thus controlled by the pin 1502 deflecting the actuator bar 1504. The actuator bar 1504 is moved by one or more components (e.g., motors, or the like) of the control assembly 1508. During movement, the pin 1502 deflects movement of the actuator bar 1504 to achieve a desired position of the articulatable edge 1200. The pin 1502 thus couples the arc translation and flap angle rotation described with respect to FIG. 12 into a single element. However, in some examples, a second actuator may be used to control the flap angle separate from the arc translation.

Figure 16:
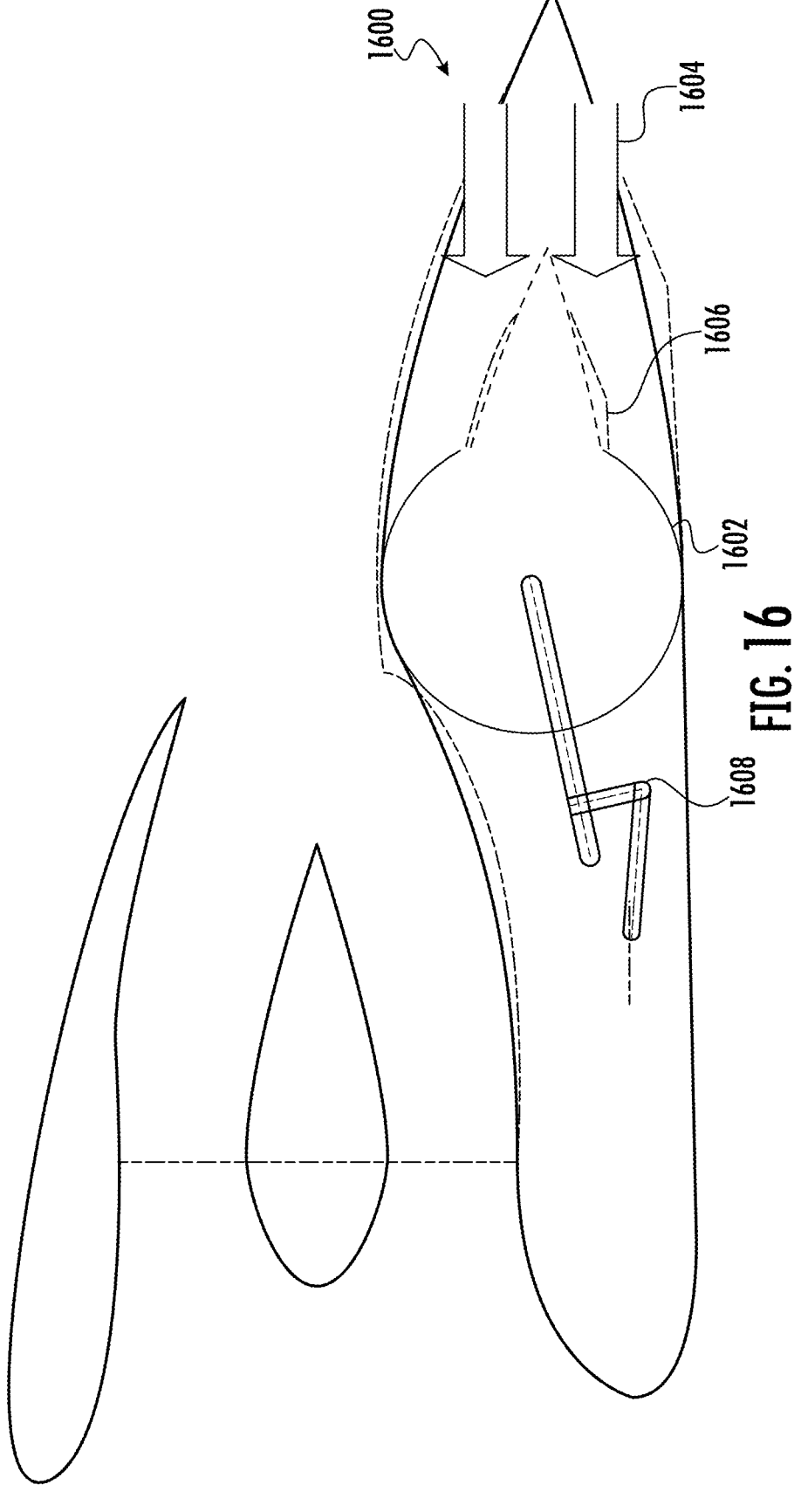
FIG. 16 is a diagram of a side cross-sectional view of a ducted fan illustrating an example of a first articulated position of the jetfoil flap and an example of a second articulated position of the ducted fan according to one or more example arrangements.

In another example, a control assembly may comprise components designed to retract and extend a movable edge as an alternative or as an addition to pivoting a movable trailing edge about one or more pivot points. FIG. 16 provides an example of a movable edge 1600 that is configured to both articulate as well as extend and retract. FIG. 16 is a diagram of a side cross-sectional view of a jetfoil flap illustrating an example of a first articulated position of the ducted fan and an example of a second articulated position of the ducted fan. Referring the FIG. 16, a control assembly 1608 may include a single actuator component (e.g., a motor, or the like) for extending and retracting the movable edge 1600. A retraction element 1602 is positioned at a terminal end of the movable edge 1600. The retraction element 1602 may be or comprise a portion of the jetfoil with an opening, inlet, or the like configured to receive the movable edge 1600 as the movable edge retracts. Though FIG. 16 depicts the retraction element 1602 within a circular region it should be understood that the retraction element 1602 may have any shape or configuration capable of receiving the movable edge 1600 as the movable edge retracts without departing from the scope of this disclosure. Additionally, it should be understood that in examples where the movable edge 1600 of the jetfoil flap is a portion of a single movable edge of an integrated array of ducted fans, the retraction element 1602 may extend, cover, and/or otherwise span a length of the single movable edge of the integrated array of ducted fans. In these examples, the entirety of the single movable edge of the integrated array of ducted fans may be retracted into, and/or extend out from, the retraction element 1602 in a single operation.

In operation, the control assembly 1608 may cause an extended movable edge 1600 to retract into the retraction element 1602 in the direction of arrows 1604 to a retracted position 1606. The retracted position 1606 may be located at any position between a maximum (extreme) extendable position of the movable edge 1600 and a minimum extendable position of the movable edge 1600. For example, as shown in FIG. 16, the retracted position 1606 may leave a trailing portion of the movable edge 1600 extended such that flow turning is directed over the terminal end of movable edge 1600. It should be understood that the movable edge 1600 may be retracted in a horizontal direction (e.g., at an angle of 180 degrees) as depicted by arrows 1604, yet in some examples the movable edge 1600 may be retracted at an angle other than 180 degrees (e.g., to control flow turning). Use of the control assembly 1608 to retract/extend the movable edge 1600 achieves all the same benefits of articulating the movable edge 1600 as described herein but without the need for additional actuator components (e.g., a translatable bar, a motor, and/or other actuator components). Thus, a control assembly 1608 configured to retract and extend the movable edge 1600 may further reduce or eliminate additional actuator weight in the aircraft, further extending flight duration of the aircraft and reducing construction costs.

Aircraft implementing one or more of the features described herein may be optimized for a variety of mission parameters such as maximum noise, flight distance, flight duration, payload weight, payload size, delivery time, aircraft weight, maximum speed, and/or other parameters. In some examples, an aircraft as described herein is configured to travel at a speed in the range of about 200-400 miles per hour (mph) (e.g., at least 200 mph, 300 mph, or 400 mph). In other examples, an aircraft as described herein is configured to travel at lower speeds, for example, in the range of about 50-80 mph (e.g., 75 mph). The aircraft may be configured for different flight speeds to optimize flight speed for a specific mission. For example, the aircraft may be a drone configured to travel at 75 mph to optimize the aircraft for package delivery.

In certain embodiments, the aircraft may be optimized for a hover time per flight. For example, the number of ducted fans may be increased or decreased to increase or decrease a maximum hover time per flight. In some examples, the aircraft may be a drone configured to hover for a duration in the range of about 2-3 minutes (e.g., about 2.25 minutes), which may optimize the aircraft for package delivery.

In certain embodiments, the aircraft may be optimized for total weight. In one embodiment, the vehicle may weigh about 3,000-4,000 lbm (pound mass), 4,000-5,000 lbm, or 3,500-4,000 lbm, in other embodiments in may weigh 4,500-5,500 lbm, in yet further embodiments it may weigh 4,200, 4,500, 4,700, 5,000, or 5,200 lbm as some examples. In certain embodiments, the aircraft may be configured for lower total weights (e.g., 55 lbm or less). For example, the aircraft may be a drone configured to comply with a total weight constraint of 55 lbm, which may optimize the aircraft for package delivery.

In certain embodiments, the aircraft may be optimized for payload capabilities. In one embodiment, the payload capabilities may range from 800-1,000 lbm, 1,000-1,200 lbm, or 1,200-1,400 lbm in certain embodiments, and yet further embodiments may be about 850 lbm, 900 lbm, 950 lbm, 1000 lbm, 1050 lbm, 1,100 lbm, 1,150 lbm, 1,200 lbm, or 1,250 lbm. In certain embodiments, the aircraft may be configured for lower payload capabilities (e.g., 0-10 lbm). For example, the aircraft may be a drone configured to carry a payload (e.g., a package, as described herein) weighing between 0-10 lbm to optimize the aircraft for package delivery. To optimize for weight and/or payload capabilities, a volume of the fuselage may be adjusted. For example, the fuselage may be adjusted to a volume optimized for package delivery (e.g., 4-5 cubic feet (cu. ft.), 3.65 cu. ft.)

In certain embodiments, the aircraft may be optimized to reduce noise generated by operation of the aircraft. In one example, the aircraft may implement a number of ducted fans or integrated arrays of ducted fans as described herein such that the aircraft is inaudible to a human at around 800-1,000 feet, 1,200-1,400 feet, 2,500-2,600 feet, and/or other ranges depending on the configuration of the ducted fans. In certain embodiments, the aircraft may be characterized by dominant tones at about 35-50 A-weighted decibels (dB (A)) at 100 feet, 35-40 dB (A) at 100 feet, 40-45 dB (A) at 100 feet, or 40-50 dB (A) at 100 feet. In certain embodiments, the aircraft may be configured to remain at or below 40 dB (A) to avoid acoustic detection in certain environments (e.g., a suburban environment). In some examples, the aircraft may be configured to remain at or below 40 dB (A) in a particular mode (e.g., a hover mode) and/or at a particular vertical distance (e.g., 60 feet). In some examples, the aircraft may be configured such that the ducted fans result in a 25-30 dB (A) reduction in overall sound pressure level relative to known aircraft. Optimizing the aircraft to reduce noise using the features described herein provides a number of benefits over conventional aircraft. For example, a drone aircraft implementing ducted fans as described herein provides an increased number of delivery operations enabled through the reduction in noise (e.g., acoustic levels). For example, the reduced noise may allow the drone aircraft to comply with federal regulations, state regulations, and/or municipal regulations, to operate in urban or suburban environments.

It should be understood that aircraft as described herein may be optimized for a plurality of the parameters described above, and/or different parameters, without departing from the scope of this disclosure. For example, an aircraft as described herein may be optimized for a roundtrip flight range between 30-110 miles, carrying a payload weight between 0-10 lbm, and achieving a flight speed between 60-100 mph. In another example, an aircraft as described herein may be optimized for a roundtrip flight time between 0.3-1.6 hours, carrying a payload weight of 0-10 lbm, and achieving a flight speed between 60-100 mph.

Figure 17:
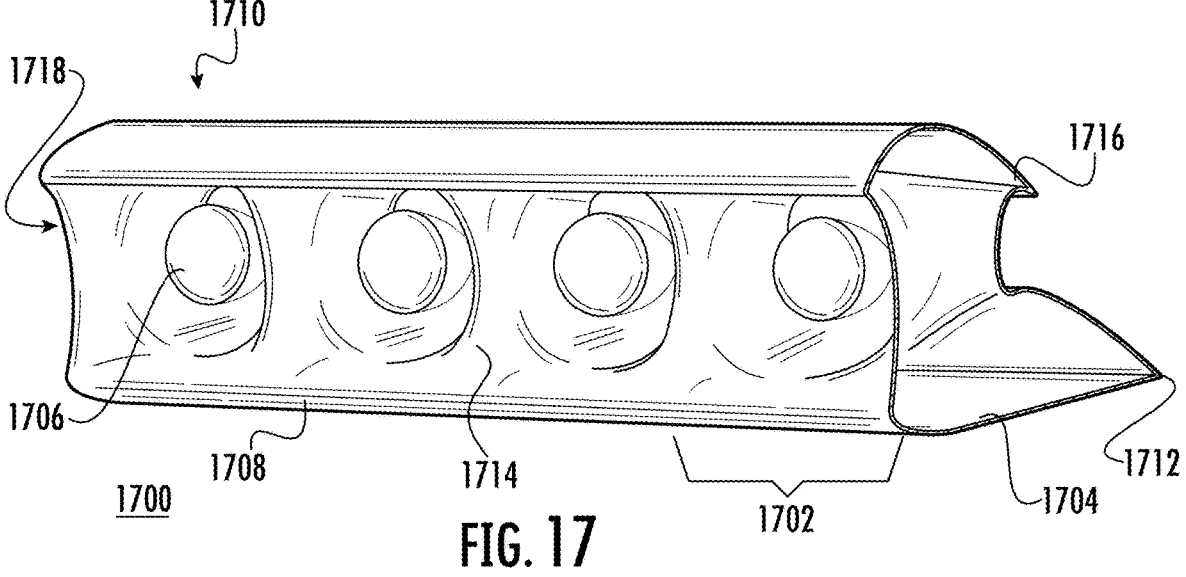
FIG. 17 illustrates an example array of propulsors according to one or more example arrangements.

FIG. 17 illustrates an example array of propulsors 1700 according to one or more example arrangements. As described herein, an array of propulsors may comprise any quantity of integrated propulsors 1702 (which in certain embodiments may comprise ducted fans) configured to produce thrust (e.g., by directing air flow) during operation of an aircraft. For example, the array of propulsors 1700 may comprise three or more individual propulsors 1702. In certain embodiments, the array of propulsors 1700 may comprise any quantity of propulsors 1702 required to generate an adequate flow field (e.g., a uniform or near-uniform two-dimensional exhaust sheet) downstream of the array of propulsors 1700. In certain embodiments, an array of propulsors 1700 may comprise a quantity of ducted fans, which may be driven by an electric motor, an engine, a hybrid system, and/or hydrogen energy, amongst others, designed to achieve a uniform or near-uniform exhaust flow downstream of an exhaust area extending from an aft or rear end of the array. In these examples, each of the propulsors (e.g., electric ducted fans) may also be designed to allow for optimization of flow turning as described herein. Thus, the array of propulsors 1700 may enable movement of a single trailing edge (e.g., 1712) shared by a plurality of propulsors, such as all depicted propulsors 1702 in the array of propulsors 1700, to control flow turning of the entire array. Certain embodiments relate to a novel jetfoil, in which the intakes of a plurality of propulsors are positioned such that the intakes are integrated into the leading edge of an airfoil (such as a wing, tail, and/or other airfoil) and the propulsors' exhausts provide exhaust over a surface of the airfoil.

Use of an array of propulsors (e.g., ducted fans) as part of an airfoil structure (e.g., a jetfoil, as described herein), with intakes at the leading edge of an airfoil provides benefits over prior art methods of achieving thrust, such as conventional propellers, by reducing or eliminating sawtooth or seesaw air flow effects associated with such conventional methods. The array of propulsors may be positioned above a surface of an airfoil (e.g., positioned on an upper surface and above a bottom surface of a wing, tail, or other airfoil of an aircraft) and at the leading edge of the airfoil. The position of the array of propulsors minimizes boundary layer buildup that is ingested into conventional propulsion systems located away from the leading edge of the airfoil. The surface of the airfoil may shield ground observers from jet noise generated by the array of propulsors, reducing the total noise generated during operation of an aircraft as described herein.

Conventional methods of placing propulsion systems such as turbines within independent nacelles that are separated from each other are incapable of producing a uniform sheet of exhaust flow as described herein. The use of an array of propulsors as described herein, integrated into an airfoil above a surface of the airfoil and at a leading edge, produces the uniform sheet based in part on the reduced total wetted area of the propulsion system relative to conventional propulsion systems within independent nacelles that are separated from each other. Additionally, it has been attempted to direct thrust using thrust generating mechanisms within housings or nacelles attached to fuselages of a craft. In recent attempts, such nacelles were rotated along an axis to provide a change in thrust direction. Such attempts require the addition of heavy articulating mechanisms that are prone to break as well as pose other safety issues when the articulating members fail.

In certain embodiments, the array of propulsors 1700 is integrated into a component (such as an airfoil, e.g., a wing, a tail, or the like) of an aircraft as described herein. For example, each propulsor 1702 of the array of propulsors may be positioned and/or aligned above (e.g., along/on an upper portion of) a bottom surface 1704 of a wing, tail, or other airfoil of an aircraft. By aligning the array of propulsors above the bottom surface, noise from the array of propulsors is prevented from traveling straight down, reducing an amount of noise produced by the aircraft during operation that can be detected from the ground. The array of propulsors may also be integrated within the wing, tail, or other airfoil of the aircraft. For example, as shown in FIG. 17, the array of propulsors may be positioned between the bottom surface 1704 (e.g., a first portion of the airfoil) and a top surface 1710 (e.g., a second portion of the airfoil). By integrating the array of propulsors 1700 within the airfoil of an aircraft as shown, above at least a portion (e.g., bottom surface 1704) of the airfoil, an exhaust area downstream of the integrated array of propulsors may be formed between the bottom surface 1704 and the top surface 1710. The array of propulsors may define the exhaust area. Integrating the array of propulsors 1700 into an airfoil of an aircraft provides advantages over conventional propulsion systems that may attach a propulsor solely to the top portion or bottom portion of an airfoil. For example, using configurations described herein, the exhaust area of the array of propulsors 1700 may be modified (e.g., by movement or articulation of the trailing edge 1712 as described herein) to achieve the uniform or near-uniform exhaust flow downstream of the exhaust area. For example, as described herein, in certain embodiments the trailing edge 1712 may be moved downwardly away from, or extending away from, the exhaust area, thereby changing the shape and dimensions of the exhaust area. The trailing edge 1712 may also be moved upwardly into, or toward, the exhaust area, thereby changing the shape and dimensions of the exhaust area. In some examples, the trailing edge 1712 may be moved by a single actuator (e.g., motor or the like), yet in other examples one or more additional actuators may be used. Also or alternatively, in certain embodiments, the exhaust area of the array of propulsors 1700 may be modified by articulation, transitioning, and/or other movement of a trailing edge of an upper surface 1716 of the array of propulsors 1700. For example, as described herein, in certain embodiments the trailing edge of the upper surface 1716 may be transitioned, deflected, articulated, or otherwise moved upwardly away from the trailing edge 1712 and/or downwardly towards the trailing edge 1712, thereby changing the shape and dimensions of the exhaust area (e.g., by changing the height of the exhaust area).

The array of propulsors 1700 may be positioned at and/or be a leading surface 1708 of a wing or tail of the aircraft. The array of propulsors 1700 may comprise a front portion 1706. In some examples, such as examples where the propulsors 1702 are ducted fans, the front portion 1706 may form a duct front that pulls in air from the leading surface 1708 during operation of the aircraft. Pulling in air from the leading surface 1708 of the front portion of the array of propulsors 1700 improves the quality of the air used by the array of propulsors 1700 to produce thrust because the air at the leading surface 1708 is free of contaminants that may be deflected from the wing itself. Positioning the array of propulsors 1700 both at the leading surface 1708 of a wing and/or within the wing itself thus allows for optimization of an amount of thrust generated while providing fine-tuned control over the exhaust flow, improving over conventional propulsion systems. As seen in FIG. 17 and described herein, the array of propulsors 1700 is integrated into the wing. For example, the leading surface 1708 of the wing merges and shares a continuous surface with the respective ducts of each propulsor 1702. Each propulsor 1702, in this example, also includes at least one vertical duct wall 1714 or structural component that may be shared with an adjacent propulsor of the array, such that the propulsors are arranged in a parallel fashion. The illustrated structure (vertical duct wall 1714) merges and may share a continuous surface with the leading surface 1708 and top surface 1710 of the wing. In some embodiments, a vertical duct wall 1714 at a terminal end 1718 of the array of propulsors 1700 may include and/or attach to an end wall (not shown) of the array of propulsors as described herein. Those skilled in the art with the benefit of this disclosure will appreciate that other configurations and arrangements may be used to integrate an array of propulsors into a wing or tail of an aircraft.

The array of propulsors 1700 may be aligned with a longitudinal axis of the aircraft, yet in some examples different configurations as described herein may be used. For example, the array of propulsors 1700 may be aligned at an offset angle to the longitudinal axis of the aircraft in order to produce increased lift during operation. An array, such as array of propulsors 1700, may be aligned with an axis that is substantially parallel to the leading and/or trailing edge of an airfoil. In some examples, the alignment of an array of propulsors may be fixed. The array of propulsors 1700 may occupy a substantial portion of a wing or tail of an aircraft. For example, the array of propulsors 1700 may occupy at least 80% of a wing or tail of the aircraft, at least 90% of a wing or tail of the aircraft, or substantially all a wing or tail of the aircraft. In some examples, the array of propulsors 1700 may occupy a length less than 2.5 meters (e.g., between 2.46 and 2.49 meters).

It should be understood the foregoing description is by way of example only, and is not limiting. For example, features of the example array of propulsors 1700 described above may be combined with features of the examples described with reference to, and depicted in, FIGS. 1A through 16 as described above. In particular and without limitation, the features directed to the configuration and arrangement of the integrated arrays of jetfoils and integrated arrays of ducted fans with respect to FIGS. 1A through 16 may be applied to or otherwise combined with the features of the array of propulsors 1700.

Elements of the array of propulsors 1700 may be modified, designed, and/or controlled to produce a uniform exhaust sheet across at least a plurality of the array of propulsors 1700 and, as a result, allow for improved control of flow turning. For example, the array of propulsors 1700 and/or each propulsor 1702 of the array of propulsors 1700 may utilize end walls, such as an end wall at terminal end 1718, designed to reduce, minimize, or prevent non-uniform air flow, producing a uniform two-dimensional or substantially two-dimensional exhaust sheet downstream of the array of propulsors 1700. As described herein, a uniform two-dimensional or substantially two-dimensional exhaust sheet refers to a sheet of air with a substantially uniform thickness. Put differently, the exhaust sheet produced by the flow turning control system described herein has a constant or near-constant thickness from one terminal end of the duct downstream of the fans, blades, or the like of the propulsors 1702 to the other terminal end. The uniform exhaust sheet as described herein additionally includes a uniform speed at which the exhaust sheet travels downstream of the propulsors 1702. Put differently, the exhaust sheet produced by the flow turning control system described herein has a negligible difference in speed of the exhaust sheet when measured at any two given points of the exhaust sheet. Additionally or alternatively, as described further herein, the array of propulsors 1700 and/or each propulsor 1702 of the array of propulsors 1700 may actuate, transition, articulate, or otherwise move an exhaust/upper flap, such as the upper surface 1716 of the array of propulsors 1700, to reduce, minimize, or prevent non-uniform air flow, producing a uniform two-dimensional or substantially two-dimensional exhaust sheet downstream of the array of propulsors 1700.

Those skilled in the art will appreciate that a uniform exhaust sheet as described herein is, or includes, the boundary layer of air flow propelled by a propulsor or array of propulsors. The boundary layer comprises a region, above an upper surface portion of the airfoil that is downstream of a propulsor and below the exhaust flow, where the fluid velocity of air flow is greater than zero and lower than that of the exhaust flow. The elements of the array of propulsors 1700 may be modified, designed, and/or controlled to produce a uniform exhaust sheet as described herein by directing air flow through the exhaust area in a manner that prevents or reduces boundary layer separation away from the upper surface portion of the airfoil. The uniform exhaust sheet may reduce, minimize, or prevent negative three-dimensional effects (e.g., swirl), associated with conventional propulsion systems, that can reduce the amount of thrust that is achieved while deflecting air flow at an angle (e.g., as high as 180 degrees). In some embodiments, the use of an array of propulsors with end walls may be combined with features such as optimization of flap radius-to-exhaust height ratio, optimization of trailing edge length-to-exhaust height ratio, and/or optimization of a ratio of end wall height-to-exhaust height as described herein to achieve a desired degree of flow turning (e.g., as much as 180 degrees in some cases). Non-limiting examples of these features are shown in FIG. 18A and FIG. 19 as described further below.

Figure 18A:
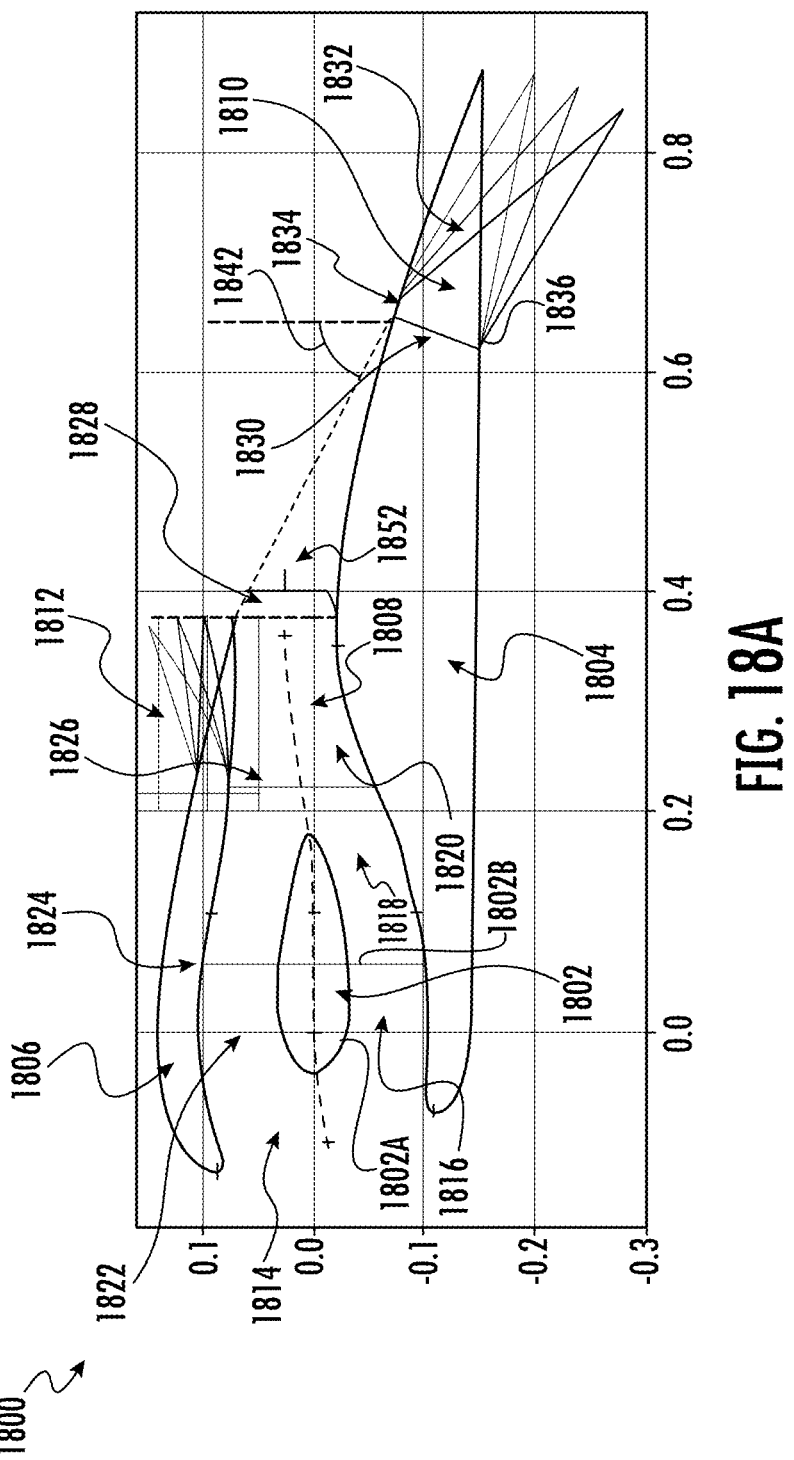
FIGS. 18A-18C are diagrams illustrating a side cross-sectional view of an example jetfoil integration of a propulsor system according to one or more arrangements.
Figure 19:
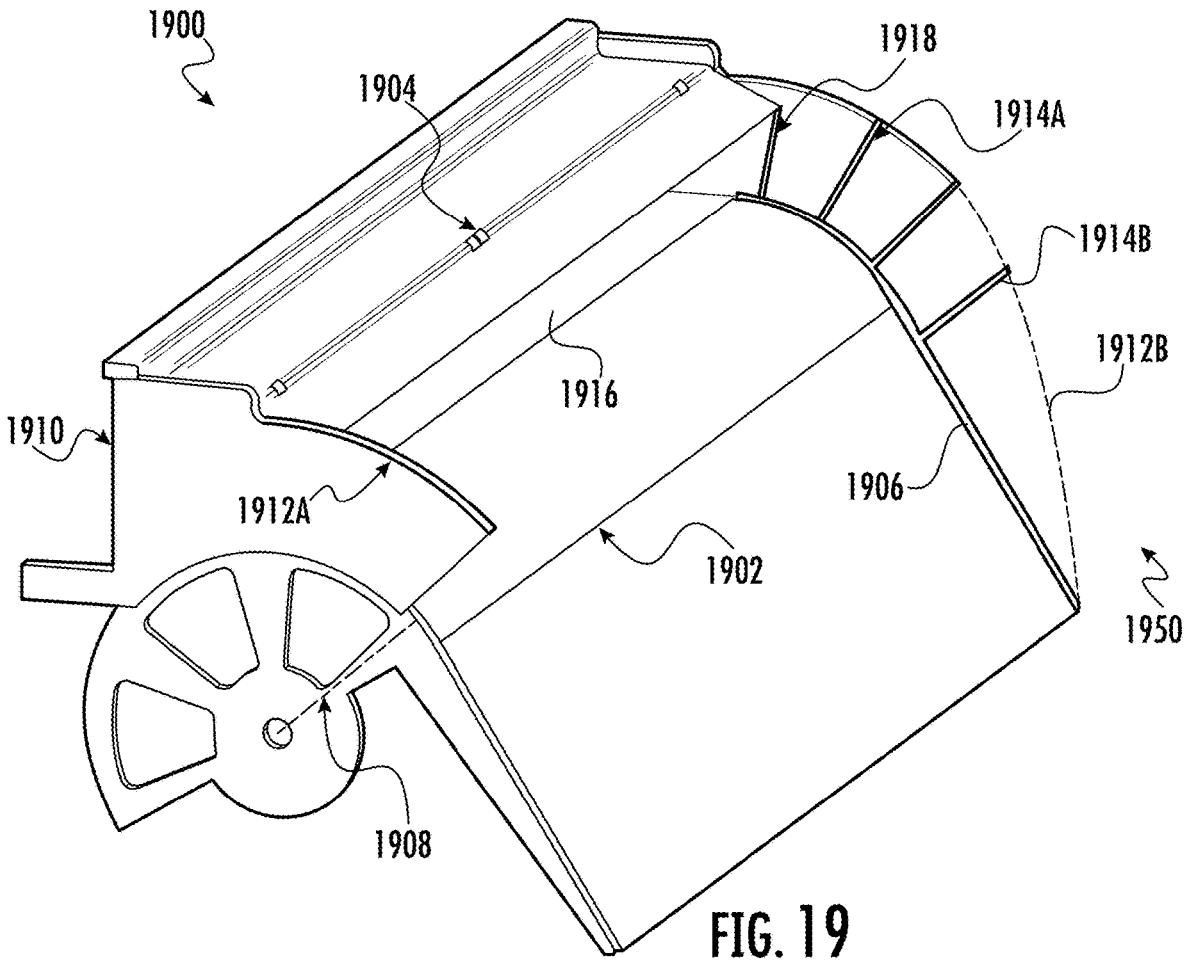
FIG. 19 illustrates an aft portion of an example propulsor array with end walls according to one or more arrangements.

FIG. 18A is a diagram of a side cross-sectional view of an example propulsor system 1800 according to one or more arrangements. Propulsor system 1800 may be integrated into an array of similar propulsors as described herein. Elements of propulsor system 1800 may be designed or configured to achieve uniform exhaust sheet and flow turning control by performing optimization of flap radius-to-exhaust height ratio, optimization of trailing edge (e.g., flap) length-to-exhaust height ratio, and/or optimization of a ratio of end wall height-to-exhaust height as described herein. As described further herein, the exhaust height of the ratios may be a constant reference exhaust height selected during construction and/or an instantaneous exhaust height modified by articulation of one or more flaps. For example, the elements of propulsor system 1800 may be designed and/or configured to optimize a flap radius-to-reference exhaust height ratio, a flap radius-to-instantaneous exhaust height ratio, a flap length-to-reference exhaust height ratio, a flap-length-to-instantaneous exhaust height ratio, a ratio of end wall height-to-reference exhaust height, and/or a ratio of end wall height-to-instantaneous exhaust height. In certain examples the propulsor system 1800 may be a ducted fan. In some examples, the propulsor system 1800 may be configured for subsonic operation, though it should be understood that in other examples the propulsor system 1800 may be configured for transonic and/or supersonic operation without departing from the scope of this disclosure. By configuring the propulsor system 1800 for subsonic operations a fan pressure ratio (FPR) of the propulsor system 1800 is reduced compared to FPRs associated with conventional propulsion systems such as turbines configured for transonic or supersonic operations. For example, the propulsor system 1800 may be configured (e.g., by modifying a diameter of the ducted fan) to achieve an FPR of a value between 1.01 and 1.2 in certain embodiments, and yet 1.01 and 1.1 in others. Those skilled in the art with the benefit of this disclosure will appreciate that these are merely representative. Lowering the FPR provides benefits such as reduced noise during operation and improved propulsive efficiency over certain conventional propulsive systems.

The propulsor system 1800 may comprise a centerbody 1802, a main airfoil element 1804, an upper airfoil element 1806, and at least one movable trailing edge (e.g., as described herein with respect to FIGS. 1A through 16), such as main flap 1810. In certain embodiments the centerbody 1802 may be and/or include a nosecone, hub, and tail cone. In certain embodiments, the centerbody 1802 may be a component of a fan assembly with a number of fan blades attached to and/or proximate to the centerbody 1802. For example, the fan assembly may include a rotor portion 1802A such as a bladed disk, or the like, configured to rotate around a central axis and/or structure. The bladed disk ("blisk") may constrain noise levels of the propulsor system 1800 while maintaining sufficient air-moving capabilities. Constraining the noise levels while maintaining sufficient air-moving capabilities may be achieved by way of bladed disks having a relatively high blade count (e.g., 12-50 blades, 20-50 blades, and or any specific quantity between 12-50 blades), a relatively high blade passage frequency (BPF) (e.g., about 8-16 kHz, about 10-12 kHz, about 10-14 kHz, and/or any specific value within one or more of these ranges), and/or a relatively low tip speed (e.g., about 200-550 feet per second, ft/s). In certain embodiments, blisks may possess a blade count (e.g., 12-50 blades), and configured to be operated in a manner such as to provide a relatively high BPF (e.g., about 8-16 kHz), while achieving a low tip speed (e.g., about 200-550 ft/s). While ranges have been given as examples of certain embodiments, those skilled in the art with the benefit of this disclosure will appreciate that the scope of this disclosure includes any value within the range of blade count (e.g., between 12-50 blades), with any value of BPF between about 8-16 kHz, and/or a tip speed of any value between about 200-550 ft/s. Those of ordinary skill in the art with the benefit of this disclosure also will realize that these are merely exemplary ranges, and such disclosure is not intended to be limited.

Bladed disks, or blisks, as described herein may have a singular construction and thus may be referred to as "single-part" blisks. Single-part blisks may be differentiated from multi-part blisks formed as an assembly of parts that form a singular unit once assembled. Multi-part blisks may be constructed to be disassembled without destroying the integrity of the blisk or its constituent components, such as with removable fasteners or the like that allow the blisk to remain an integral structure under intended use conditions, such as those provided herein, whereas single-part blisks may be constructed to not be disassembled or deconstructed without destroying the structural integrity of the single-part blisk and/or its components (e.g., hub, blades, shroud). Aspects of the present disclosures may apply to both single-part blisks and multi-part blisks. Examples of single-part blisks include homogenous single-part blisks, monolithic single-part blisks, and contiguous single-part blisks. A homogenous single-part blisk as described herein will comprise a general uniform material(s) or composition(s) throughout-inclusive of the shroud, blades and hub (which may or not include a nose cone). A homogenous blisk may be formed entirely of a singular volume or a single layer of a single material, multiple layers of the same material, or the like. A monolithic single-part blisk as described herein, for example, may be integrally formed of a single continuous component comprising a material or a group of materials without seams or joints. For example, in one embodiment, a monolithic blisk may be created by employing computer numerical control (CNC) manufacturing methods on a composite, alloy, or material. A monolithic single-part blisk thus may be homogenous (if integrally formed of the same continuous material) or non-homogenous (if integrally formed of a group of materials). A monolithic single-part blisk may include, for example, layers of materials (e.g. the same material or different materials) deposited directly on an adjacent layer (e.g., via overmolding and/or additive manufacturing). A contiguous single-part blisk as described herein may include, for example, at least one layer (e.g., an inner core layer, an outer overmold layer) that transitions without interruption from one component of the single-part blisk (e.g., a blade) to another component of the single-part blisk (e.g., the hub, the shroud). A contiguous single-part blisk thus may homogenous (if integrally formed of the same material), non-homogenous (if integrally formed of different materials, for example, contiguous layers of different materials), monolithic (if integrally formed of one or more layers), or nonmonolithic (if constructed of separately constructed components such as individual blades or blade sectors, a stiffener for the hub, and/or a separate shroud that are collectively overmolded to yield a singular unit). For example, the blades, hub, and/or shroud of a single-part blisk may be constructed (e.g., individually or collectively) using one or more of the manufacturing methods described herein and the constructed components may be overmolded resulting in the singular unit. As described herein with respect to certain examples, a single-part blisk may be provided via manufacturing techniques such as, but not limited to: injection molding (including metal injection molding), compression molding, overmolding, casting, stamping, computer numerical control (CNC) machining, additive manufacturing (e.g., 3-D printing), electrochemical machining (ECM), electrical discharge machining (EDM), laser-cutting, forging, die-pressing, sintering, and combinations thereof. For example, a blisk can be injection molded and then CNC may be used to machine a feature to size. In some examples, one or more of these and/or other techniques may impart the singular, unitary nature of the single-part blisk and/or aspects of any other type of blisk discussed herein (e.g., multi-part blisks). In some examples, the blisk may be A-B injection molded including the integral shroud to provide structural feasibility while permitting the blades to be adequately supported. As the rotating component in an air-moving device (or configured to be such), a blisk may also be referred to as an aerodynamic rotor or simply a rotor. It should be understood that example configurations and designs of blisks described herein are merely illustrative and not intended to be limiting.

In some examples, the one or more bladed disks, as described herein, may be characterized by a number of additional parameters. For example, as shown in FIG. 18A, the centerbody 1802 may be proximate to a blisk, which may be a single-part blisk. The blisk may have a quantity of blades in the range of about 20-50 blades, a blade chord in the range of about 6-32 millimeters (mm), a blisk diameter of about 78-150 mm, a circumferential blade spacing (e.g., a distance between the edges of adjacent blades of the bladed disk) in the range of about-17 to 1 mm, a blade aspect ratio (e.g., ratio of blade length to blade chord) in the range of about 0.75-5.3, and a blade tip solidity (e.g., quantity of blades times blade tip chord divided by circumference of the blisk at the blade tips) in the range of about 0.65-2.5. It should be understood that any and/or all of the above-described parameters are not intended to be limiting and are merely illustrative. For example, a bladed disk as described herein may possess a circumferential blade spacing in the range of about-17 to 5 mm, in the range of about-17 to 3 mm, or in the range of about-17 to 2 mm without departing from the scope of this disclosure.

In some examples, the rotor portion 1802A (which may be and/or comprise a bladed disk as described herein) is connected to a central shaft (e.g., a hub) of the centerbody 1802 and configured to rotate to pull in air form a leading edge of the propulsor system 1800 during operation of an aircraft as described herein. The fan assembly comprising the centerbody 1802 may further comprise a stator portion 1802B connected to the central shaft (e.g., the hub) of the centerbody 1802 and configured to remain stationary during operation of the aircraft. In some examples, either or both of the rotor portion 1802A and the stator portion 1802B may comprise a number of blades. For example, the rotor portion 1802A may comprise a number of rotors and the stator portion 1802B may comprise a number of stator vanes. Propulsors disclosed herein may produce thrust required to achieve an operation of the aircraft (e.g., a hover mode, a forward flight mode, a reverse thrust mode, a VTOL mode, and/or other modes). The main airfoil element 1804 may be and/or comprise a bottom portion of a wing or tail of an aircraft. For example, the main airfoil element 1804 may be positioned on an upper surface of the bottom portion of a wing or tail of an aircraft. The main airfoil element 1804 may have a curved or arcing design configured to direct air flow from the propulsor through an exhaust plane 1828. The upper airfoil element 1806 may be and/or comprise a top portion of the wing or tail of the aircraft. The upper airfoil element 1806 may have a curved or arcing design configured to direct air flow through the exhaust plane 1828.

The centerbody 1802, main airfoil element 1804, and upper airfoil element 1806 may collectively define an inlet duct 1814, an interstage duct 1816, a transition duct 1818, an exhaust duct 1820, and/or a mean flowpath 1808. The inlet duct 1814 may comprise a portion of space between the upper airfoil element 1806 and the main airfoil element 1804, positioned forward of the centerbody 1802, whereby air from a leading surface of propulsor system 1800 is pulled into the propulsor system 1800. The interstage duct 1816 may comprise a portion of space between the upper airfoil element 1806 and the main airfoil element 1804, positioned between a rotor included in the rotor portion 1802A and stator(s) included in the stator portion 1802B, whereby air flow is directed from a position in the propulsor system 1800 relative to a rotor or reference plane 1822 to a position in the propulsor system 1800 relative to a stator exit plane 1824. The transition duct 1818 may comprise a portion of space between the upper airfoil element 1806 and the main airfoil element 1804 whereby air flow is directed into an exhaust duct 1820. As shown in the illustrated example, the transition duct also changes shape from annular to rectangular. The exhaust duct 1820 may be defined by a rectangular plane 1826 at a first terminal position of the exhaust duct 1820 and an exhaust plane 1828 at a second terminal position of the exhaust duct 1820. The mean flowpath 1808 may be a representation of an average direction of air flow from the inlet duct 1814 through the interstage duct 1816, transition duct 1818, and exhaust duct 1820 to a trailing edge (e.g., main flap 1810) of the propulsor system 1800.

The exhaust duct 1820 may comprise a portion of space (i.e., the exhaust plane 1828) between the upper airfoil element 1806 and the main airfoil element 1804 that may be modified (e.g., by moving one or more movable trailing edges of the propulsor system 1800, such as main flap 1810 and/or an exhaust/upper flap 1812) to produce a uniform exhaust sheet of air flow exiting the exhaust plane 1828. The exhaust area as described herein may be defined by the propulsor system 1800 and/or an array of such propulsors. For example, the exhaust area may be and/or include the exhaust duct 1820 and/or the portion of space between the upper airfoil element 1806 and the main airfoil element 1804 that may be modified to produce a uniform exhaust sheet of air flow exiting the exhaust plane 1828. It should therefore be understood that an exhaust area as described herein may be and/or include a two dimensional plane having a length and a width, and/or a region of space (e.g., a portion of the space between the upper airfoil element 1806 and the main airfoil element 1804 downstream of the propulsor). For example, the exhaust area may be an exhaust region encompassing more than a two dimensional plane. The exhaust area may be a contracting exhaust area. For example, the exhaust area may be less than a fan annulus area of the propulsor system 1800. The fan annulus area (not shown) may be measured as the area of an annulus of a fan, bladed disk, or the like of the propulsor system 1800. The ratio of the exhaust area to the fan annulus area, or the expansion ratio, may be optimized to a value less than 1. For example, in certain embodiments, the exhaust area may be configured to remain less than the fan annulus area regardless of the position of the exhaust/upper flap 1812 and the height of the exhaust area.

As described above, the propulsor system 1800 may comprise at least one movable trailing edge. In certain embodiments, the propulsor may comprise a single movable trailing edge such as main flap 1810. In some examples, the main flap 1810 may be a portion of a larger movable trailing edge, such as a flap spanning a length of an array of propulsors as described herein. In certain embodiments, the propulsor may comprise one or more additional trailing edges, such as exhaust/upper flap 1812. Each of main flap 1810 and exhaust/upper flap 1812 may be moved using a control assembly as described herein. For example, main flap 1810 and/or exhaust/upper flap 1812 may be articulated about a pivot point as described with respect to FIGS. 12 through 15. Also or alternatively, main flap 1810 and/or exhaust/upper flap 1812 may be retracted and/or extended, as described with respect to FIG. 16. Also or alternatively, main flap 1810 and/or exhaust/upper flap 1812 may be actuated based on an input signal received by a control system/controller (e.g., control computer 2100 as described herein). For example, main flap 1810 and/or exhaust/upper flap 1812 may be actuated, based on the input signal, to cause adjustment to the flow turning of the flow of air over the trailing edge of the main flap 1810. It should be understood that, in some examples, additional or alternative mechanisms, assemblies, or the like may be used to move either of main flap 1810 or exhaust/upper flap 1812 without departing from the scope of this disclosure.

Each movable trailing edge of the propulsor system 1800 includes a radius and a length. For example, either or both of main flap 1810 and exhaust/upper flap 1812 may include a flap radius (such as flap radius 1830) and a flap length (such as flap length 1832). Flap radius 1830 indicates a radius of curvature of a corresponding flap. As shown in the illustrated example, flap radius 1830 may indicate a distance between a first pivot point of the main flap 1810 and a second pivot point of the main flap 1810. Those of skill in the art with the benefit of this disclosure would recognize that a radius of curvature of the flap may be measured at and/or indicate different distances without departing from the scope of this disclosure. For example, in certain configurations the main flap 1810 may not have a linear connection or communication to the main airfoil element 1804 as depicted in FIG. 18A. The main flap 1810 may have an arcuate or other non-linear connection or communication between the main flap 1810 and the main airfoil element 1804, as shown in FIG. 18C.

Figure 18B:
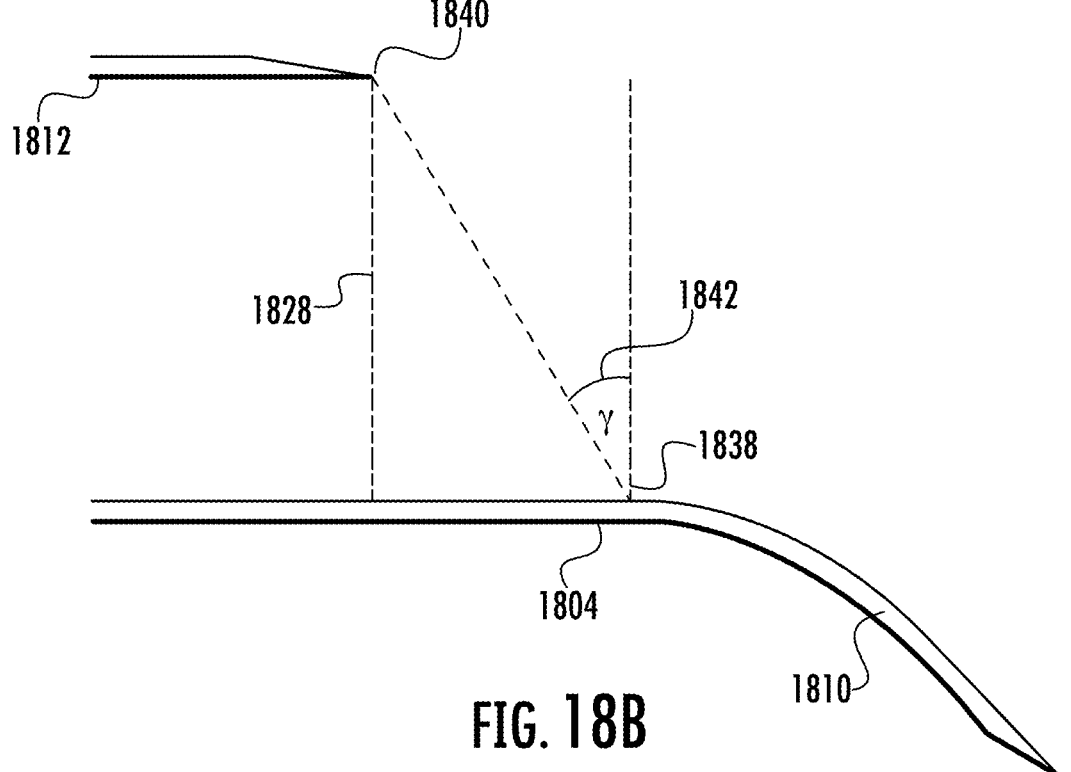
Figure 18C:
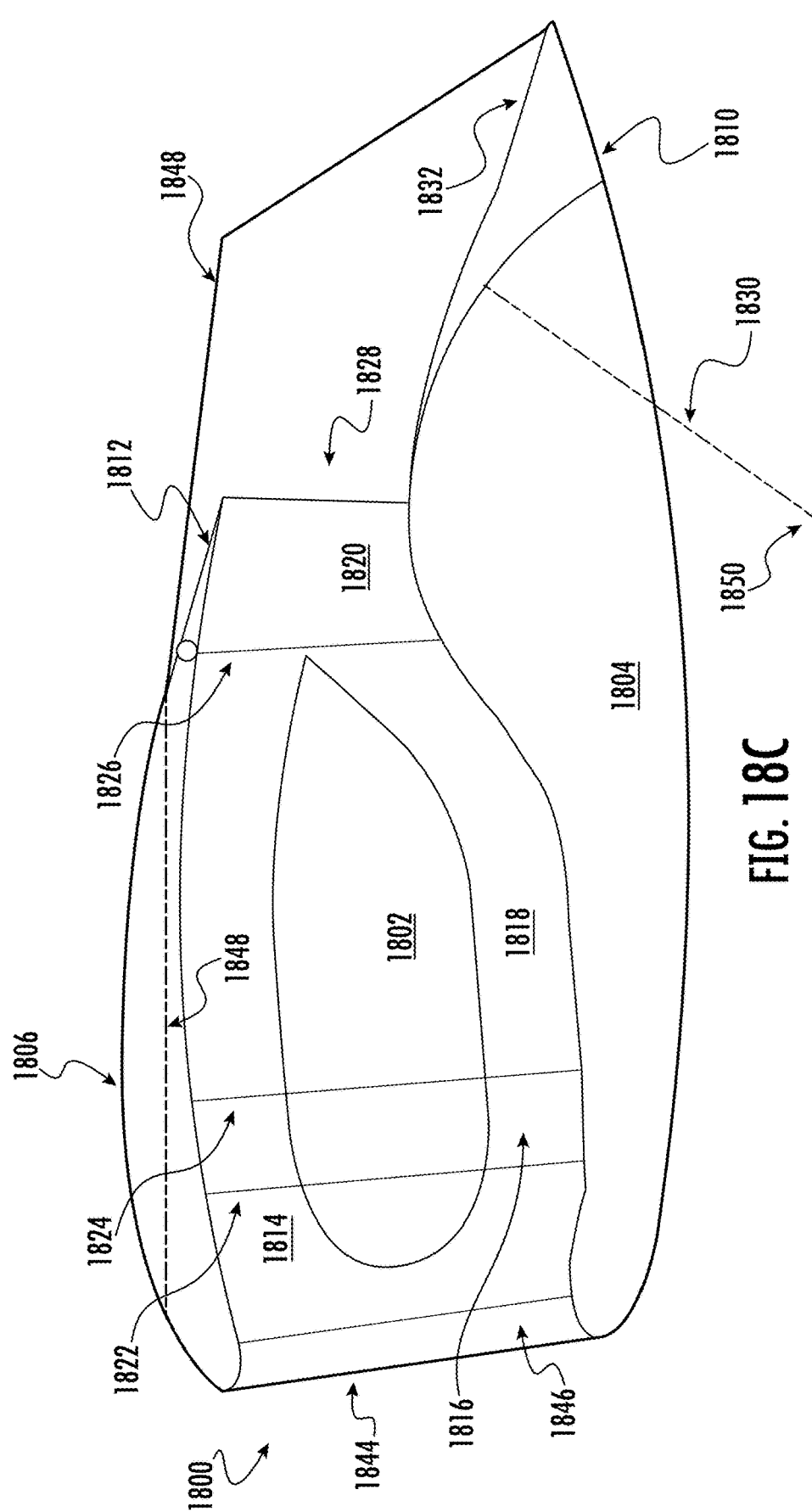

Referring to FIG. 18C, flap radius 1830 may not directly align with the portion of the main flap 1810 that is connected with and/or in communication with the main airfoil element 1804 (e.g., as shown in FIG. 18A). FIG. 18C is a diagram of a side cross-sectional view of an example propulsor system 1800, according to one or more arrangements, that is substantially similar to FIG. 18A. It should be understood that like-numbered elements in FIGS. 18C and 18A have similar properties and perform similar functions. As shown in FIG. 18C, the flap radius 1830 may be the radius of curvature of the main flap 1810, which those of skill in the art would recognize as the reciprocal of the curvature at a given point of the main flap 1810. For example, as shown in FIG. 18C, the flap radius 1830 may be the radius of the circular arc which best approximates the curve of the portion of the main flap 1810 that is connected with and/or in communication with the main airfoil element 1804 at a given point. In these examples, the flap radius 1830 may be measured as the distance from the point at which main flap 1810 is connected with and/or in communication with the main airfoil element 1804 to the center of an imaginary circle completing the curve from the point at which main flap 1810 is connected with and/or in communication with the main airfoil element 1804. For example, as shown in FIG. 18C, the flap radius 1830 may be measured as the distance from the point at which main flap 1810 is connected with and/or in communication with the main airfoil element 1804 to imaginary reference point 1850.

FIG. 18C depicts a main flap 1810 with a constant radius of curvature (i.e., the flap radius 1830 measured from reference point 1850 to any point along the portion of the main flap 1810 in communication with and/or connected with the main airfoil element 1804 is constant). It should be understood that, in some examples, the propulsor system 1800 may be designed with a variable flap radius. In these examples, flap radius 1830 may not be measured to any specific reference point. The flap radius 1830 may be the reciprocal of the curvature at a given point along the portion of the main flap 1810 in communication with and/or connected with the main airfoil element 1804. A variable flap radius may correspond to one or more of a piecewise linear radius of curvature, a linear radius of curvature, a quadratic radius of curvature, a cubic radius of curvature, a quartic radius of curvature, a sinusoidal radius of curvature, an exponential radius of curvature, and/or any other radius of curvature profile. The flap radius 1830 (i.e., the radius of curvature) may vary (e.g., increase and/or decrease) from a first radius of curvature at a leading/articulatable edge of the main flap 1810 to a second radius of curvature, different than the first radius of curvature, at a trailing edge of the main flap 1810. In certain embodiments, the flap radius 1830 at a leading portion (e.g., a terminal end closest to exhaust plane 1828) of the main flap 1810 may exceed the flap radius of a trailing edge (e.g., a terminal end farthest from the exhaust plane 1828) of the main flap 1810. In certain embodiments, the flap radius 1830 measured from a trailing edge (e.g., a terminal end farthest from the exhaust plane 1828) of the main flap 1810 may exceed the flap radius measured from a leading edge (e.g., a terminal end closest to exhaust plane 1828) of the main flap 1810.

Referring again to FIG. 18A, flap length 1832 may indicate a distance between a first terminal end of the corresponding flap and a second terminal end of the corresponding flap. In some examples, the flap length 1832 may also or alternatively indicate a length of the flap with a surface over which flow turning may be achieved. In some examples, the flap length 1832 may be changed (e.g., increased, reduced, modified, and/or otherwise changed) by extending or retracting the flap. For example, the flap length 1832 of main flap 1810 may be reduced by retracting the main flap 1810 upward and/or into a body of the main airfoil element 1804. Also or alternatively, the flap length 1832 of main flap 1810 may be increased by extending the main flap 1810 outward and/or downstream of the main airfoil element 1804. It should be understood that one or more additional flaps, such as exhaust/upper flap 1812, may be operated in a similar manner as main flap 1810 to adjust flap lengths of the one or more additional flaps.

The features of the propulsors described herein, including propulsor system 1800 described above, may be used to achieve desired degrees of flow turning, including Coanda-effect flow turning (e.g., greater than 85 degrees, in some examples as much as 180 degrees), over a trailing edge of the propulsor system 1800 (e.g., main flap 1810) and relative to a horizontal axis of the main airfoil element 1804, that are not possible using conventional systems. Put differently, the features of the propulsor system 1800 may be used to perform optimization of a flap radius-to-exhaust height ratio and/or optimization of a flap length-to-exhaust height ratio to generate a uniform, two-dimensional exhaust sheet, free (or substantially free) of swirling, that is blown downstream of the exhaust plane 1828 and over main flap 1810 to turn the flow. For example, a movable trailing edge (e.g., main flap 1810) may be designed, or moved, to modify the flap (trailing edge) length (e.g., flap length 1832) of the movable trailing edge and achieve an optimum ratio between the flap length and the exhaust height. As described further herein, the exhaust height may be a reference exhaust height selected during design/construction, and/or an instantaneous exhaust height modified by articulation of the upper/exhaust flap 1812. The reference exhaust height may be a height of the exhaust area/region that is selected during design/construction and that remains constant during articulation of upper/exhaust flap 1812. For example, the reference exhaust height may be reference exhaust height 1852, shown in FIG. 18A, that is measured between the trailing edge of the exhaust/upper flap 1812 and the upper surface of the main airfoil element 1804 when all flaps are at their neutral/undeflected positions, and/or that is measured between the trailing edge of the exhaust/upper flap 1812 and the upper surface of the main airfoil element 1804 when the flaps are configured for the highest achievable degree of flow turning. In certain embodiments, the reference exhaust height 1852 may be measured as the height of the exhaust plane 1828 when the exhaust/upper flap 1812 is in an undeflected (e.g., initial) position. In certain embodiments, the instantaneous exhaust height may be the height of the exhaust plane 1828 at any given position of the exhaust/upper flap 1812. The instantaneous exhaust height may vary as the exhaust/upper flap 1812 is deflected upward and away from the main airfoil element 1804 or downward and towards the main airfoil element 1804). Put differently, the instantaneous exhaust height may be measured as the height between the upper surface of the main airfoil element 1804 and the trailing edge of the exhaust/upper flap 1812 (i.e., the height of exhaust plane 1828) at a given point in time as the exhaust/upper flap 1812 is articulated as described herein. Those of skill in the art will understand that the ratios described herein that include or reference an exhaust height may refer to either or both of the reference exhaust height 1852 or the instantaneous exhaust height (i.e., the height of exhaust plane 1828 at a given time). Flow turning control systems implementing the features disclosed herein may optimize ratios (e.g., flap length to exhaust height, flap radius to exhaust height, end wall height to exhaust height, and/or other ratios) relative to either or both of the reference exhaust height 1852 or the instantaneous exhaust height in order to enable select flow turning of the degrees of flow turning and associated efficiencies described herein.

The optimum ratio between the flap length and the exhaust height is sufficient to cause air flow, traveling from the inlet duct 1814 through the exhaust duct 1820, to retain a two-dimensional or substantially two-dimensional shape (e.g., a two-dimensional exhaust sheet) and a constant velocity when propelled, by the propulsor system 1800, over the trailing edge of the main airfoil element 1804. The optimum ratio between the flap length and the exhaust height is similarly sufficient to cause or enable the exhaust sheet to retain its shape at a degree of flow turning over the trailing edge between, for example, 85 degrees and 180 degrees with an efficiency (i.e., a gross thrust coefficient, or a ratio of actual thrust to ideal thrust) of at least 70 percent, between 45 degrees and 60 degrees (preferably 45 degrees, e.g., for STOL operations) with an efficiency of at least 90 percent, between 60 degrees and 85 degrees with an efficiency of at least 80 percent, and/or other degrees of flow turning and efficiencies as described herein. It should be understood that other degrees of flow turning and efficiencies are possible. For example, flow turning of between 85 degrees and 90 degrees may be achieved with an efficiency of at least 80 percent. In certain embodiments, the efficiency of the flow turning may be as high as 100 percent, meaning that the actual thrust achieved by a system integrating the features described herein is equal to the ideal thrust. In certain embodiments, the optimum ratio between the flap length and the exhaust height may be about 5 to 10. In certain embodiments, the optimum ratio between the flap length and the exhaust height may be about 2 to 10. Those skilled in the art will appreciate that any value between 2 and 10 may be utilized in this example, and as such, these examples are not limited to ranges only, but specific values in certain embodiments. Conventional propulsion systems do not optimize the flap length-to-exhaust height ratio as described herein and have not achieved, for example, flow turning between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein.

In certain embodiments, the optimum ratio between the flap length and the exhaust height may be achieved during construction. For example, the optimum ratio may be achieved by constructing the propulsor system 1800 with a reference exhaust height 1852 (e.g., at exhaust plane 1828 when upper/exhaust flap 1812 is an in initial/undeflected position) and a flap length 1832 tailored to a predetermined optimum ratio. Also or alternatively, in certain embodiments, the optimum ratio between the flap length and the exhaust height may be achieved by moving a single movable trailing edge of the flap. For example, the optimum ratio between the flap length 1832 and the exhaust height may be achieved by extending the main flap 1810 outward and away from a vertical axis of the main airfoil element 1804. Moving the main flap 1810 outward and away from the vertical axis of the main airfoil element 1804 may increase the flap length 1832 of the main flap 1810 and thus increase the ratio between the flap length 1832 and the exhaust height measured at exhaust plane 1828. Also or alternatively, the optimum ratio between the flap length and the exhaust height may be achieved by retracting the main flap 1810 inward and towards a vertical axis of the main airfoil element 1804. Moving the main flap 1810 inward and towards the vertical axis of the main airfoil element 1804 may decrease the flap length 1832 of the main flap 1810 and thus decrease the ratio between the flap length 1832 and the exhaust height measured at exhaust plane 1828.

In certain embodiments, the optimum ratio between flap length and the exhaust height may be achieved by moving a movable trailing edge of the flap to modify the exhaust height (e.g., the instantaneous exhaust height). For example, the propulsor system 1800 may comprise a movable exhaust/upper flap 1812 positioned above the exhaust duct 1820 with a first terminal end positioned at rectangular plane 1826 and a second terminal end positioned at the top of exhaust plane 1828. In these examples, the optimum ratio between the flap length and the exhaust height may be achieved by articulating the exhaust/upper flap 1812 about a pivot point. For example, the exhaust/upper flap 1812 may be articulated about a pivot point (e.g., a point aligned with rectangular plane 1826) to move exhaust/upper flap 1812 downward and towards a horizontal axis of the main airfoil element 1804. Moving the exhaust/upper flap 1812 downward and towards a horizontal axis of the main airfoil element 1804 may decrease the exhaust height and thus increase the ratio between the flap length 1832 of the main flap 1810 and the exhaust height. Also or alternatively, the exhaust/upper flap 1812 may be articulated about a pivot point (e.g., a point aligned with rectangular plane 1826) to move exhaust/upper flap 1812 upward and away from a horizontal axis of the main airfoil element 1804. Moving the exhaust/upper flap 1812 upward and away from a horizontal axis of the main airfoil element 1804 may increase the exhaust height and thus decrease the ratio between the flap length 1832 of the main flap 1810 and the exhaust height. In certain embodiments, the optimum ratio between the flap length and the exhaust height may be achieved by moving the main flap 1810 and moving the exhaust/upper flap 1812, as described above, in combination.

Optimizing the ratio between the flap length and the exhaust height as described herein causes, or contributes to, generation of a uniform exhaust sheet that retains a two-dimensional or substantially two-dimensional shape at a desired degree of flow turning over the trailing edge between, for example, 85 degrees and 180 degrees with an efficiency of at least 70 percent. For example, one or both of main flap 1810 and exhaust/upper flap 1812 may be articulated, transitioned, and/or otherwise moved as described herein to achieve a flap length-to-exhaust height ratio (e.g., of 5 to 10) that produces a uniform exhaust sheet that retains a two-dimensional shape with flow turning over the trailing edge. Optimization of other features of the main flap 1810 and/or the exhaust/upper flap 1812 may further enable, or contribute to, the uniform exhaust sheet with flow turning between, for example, 85 degrees and 180 degrees with an efficiency of at least 70 percent. For example, the propulsor system 1800 and/or an array of propulsors 1800 may be designed, constructed, or otherwise configured to achieve an optimal location angle of the trailing edge of the exhaust/upper flap 1812 during operation of an aircraft. For example, as shown in FIG. 18A, the location angle 1842 may be measured from the vertical plane of trailing edge (i.e., at a terminal end away from the centerbody 1802) of exhaust/upper flap 1812 to the vertical plane of the leading edge (i.e., at a terminal end towards the centerbody 1802) of main flap 1810.

FIG. 18B is a diagram of a side cross-sectional view of an example propulsor system 1800 providing a zoomed in view of the location angle, according to one or more arrangements. It should be understood that like-numbered elements in FIGS. 18B and 18A have similar properties and perform similar functions. Referring to FIG. 18B, the location angle 1842 (represented by the symbol gamma) may be measured as the angle between the vertical plane of a trailing edge 1840 of the exhaust/upper flap 1812 (i.e., the exhaust plane 1828) and the vertical plane of a leading edge of the main flap 1810 (e.g., articulatable edge 1838). The propulsor system 1800 may be designed to maintain an optimal location angle 1842 during movement of the exhaust/upper flap 1812 and/or the main flap 1810. The optimal location angle 1842 may be an angle indicating that the contraction of the exhaust plane 1828 occurs at a position, towards the leading edge of the propulsor system 1800, that precedes the leading edge (e.g., articulatable edge 1838) of the main flap 1810. Put differently, the exhaust/upper flap 1812 may be designed such that the trailing edge 1840 of the exhaust/upper flap 1812 never extends beyond the leading edge, articulatable edge 1838, of the main flap 1810, as shown in FIG. 18B. In these examples, the trailing edge 1840 of the exhaust/upper flap 1812 may extend, away from the exhaust area, a maximum distance that is less than the distance between the exhaust area and the leading edge (e.g., articulatable edge 1838) of the main flap 1810. Additionally, in these examples, because the trailing edge 1840 of the exhaust/upper flap 1812 is upstream of the articulatable edge

1838 of the main flap 1810 over which the flow is turned, expansion or contraction of the exhaust height is therefore performed upstream of the flow turning. Enabling expansion or contraction of the exhaust height upstream of the flow turning enables improved control over the pressure gradients that affect whether the flow will separate from the surface of the main flap 1810, which in turn facilitates flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. For example, in systems without an optimized location angle 1842 as described herein, an adverse pressure gradient leading into the turn of the flow may cause the boundary layer of the flow to separate from the surface over which the flow is turned and reduce the efficiency of the flow turning.

Referring again to FIG. 18A, the exhaust sheet as described herein may retain the two-dimensional shape when the aircraft is near the ground or hovering in a stationary position (e.g., during a VTOL mode) and when the aircraft is in flight (e.g., during a forward flight mode or a reverse thrust mode). The exhaust sheet may retain the two-dimensional shape with flow turning at a degree sufficient for performing a particular operation of the aircraft. For example, the flap length-to-exhaust height ratio may be sufficient to enable flow turning at 145 degrees relative to a horizontal axis of the propulsor system 1800 for a hover mode. Flow turning of 145 degrees may provide a number of benefits, such as increased maximum hover time, increased maximum aircraft weight, increased control over the aircraft during hover mode, and/or other benefits over conventional methods of performing a hover mode that are unable to achieve such a high degree of flow turning. Also or alternatively, the flap length-to-exhaust height ratio may be sufficient to produce flow turning at 180 degrees relative to a horizontal axis of a propulsor system 1800 for a reverse thrust mode. For example, the uniform exhaust sheet generated by the propulsor system 1800 may be turned, over a trailing edge of the propulsor system 1800, 180 degrees relative to a horizontal axis of the propulsor system 1800 such that air flow reverses direction. The reverse thrust mode may allow an aircraft to reduce speed and/or travel in an aft direction from the nose of the aircraft. Conventional propulsion systems are unable to achieve flow turning with a uniform sheet at 180 degrees and are thus unsuitable for aircraft intended to possess the ability to travel in an aft direction from the nose of the aircraft.

The results (e.g., as described further herein with respect to FIGS. 20A-20D) achieved by optimizing the ratio between the flap length and the exhaust height in combination with optimization of other parameters as described herein are surprising. For example, using the techniques described herein, the above-described flow turning of 145 degrees or 180 degrees may be achieved with a gross thrust coefficient of 0.8 (i.e., an efficiency of 70 percent) or greater. Conventional propulsion systems do not achieve this level of efficiency even at 90 degrees of flow turning, let alone up to 180 degrees of flow turning.

In some examples, the features of the propulsor system 1800 may additionally or alternatively include optimization of the expansion ratio (e.g., the ratio of the exhaust area to the fan annulus area) as described herein. For example, as described above, an optimal expansion ratio may be achieved during design of a system integrating the propulsor system 1800. The exhaust area may be designed/configured such that the exhaust area remains less than the fan annulus area, resulting in an expansion ratio less than 1.0. Also or alternatively, in some examples, an optimal expansion ratio may be achieved by articulating the exhaust/upper flap 1812 about the pivot point to move exhaust/upper flap 1812 downwards and towards a horizontal axis of the main airfoil element 1804. Moving the exhaust/upper flap 1812 downward and towards a horizontal axis of the main airfoil element 1804 may decrease the exhaust height and thus decrease the expansion ratio. Additionally or alternatively, the exhaust/upper flap 1812 may be articulated about a pivot point (e.g., a point aligned with rectangular plane 1826) to move exhaust/upper flap 1812 upward and away from a horizontal axis of the main airfoil element 1804. Moving the exhaust/upper flap 1812 upward and away from a horizontal axis of the main airfoil element 1804 may increase the exhaust height and thus increase the expansion ratio. In certain embodiments, the expansion ratio may be optimized by moving the exhaust/upper flap 1812 between a first position and a second position to configure the propulsor system 1800 with a contracting exhaust to achieve an optimized expansion ratio less than 1 (preferably between 0.8 and 0.9).

Optimizing the expansion ratio as described herein causes, or contributes to, generation of a uniform exhaust sheet that retains a two-dimensional or substantially two-dimensional shape at a desired degree of flow turning over the trailing edge between, for example, 85 degrees and 180 degrees. For example, conventional systems with an expanding exhaust area, producing an expansion ratio greater than 1, may fail to achieve the desired degree of flow turning because an expanding exhaust area causes a decrease in flow velocity downstream of the propulsor and an increase in pressure applied to the air flow. These effects may thicken the boundary layer and increase the likelihood of the boundary layer separating from a surface. Conventional systems have not yet realized the benefits of utilizing a contracting exhaust area for certain operations (e.g., VTOL operations). For example, a contracting exhaust area, producing an expansion ratio less than 1 (preferably 0.9) accelerates fluids (e.g., air flow) relative to an expanding exhaust area and produces a pressure gradient that facilitates the boundary layer remaining attached to the surface. As described herein, such select flow turning was a surprising result of optimization features of an array of propulsors (e.g., ducted fans) because conventional systems have failed to achieve flow turning of even 90 degrees, let alone flow turning with performance parameters as described below with respect to FIGS. 20A-20D.

In some examples, the features of the propulsor system 1800 may additionally or alternatively include optimization of a flap (i.e., trailing edge) radius-to-exhaust height ratio to generate a uniform, two-dimensional exhaust sheet. In certain embodiments, the optimum ratio between the flap radius and the exhaust height may be achieved during construction, by constructing the propulsor system 1800 with a reference exhaust height 1852 (e.g., at exhaust plane 1828 and/or at other positions as indicated in FIG. 18A) and a flap radius 1830 tailored to a predetermined optimum ratio. For example, the propulsor system 1800 may be constructed with a reference exhaust height 1852 at exhaust plane 1828 (e.g., when the upper/exhaust flap 1812 is in an undeflected or initial position) and a flap radius 1830 tailored to form a flap radius-to-exhaust height ratio of at least 1.0 and up to 5.0 (preferably between 2.0 and 2.5, e.g., for VTOL operations, or between 1.0 and 2.0, e.g., for STOL operations).

In certain embodiments, the optimum ratio between flap radius and exhaust height may be achieved by moving a movable trailing edge of the propulsor system 1800 to modify the exhaust height. For example, the propulsor system 1800 may comprise a movable exhaust/upper flap 1812 positioned above the exhaust duct 1820 with a first terminal end positioned at rectangular plane 1826 and a second terminal end positioned at the top of exhaust plane 1828. In these examples, the optimum ratio between the flap radius and the exhaust height may be achieved by articulating the exhaust/upper flap 1812 about a pivot point. For example, the exhaust/upper flap 1812 may be articulated about a pivot point (e.g., a point aligned with rectangular plane 1826) to move exhaust/upper flap 1812 downward and towards a horizontal axis of the main airfoil element 1804. Moving the exhaust/upper flap 1812 downward and towards a horizontal axis of the main airfoil element 1804 may decrease the exhaust height (i.e., the instantaneous exhaust height) and thus increase the ratio between the flap radius 1830 of the main flap 1810 and the exhaust height. Also or alternatively, the exhaust/upper flap 1812 may be articulated about a pivot point (e.g., a point aligned with rectangular plane 1826) to move exhaust/upper flap 1812 upward and away from a horizontal axis of the main airfoil element 1804. Moving the exhaust/upper flap 1812 upward and away from a horizontal axis of the main airfoil element 1804 may increase the exhaust height and thus decrease the ratio between the flap radius 1830 of the main flap 1810 and the exhaust height.

In certain embodiments, the flap radius 1830 may be a variable flap radius based on the main flap 1810 having a variable radius of curvature. For example, as described herein, the variable flap radius 1830 may correspond to one or more of a piecewise linear radius of curvature, a linear radius of curvature, a quadratic radius of curvature, a cubic radius of curvature, a quartic radius of curvature, a sinusoidal radius of curvature, an exponential radius of curvature, and/or any other varying radius of curvature of the main flap 1810. In these examples, the propulsor system 1800 may be constructed with a reference exhaust height 1852 and a flap radius 1830 configured to form a flap radius-to-exhaust height ratio of at least 1.0 and up to 5.0 (preferably between 2.0 and 2.5, e.g., for VTOL operations) as described above. For example, the propulsor system 1800 may be constructed so that, regardless of any deflection or movement of the exhaust/upper flap 1812, the reference exhaust height 1852 will always be at most half the value of the variable flap radius 1830. The radius of curvature may be optimized to enable the propulsor system 1800 or an array of propulsors 1800 to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. For example, as shown in FIG. 22, a piecewise linear radius of curvature may be selected for the main flap 1810 to minimize deviation of the flow from the surface of main flap 1810 to improve the efficiency of the flow turning.

Figure 22:
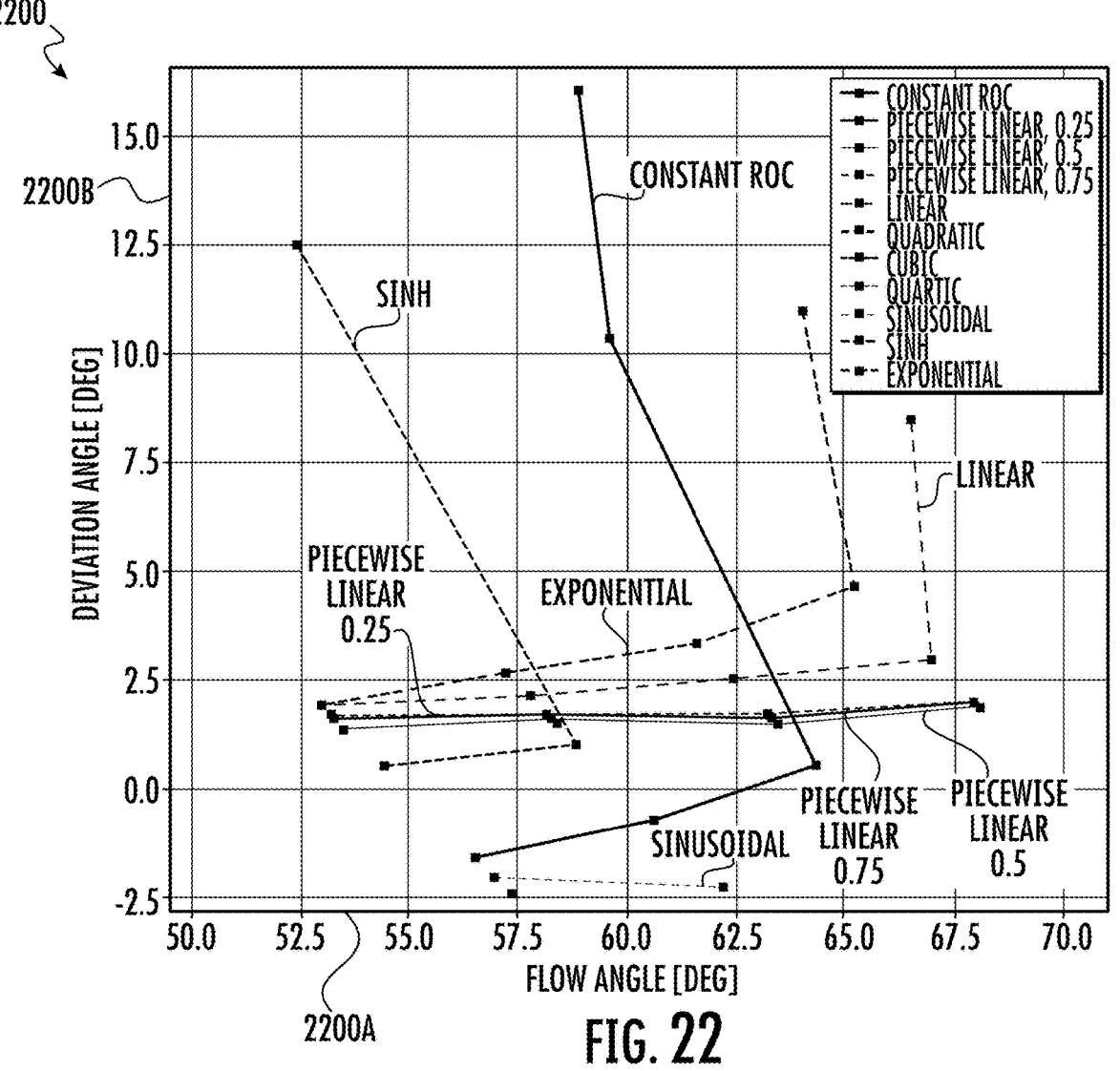
FIG. 22 illustrates example charts indicating a relationship of deviation angles and flow angles achieved by using different configurations of propulsors and exhaust ratios according to one or more arrangements.

FIG. 22 illustrates an example chart indicating a relationship of deviation angles and flow angles achieved by using different configurations of propulsors and exhaust ratios according to one or more arrangements. Specifically, FIG. 22 illustrates a chart 2200 that indicates the relationship between a flow angle (i.e., angle at which the flow deflects from a horizontal axis of the propulsor system 1800) and the deviation angle (i.e., the angle between the flow angle and the angle at which the main flap 1810 is deflected from a horizontal axis of the propulsor system 1800). The chart 2200 illustrates example results of using different radii of curvature for the main flap 1810. A first axis 2200A corresponds to the flow angle. A second axis 2200B corresponds to the deviation angle. As shown in chart 2200, the deviation angle for piecewise linear radii of curvature produces the most consistent deviation angle as the flow angle is increased.

Those of skill in the art with the benefit of this disclosure would recognize that maintaining a consistent, low deviation angle will improve the efficiency of flow turning by reducing the degree to which the flow separates from the surface of the main flap 1810. In combination with optimization of one or more features as described herein, use of a piecewise linear radius of curvature while maintaining a flap radius-to-exhaust height ratio of at least 1.0 and up to 5.0 (preferably between 2.0 and 2.5, e.g., for VTOL operations) may enable a propulsor system 1800 to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. The piecewise linear radius of curvature provides improved control over how much of the flow turning is performed near the leading edge of the main flap 1810 because the piecewise elements may be designed to ensure that flow turning occurs at specific points along the curvature of the main flap 1810. For example, the piecewise linear radius of curvature may be designed with peak curvature at the leading edge of the main flap 1810 and a period of low or no curvature along the main flap 1810 towards the trailing edge, such that at least a majority (i.e., greater than 50 percent) of the flow turning occurs at the leading edge of the main flap 1810. This improves efficiency of flow turning because, as those of skill in the art would recognize, the boundary layer is thinnest at the leading edge of the main flap 1810 and thickens as the flow is turned over the main flap 1810.

Optimization of the ratio between the flap radius and the exhaust height provides similar benefits to optimizing the ratio between the flap length and the exhaust height as described herein. For example, optimization of the ratio between the flap radius and the exhaust height causes, or contributes to, generation of a uniform exhaust sheet that retains a two-dimensional or substantially two-dimensional shape at a desired degree of flow turning over the trailing edge between, for example, 85 degrees and 180 degrees with efficiency of at least 70 percent. As previously described, the fact that the features described herein enable flow turning with such efficiency was surprising, given that conventional propulsion systems do not achieve this level of efficiency even at 90 degrees of flow turning, let alone up to 180 degrees of flow turning. In some examples, optimization of the ratio between the flap radius and the exhaust height may be combined with optimization of the ratio between the flap radius and the exhaust height to cause generation of the uniform exhaust sheet and flow turning control as described herein.

In certain embodiments, the use of end walls may be combined with one or more features described herein to cause and/or contribute to generation of the uniform exhaust sheet and flow turning control. For example, a propulsor (e.g., propulsor system 1800) and/or an array of propulsors (e.g., array of propulsors 1700) may comprise a quantity of end walls constructed for optimization of a ratio of end wall height to exhaust height (i.e., reference exhaust height and/or instantaneous exhaust height). For example, referring again to FIG. 18C, the propulsor system 1800 or an array of such propulsors 1800 (e.g., the array of propulsors 1700 as described herein) may include at least one end wall 1848. An end wall 1848 may enable flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein by preventing interference from freestream flow (e.g., air outside of the jet produced by the propulsor system 1800) on the sides of the jet flow (e.g., the uniform exhaust sheet) produced by the propulsor system 1800 as air is pulled through the highlight plane 1844 and the throat plane 1846 through the propulsor system 1800. End wall 1848 is positioned behind (i.e., in a negative direction along the z-axis) the other elements of the cross-section illustrated in FIG. 18C. For example, as illustrated by the dashed lined portion of end wall 1848, the end wall 1848 may extend along and/or include a portion of the upper airfoil element 1806 behind (i.e., in a negative direction along the z-axis) of the slice of the upper airfoil element 1806 shown in the cross-section. It should be understood that, while not shown in FIG. 18C, the end wall 1848 may also or alternatively extend along and/or include a portion of the upper airfoil element 1806 in front of (i.e., in a positive direction along the z-axis) of the slice of the upper airfoil element 1806 shown in the cross-section.

As further shown in the illustrated example, the end wall 1848 may extend at least from the upper airfoil element 1806, over an upper portion of the main airfoil element 1804, and to the trailing edge of the main flap 1810, shielding the entirety of the propulsor system 1800 from interference from freestream flow. It should be understood that in some examples, the end wall 1848 may alternatively extend a distance less than the entire length of the main flap 1810 without departing from the scope of this disclosure. As shown in the illustrated example, the end wall 1848 may have a variable end wall height. Put differently, the end wall height at a first position (e.g., at the exhaust plane 1828, and/or at other positions) may be different from the end wall height at a second position (e.g., at the pivot point 1834, and/or at other positions). For example, the end wall height at the first position may exceed the end wall height at the second position, or the end wall height at the second position may exceed the end wall height at the first position. As described further herein, the end wall height may vary to match height of a jet flow produced from the exhaust plane 1828. It should also be understood that in some examples the end wall 1848 may have a constant end wall height.

FIG. 19 illustrates an aft portion of an example propulsor with end walls according to one or more arrangements. Referring to FIG. 19, an aft portion of a propulsor 1900 may comprise a movable trailing edge such as main flap 1902, an upper flap 1904, and one or more end walls 1910. Main flap 1902 may comprise a flap length 1906 and a flap radius 1908. Main flap 1902, flap length 1906, flap radius 1908 and end walls 1910 may have substantially the same features, and provide substantially the same benefits, as main flap 1810, flap radius 1830, flap length 1832, and end wall 1848, respectively, as described herein with respect to one or more of FIGS. 18A-18C. For example, the flap length 1832/flap length 1906 may be the distance between a first terminal end of the main flap 1810/main flap 1902 and a second terminal end of the main flap 1810/main flap 1902. The flap length 1832/flap length 1906 may be measured from a pivot point, such as pivot point 1834 shown in FIG. 18A, at a first terminal end of the main flap 1810/main flap 1902 to the opposite terminal end of the main flap 1810/main flap 1902 at the trailing edge of the main airfoil element, such as main airfoil element 1804 shown in FIG. 18A. The flap radius 1830/flap radius 1908 may be the radius of curvature of the main flap 1810/main flap 1902 at a given point (i.e., the reciprocal of the curvature). For example, the flap radius 1830/flap radius 1908 may be measured as the radius of an imaginary/approximate circle with a center point located at the pivot point. Thus, the flap radius 1830/flap radius 1908 may be measured as the distance from pivot point to a second pivot point, such as pivot point 1836 as shown in FIG. 18A, located at the bottom surface of main flap 1810/main flap 1902. As described above, the flap radius 1830/1908 may be a variable flap radius and/or may not be measured to a specific reference point (i.e., the flap radius 1830/1908 may be the reciprocal of the curvature at the leading edge of the main flap 1810/main flap 1902). Similarly, upper flap 1904 may have substantially the same features, and provide substantially the same benefits, as exhaust/upper flap 1812 as described herein with respect to FIGS. 18A-18C.

An end wall 1910 may be and/or include a terminal end of the aft portion of the propulsor 1900 or an array of such propulsors 1900 (e.g., array of propulsors 1700 as described herein). An end wall 1910 may border, form, and/or otherwise define at least a portion of an opening of an exhaust duct 1916 from which air propelled by the propulsor 1900 is directed out of and over the main flap 1902. For example, a pair of end walls 1910 may border, form, and/or otherwise define at least a portion of the opening of the exhaust duct 1916. In certain embodiments where the propulsor 1900 is integrated into an array of such propulsors 1900 (e.g., the array of propulsors 1700 as described herein), the pair of end walls 1910 may be positioned at terminal ends of the array and may define at least a portion of the opening of the exhaust duct 1916. In these examples, the end walls 1910 may be attached to and/or part of the terminal propulsors 1900 of the array. Additionally or alternatively, the end walls 1910 may be or include other elements of an aircraft integrating such an array of propulsors 1900 into an airfoil (e.g., on an upper surface and at a leading edge of a wing of the plane, as described herein). For example, as shown in FIG. 23, the end walls may be or include a portion of another element of the aircraft.

Figure 23:
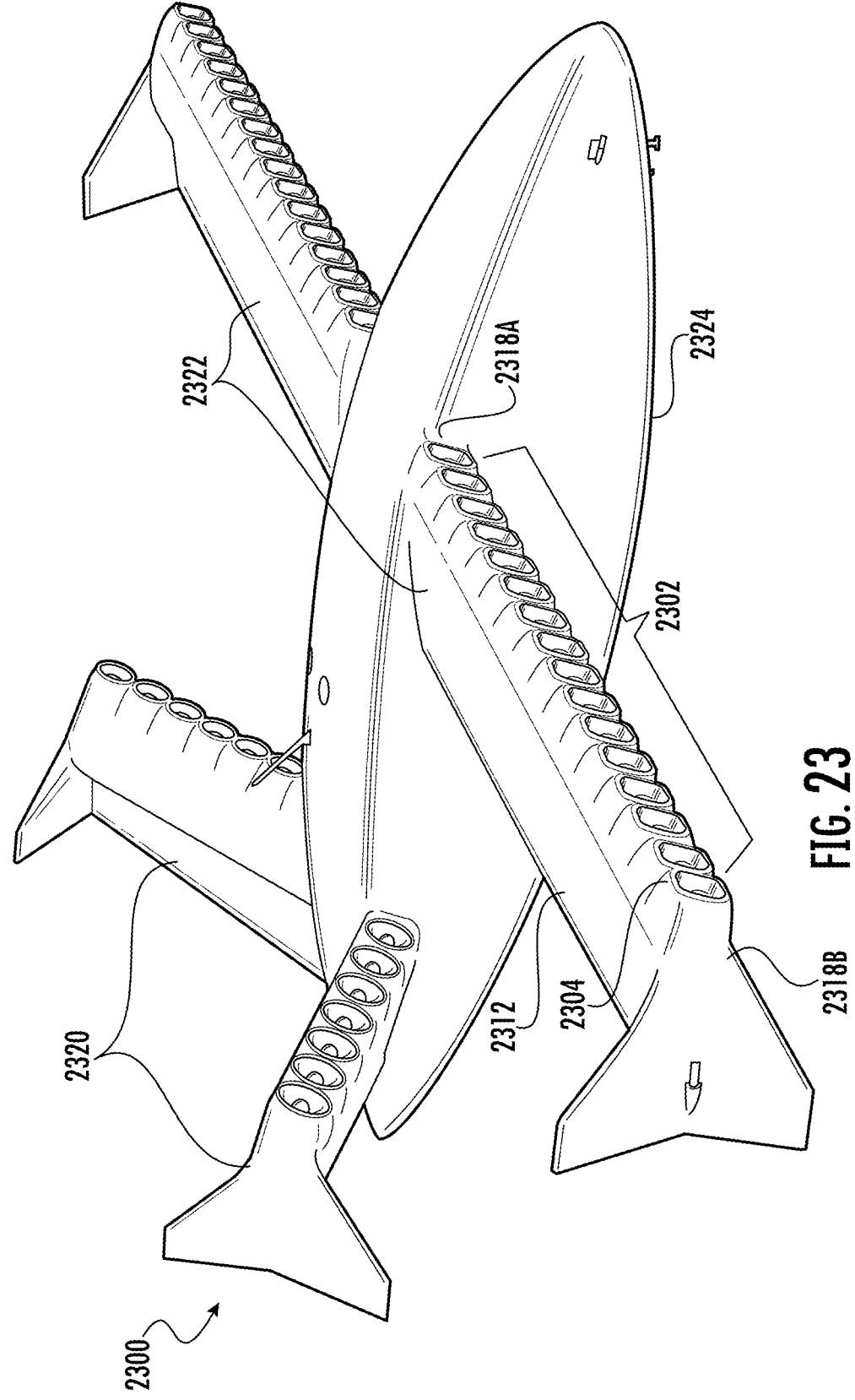
FIG. 23 illustrates an example aircraft with an integrated array of propulsors according to one or more arrangements.

FIG. 23 illustrates an example aircraft with an integrated array of propulsors according to one or more arrangements. Referring to FIG. 23, an aircraft 2300 may integrate one or more arrays of propulsors 2302 to achieve different modes of operation (e.g., forward flight, VTOL, CTOL, STOL, and/or other modes of operation) with flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. The arrays of propulsors 2302 may include multiple propulsors 2304 having implementing the features of propulsors described herein (e.g., propulsors 1800/1900). The arrays of propulsors 2302 may include at least one movable trailing edge 2312 (e.g., an exhaust/upper flap such as exhaust/upper flap 1812, and/or a main flap such as main flap 1810) for performing one or more operations described herein. The aircraft 2300 may integrate the arrays of propulsors 2302 into one or more airfoils, such as wings 2322 and/or tails 2320. The aircraft 2300 may include a fuselage 2324 to which the wings 2322, tails 2320, and/or arrays of propulsors 2302 may be attached.

As shown in the illustrated example, in certain embodiments the arrays of propulsors 2302 may include end walls that are, or include, portions of the aircraft 2300. For example, an end wall 2318B at a terminal end of an array of propulsors 2302 furthest away from the fuselage 2324 may be or include a boom and/or end portion of a wing 2322 or tail 2320. Additionally or alternatively, an end wall 2318A at a terminal end of an array of propulsors 2302 closest to the fuselage 2324 may be or include a portion of the fuselage 2324. It should be understood that, while FIG. 23 depicts end walls 2318A and 2318B having a constant height, one or more of the end walls may have a variable height as described herein without departing form the scope of this disclosure.

Referring again to FIG. 19, the exhaust duct 1916 may have an exhaust height 1918. The exhaust height 1918 may be a reference exhaust height (such as reference exhaust height 1852 as described with respect to FIG. 18A), selected during construction, that remains constant during articulation of the upper flap 1904 between a first position and a second position. The exhaust height 1918 may be an instantaneous exhaust height that is modified by articulation of the upper flap 1904 between a first position and a second position. An end wall 1910 may comprise various dimensions. For example, an end wall 1910 may comprise an end wall length 1912 and an end wall height 1914. The end wall 1910 may have a generally arc-like/arcuate shape. For example, as shown in FIG. 19, the end wall 1910 may have a shape configured to follow the contour of the trailing edge of the main flap 1902. It should be understood that the shape depicted in FIG. 19 is not intended to be limiting and that end wall 1910 may have a different shape or shapes (e.g., a rectangular shape, a finned shape, a tapered shape and/or other shapes) without departing from the scope of this disclosure. The end wall height 1914 and the exhaust height 1918 may, respectively, be any value sufficient to generate a uniform exhaust sheet to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. In some examples, the end wall height 1914 may be at least equal to the exhaust height 1918. In some examples, the end wall height 1914 may exceed the exhaust height 1918 (e.g., as shown in FIG. 19). In some examples, the end wall height 1914 may be a variable height. For example the end wall height may be tapered to follow a thickness of the jet (e.g., air flow) exiting from the exhaust duct 1916. For example, the end wall height 1914 may be equal to the exhaust height 1918 at the exit of exhaust duct 1916 (e.g., at end wall height 1914A) but decrease (e.g., taper) over a portion of the flap length 1906 (e.g., at end wall height 1914B, or a height of the end wall further along the end wall length 1912B, towards the trailing edge of main flap 1902 and aftward away from the exhaust area and exhaust duct 1916). For example, the end wall height 1914 may decrease to a value of zero over a portion of the flap length 1906 spanning from the exit of the exhaust duct 1916 to a position along the flap length 1906 at which a two-dimensional or substantially two-dimensional uniform exhaust sheet is turned over the trailing edge of main flap 1902, as shown with the dashed lines in one example of an end wall 1910 in FIG. 19. Additionally or alternatively, the end wall height 1914 may maintain a height equal to the vertical thickness (or height) of the jet over the entire flap length 1906 (i.e., matching the height of the jet as it is turned). In these examples, the end wall height 1914 may increase from a value equal to the exhaust height 1918 (e.g., at end wall height 1914A) to a value exceeding exhaust height 1918 as the height of the jet increases towards the trailing edge of main flap 1902. For example, the end wall height 1914 may increase, from a first height to a second height, in an aftward direction away from the exhaust area and the exhaust duct 1916. In certain embodiments, the end wall height 1914 may increase to a value of at least 150 percent of the exhaust height 1918 (producing a ratio of end wall height to exhaust height of at least 1.5, as described herein).

A variable end wall height (e.g., a height that matches the height of a portion or all of the jet from the exhaust duct 1916 along the entire flap length 1906) may cause or contribute to a uniform exhaust sheet with flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. For example, because a jet naturally expands, the jet will thicken as it exits the exhaust duct 1916 and interact with the freestream flow of air outside of the jet. Those of skill in the art will recognize that this may disrupt the jet and prevent the desired degrees of flow turning and efficiency as described herein. A variable end wall height, such as an end wall height that matches the height of the jet flow, may prevent interactions between the jet and the freestream flow while minimizing design/component costs to achieve the flow turning with efficiency as described herein that was, until now, unattainable.

In some examples, the end wall length 1912 may be measured and/or extend across an entire upper portion of the end wall 1910 (e.g., from a leading edge of the propulsor to the main flap 1902). In some examples, the end wall length 1912 may comprise a portion of the end wall 1910. For example, the end wall length 1912 may be measured and/or extend from the exit of exhaust duct 1916 and/or from a trailing edge of upper flap 1904 to a leading edge of the main flap 1902 (e.g., as shown for end wall length 1912A in FIG. 19). Additionally or alternatively, the end wall length 1912 may be measured and/or extend from the exit of the exhaust duct 1916 and/or from a trailing edge of upper flap 1904, across an upper surface of the main airfoil element and an upper surface of the main flap 1902, to a trailing edge of the main flap 1902 (e.g., as shown for end wall length 1912B in FIG. 19). Additionally or alternatively, the end wall length 1912 may extend at least from an articulatable (e.g., leading) edge of the main flap 1902 and to the trailing edge of the main flap 1902.

The end wall length 1912 may be any length sufficient to generate a uniform exhaust sheet as described herein. In some examples, either or both of the end wall length 1912 and end wall height 1914 may be designed relative to the flap length 1906. For example, either or both of the end wall length 1912 and end wall height 1914 may be designed to maintain a desired ratio between the end wall length 1912 (and/or end wall height 1914) and the flap length 1906. In some examples, the end wall 1910 may additionally include a contracting/turning vane (not shown) extending from a trailing terminal edge of the end wall 1910. In some examples, the contracting/turning vane may aid in achieving extreme degrees of flow turning (e.g., as much as 180 degrees) by contracting the exhaust flow. In some examples, the amount by which the exhaust flow is contracted may also or alternatively be optimized to generate the uniform exhaust sheet and achieve extreme degrees of flow turning as described herein.

The ratio of end wall height to exhaust height may be optimized to increase the degree to which flow can be turned while retaining a uniform exhaust sheet downstream of the propulsor. For example, during construction of the propulsor 1900, the end walls 1910 may be constructed such that the exhaust height 1918 (e.g., a reference exhaust height selected during construction) and the end wall height 1914 are tailored to an optimal ratio. In some examples, the end wall height 1914 may be increased to achieve an increase in the degree to which flow can be turned while retaining a uniform exhaust sheet flowing from the exhaust duct 1916 and turning over the main flap 1902. Increasing the end wall height 1914 increases the ratio between the end wall height 1914 and the exhaust height 1918. Additionally or alternatively, in certain embodiments, the ratio of end wall height to exhaust height (e.g., the instantaneous exhaust height 1918 at a given point in time) may be optimized by articulating, transitioning, and/or otherwise moving the upper flap 1904. For example, upper flap 1904 may have substantially the same features, and provide substantially the same benefits, as exhaust/upper flap 1812 as described herein with respect to FIGS. 18A-18C. In these examples, the upper flap 1904 may be articulated, transitioned, and/or otherwise moved downward and towards a horizontal axis of the propulsor 1900. Moving the upper flap 1904 downward and towards a horizontal axis of the propulsor 1900 may decrease the exhaust height and thus increase the ratio of end wall height to exhaust height. Also or alternatively, the upper flap 1904 may be articulated, transitioned, and/or otherwise moved upward and away from a horizontal axis of the propulsor 1900. Moving the upper flap 1904 upward and away from a horizontal axis of the propulsor 1900 may increase the exhaust height and thus decrease the ratio of end wall height to exhaust height. In certain embodiments, the upper flap 1904 may be articulated, transitioned, and/or otherwise moved between different positions as described above to achieve and/or maintain an optimal ratio of end wall height to exhaust height. For example, the ratio of end wall height to exhaust height may be optimized to between 0.5 and 2.0 (preferably at least 1.5, e.g., for VTOL operations) to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein.

In some examples, end wall heights 1914 exceeding a threshold value may increase costs, cause sharper stalling, and/or correspond to other diminishing returns. Accordingly, optimization of the ratio of end wall height to exhaust height may cause, and/or contribute to, generation of the uniform exhaust sheet and flow turning control as described herein. For example, the ratio of end wall height to exhaust height may be optimized to between 0.5 and 2.0 (preferably at least 1.5, e.g., for VTOL operations) to achieve flow turning as high as 180 degrees. The flow turning may be achieved, for example, by constructing the propulsor 1900 with one or more end walls 1910 having end wall heights 1914 that exceed exhaust height 1918 by at least a multiple of 1.5. As described herein, a variable end wall height (e.g., a height that matches the height of a portion or all of the jet from the exhaust duct 1916 along the entire flap length 1906) may cause or contribute to a uniform exhaust sheet with flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. A ratio of end wall height to exhaust height between, for example, 1.0 and 2.0 (preferably approximately 1.5) may contribute to and/or produce similar benefits to those described for a variable height end wall. For example, an end wall height to exhaust height ratio optimized to exceed 1.0 and up to 2.0 (preferably approximately 1.5) may prevent interactions between the jet and the freestream flow while minimizing design/component costs to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. As previously described, achieving these results was unexpected prior to implementation of the features described herein.

Conventional propulsion systems have not yet appreciated the impact of end wall height on flow turning and, as a result, may teach away from optimizing a ratio of end wall height to exhaust height. For example, conventional systems configured for transonic or supersonic operations may not optimize the ratio of end wall height to exhaust height because operation of such systems has not been observed to noticeably improve based changes to end wall height. As an example, the National Advisory Committee for Aeronautics (NACA) conducted a study in September of 1958, titled "Use of the Coanda Effect for Jet Deflection and Vertical Lift with Multiple-Flat-Plate and Curved-Plate Deflection Surfaces," which is incorporated by reference herein. The NACA study attached side plates to delay jet-stream detachment from the deflection plates. The NACA study notes the results were obtained using side plates of equal height to the nozzle height (i.e., the exhaust height). The NACA study mentions that side plates equal to twice the nozzle height were also used, but noted, importantly as relevant to the present disclosures, that the use of such side plates failed to produce any difference from what was achieved using side plates equal to the nozzle height. The NACA study thus failed to appreciate the role of the ratio between the height of the end wall and the height of the exhaust area, which the present inventors have shown to contribute to and facilitate improved flow turning beyond what could be achieved in the NACA study. The NACA study, for example, did not achieve flow turning between 85 degrees and 180 degrees with a gross thrust coefficient of at least 0.7 (i.e., a thrust efficiency of at least 70 percent) as enabled by the features disclosed herein, even with the use of side plates twice the nozzle height. The NACA study also notes that they did not determine an optimum shape or height for the side plates. The results of the NACA study thus may teach away from the use of end walls as described herein and, in the decades since the NACA study, conventional propulsion systems have failed to achieve flow turning between 85 degrees and 180 degrees with a gross thrust coefficient of at least 0.8 (i.e., a thrust efficiency of at least 70 percent) using features, such as an end wall height to exhaust height ratio optimized between 0.5 and 2.0 (preferably at least 1.5, e.g., for VTOL operations), as described herein. A propulsor utilizing features described herein and integrated with an aircraft designed for subsonic operations may achieve flow turning as high as 180 degrees, while conventional systems may fail to exceed 90 degrees of flow turning with an efficiency of at least 70 percent.

It should be understood that, in some examples, ratios of other dimensions of an end wall 1910 to exhaust height may be optimized to achieve similar results to those described above. For example, the degree to which flow can be turned while retaining a uniform exhaust sheet downstream of the propulsor may be increased by increasing (e.g., during construction) end wall length 1912. For example the end wall length 1912 may extend from the exit of the exhaust duct 1916 and/or from a trailing edge of upper flap 1904 to a trailing edge of the main flap 1902 (e.g., as shown for end wall length 1912B in FIG. 19). Put differently, the end wall length 1912 may extend in a direction aftward of the exhaust area/exhaust duct 1916 across an upper surface of the airfoil and across an upper surface of the main flap 1902. In these examples, the end wall 1910 may protect the entire area over which the jet flow is turned, which may cause or contribute to the formation of the uniform exhaust sheet as described herein by preventing interference from the freestream flow while the jet flow is turned over the trailing edge of the main flap 1902. Thus, optimization of end wall length to exhaust height may achieve similar benefits as those described above with respect to optimization of end wall height to exhaust height.

One or more features and/or optimization methods described herein may be performed, alone or in combination, to generate a uniform exhaust sheet and control flow turning to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. Put differently, the one or more features and/or optimization methods described herein may, alone or in combination, generate a uniform, two-dimensional exhaust sheet, free (or substantially free) of swirling, that is blown downstream of the exhaust plane of a propulsor and over a movable flap of the system to turn the flow of the exhaust sheet to a desired degree and with a desired efficiency. For example, in certain embodiments, an integrated array of propulsors as described herein may be combined with end walls and optimization of a ratio of end wall height to exhaust height to generate a uniform exhaust sheet and control flow turning. In certain embodiments, an integrated array of propulsors as described herein may be combined with end walls, optimization of a ratio of end wall height to exhaust height, optimization of a ratio of flap length to exhaust height, and optimization of a ratio of flap radius to exhaust height to generate a uniform exhaust sheet and control flow turning. In certain embodiments, an integrated array of propulsors without end walls as described herein may be combined with optimization of a ratio of flap length to exhaust height and optimization of a ratio of flap radius to exhaust height to generate a uniform exhaust sheet and control flow turning. In certain embodiments, an integrated array of propulsors without end walls as described herein may be combined with optimization of a ratio of flap length to exhaust height alone to generate a uniform exhaust sheet and control flow turning. In certain embodiments, one or more of the combinations above may be combined with optimization of end wall length, location angle of an exhaust/upper flap, expansion ratio, end wall placement (e.g., at a fuselage, wing, boom, and/or other component of an aircraft), variable height end walls, use of a variable flap radius, and/or any other features described herein.

The above described features and combinations may be used to improve over conventional propulsion systems. As previously described, conventional systems may fail to exceed 90 degrees of flow turning with an efficiency of at least 70 percent. Flow turning exceeding 90 degrees (e.g., between 90 degrees and 180 degrees) at an efficiency of at least 70 percent may be beneficial in, for example, VTOL operations, where a high degree of flow turning at a high degree of efficiency is required. However, it should be understood that the features described herein provide improvements over conventional systems when applied to other modes of operation (e.g., STOL, CTOL, and/or other aircraft operations) as well. For example, while conventional systems may be able to achieve flow turning of 45 degrees, the features and combinations described above enable flow turning of, for example, 45 degrees with an efficiency of at least 90 percent. Conventional systems cannot achieve this degree of efficiency at 45 degrees of flow turning. Flow turning of, for example, between 45 degrees and 60 degrees (preferably 45 degrees, e.g., for STOL operations) with an efficiency of at least 90 percent and/or between 60 degrees and 85 degrees with an efficiency of at least 80 percent may be desired for operations other than VTOL, such as STOL and/or CTOL. In these examples, the efficiency achievable using the features and/or combinations of features described herein would offer an improvement over what might be obtained using conventional systems. It should be understood that the above combinations are merely illustrative and that other combinations of features and methods as described herein may be used to generate a uniform exhaust sheet and control flow turning. As such as aspects of this disclosure are directed towards improved systems and methods for thrust vector control of aircraft.

Figure 21:
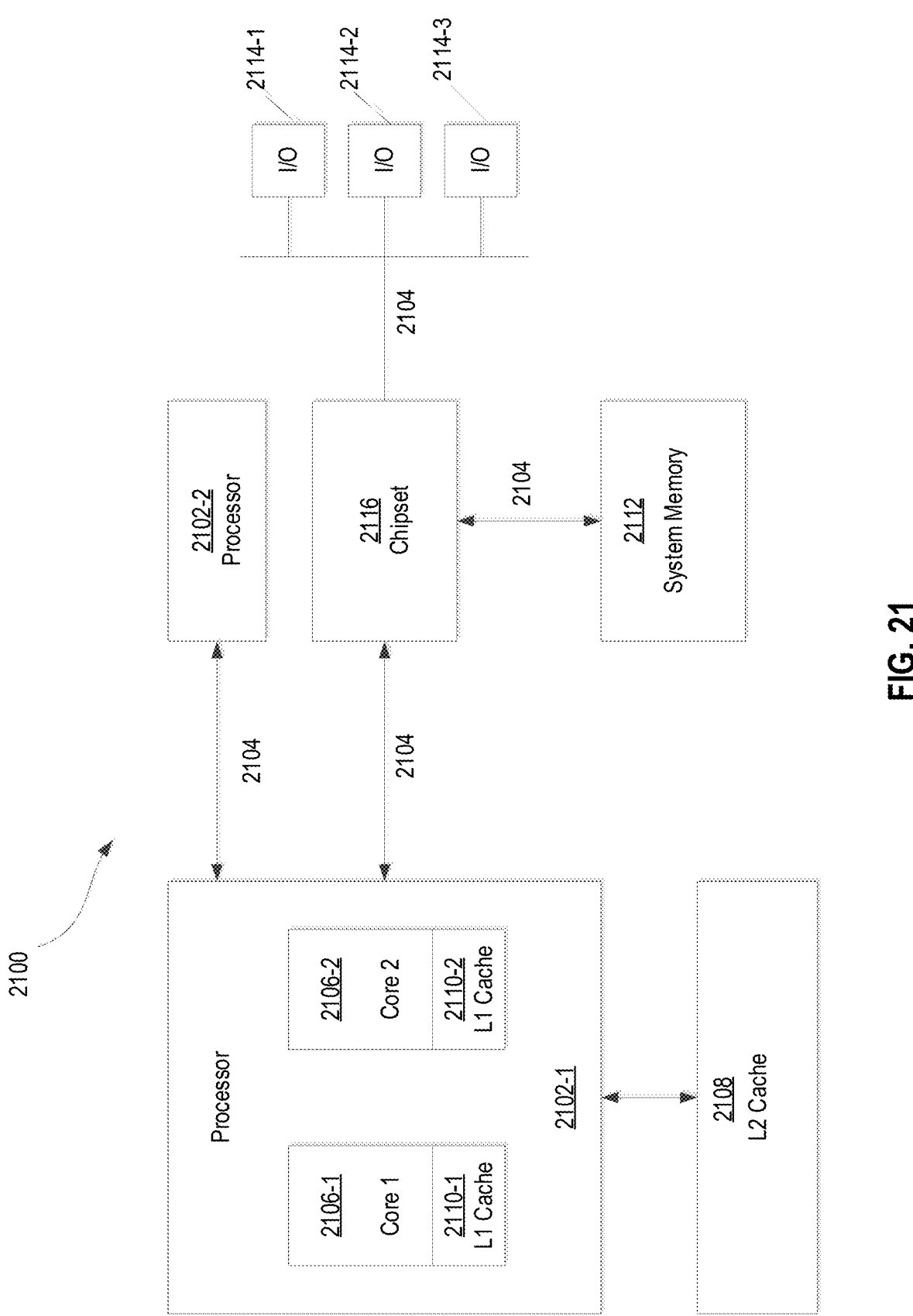
FIG. 21 illustrates an example flight control computer that may be part of or in communication with the aircraft and related systems of FIGS. 1A-19 and 23.

The features and/or optimizations described herein that generate a uniform exhaust sheet and control flow turning to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein may be referred to, for convenience, as a flow turning control system. Referring to FIG. 19, for example, an aircraft may include a flow turning control system 1950. The flow turning control system described herein (e.g., flow turning control system 1950) is configured to control turning of a flow of air propelled across the upper surface of an airfoil (e.g., a wing, tail, and/or other airfoils) by an array of propulsors (e.g., an array of propulsors including multiple propulsors like propulsor 1900). The flow turning control system may include one or more end walls each defining a terminal end of an array of propulsors. For example, a flow turning control system may include a first end wall that defines a first terminal end of the array of propulsors (e.g., a portion of a fuselage of the aircraft) and a second, opposite end wall that defines a second, opposite terminal end of the array of propulsors (e.g., a boom, a winglet). The one or more end walls may also define at least a portion of an exhaust area of the array of propulsors. The exhaust area may have one or more exhaust heights. For example, the exhaust area may have a reference exhaust height selected during design and implemented during construction. The exhaust area may additionally or alternatively have an instantaneous exhaust height that is modified by articulation of one or more movable flaps. The flow turning control system may include movable flaps. For example, a flow turning control system may include an upper flap (e.g., upper flap 1904) and a main flap (e.g., main flap 1902). The upper flap may be attached to the array of propulsors aftward of (behind) an exhaust area defined by the array of propulsors. The upper flap may be attached to the top end of the array of propulsors and thus be located above the wing of the aircraft as seen in FIG. 19. The upper flap may define (e.g., at a trailing edge) an exhaust height (e.g., exhaust height 1918) and a terminal end of an exhaust duct (e.g., exhaust duct 1916). As described herein, the upper flap is configured to provide a ratio (e.g., by modifying the instantaneous height of an exhaust area, such as exhaust height 1918) between the height of the end wall and the height of the exhaust area between 0.5 and 2.0 (preferably at least 1.5, e.g., for VTOL operations). As also described herein, the upper flap is configured to provide a ratio (e.g., by modifying the instantaneous height of an exhaust area, such as exhaust height 1918) between a flap radius of the main flap and the height of the exhaust area that is between 1.0 and 5.0, or at least 2 and up to 2.5 for certain operations (e.g., VTOL). As further described herein, the upper flap is configured to provide a ratio (e.g., by modifying the instantaneous height of an exhaust area, such as exhaust height 1918) between a flap length of the main flap and the height of the exhaust area that is between 2 and 10. The main flap may be attached to the wing of the aircraft aftward of (behind) the exhaust area. As described herein, the main flap is configured to provide a ratio between a length of the second movable flap and the height of the exhaust area (e.g., the reference height and/or the instantaneous height) that is between 2 and 10. The configuration of the flow turning control system, therefore, enables selective flow turning control of the flow of air over a trailing edge of the main flap between 45 degrees and 60 degrees (preferably 45 degrees, e.g., for STOL operations), between 60 degrees and 85 degrees, between 85 and 180 degrees (e.g., at least 90 degrees and up to 180 degrees), and/or other degrees of flow turning as described herein. The configuration of the flow turning control system further enables the selective flow turning to achieve flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies as described herein. Adjustment of the flow turning may be achieved using control signals that actuate one or more of the upper flap and/or the lower flap. Actuating the upper flap, for example, modifies the height of the exhaust area and thus the total exhaust area thereby modifying the ratio between the height of the end wall and the height of the exhaust area as well as the ratio between the length of the main flap and the height of the exhaust area and/or the radius of the main flap and the height of the exhaust area. The control signals that actuate the upper flap and/or main flap may be based on (e.g., correspond to) an input signal. The input signal may indicate an adjustment to the flow turning of the flow of air. The input signal, for example, may indicate a desired degree of flow turning (e.g., 45 degrees, 90 degrees, 120 degrees, 170 degrees, etc.), an increase to the current degree of flow turning, a decrease to the current degree of flow turning, a direction of actuation (e.g., up, down, forward, backward), a distance of actuation, a position of the flap, and the like. The control signal may be provided by a control unit or controller (e.g., a control computer 2100 as shown in FIG. 21 and described herein). In some embodiments, the control unit or controller may be part of the flow turning control system or be a separate avionics component of the aircraft.

It should be understood that, in certain embodiments, the improvements over conventional systems as described herein may be provided by designing/constructing the flow turning control system with a particular reference exhaust height instead of, or in addition to, by actuating the upper flap and/or the main flap. For example, the flow turning control system may have a reference exhaust height, as described herein, configured to achieve one or more of the ratios. Referring again to FIG. 18A, for example, a flow turning control system as described herein may include a reference exhaust area. The reference exhaust area may be the area/region between the trailing edge of the exhaust/ upper flap 1812 and upper surface of the main airfoil element 1804 when all flaps (e.g., exhaust/upper flap 1812, main flap 1810, and/or other flaps) are at their neutral positions. The reference exhaust area may be the area/region between the trailing edge of the exhaust/upper flap 1812 and upper surface of the main airfoil element 1804 when all flaps (e.g., exhaust/upper flap 1812, main flap 1810, and/or other flaps) are positioned/configured for the highest achievable degree of flow turning (e.g., 45 degrees, 60 degrees, 90 degrees, 145 degrees, and/or other degrees depending on the requirements of a given operation of the aircraft). The reference exhaust area may have a height (i.e., a reference exhaust height), measured from a lower surface of the upper airfoil element 1806 to an upper surface of the main airfoil element 1804, at a position aftward of the propulsor system 1800, configured to achieve an optimal expansion ratio as described herein. In these examples, based on the reference exhaust area/reference exhaust area height, other components of the propulsor system (e.g., components of the flow control system described herein), such as the end wall height, flap length, flap radius, or the like, may be designed/ constructed to achieve an optimal ratio of end wall height to reference exhaust height, an optimal ratio of flap length to reference exhaust height, an optimal ratio of flap radius to reference exhaust height, and/or other optimized ratios described herein. In these examples, the reference exhaust height may be selected during construction and may remain constant even as the exhaust/upper flap 1812 is articulated, transitioned, and/or otherwise moved to modify an instantaneous exhaust area height (e.g., exhaust height/exhaust plane 1828). Further, in these examples, by designing/ constructing the flow turning control system to achieve one or more of the optimized ratios described herein relative to a reference exhaust height, the corresponding benefits described herein may be achieved. For example, by design-ing/constructing the flow turning control system with a reference exhaust height configured to achieve a ratio of end wall height to reference exhaust height of at least 1.5 and up to 2.0, a ratio of flap length to reference exhaust height between 2 and 10, a ratio of flap radius to reference exhaust height between 2 and 2.5, and/or other ratios described herein, the flow turning control system may achieve flow turning between, for example, 85 degrees and 180 degrees (e.g., at least 90 degrees and up to 180 degrees) with an efficiency of at least 70 percent. Also or alternatively, by designing/constructing the flow turning control system with a reference exhaust height and additional geometric param-eters (e.g., end wall height, flap length, flap radius) config-ured to achieve different ratios (e.g., a ratio of end wall height to reference exhaust height between 0.5 and 2.0, a ratio of flap length to reference exhaust height between 2.0 and 10.0, a ratio of flap radius to reference exhaust height between 1.0 and 5.0, and/or other ratios), the flow turning control system may enable flow turning of, for example, between 45 degrees and 60 degrees (preferably 45 degrees, e.g., for STOL operations) with an efficiency of at least 90 percent, between 60 degrees and 85 degrees with an effi-ciency of at least 80 percent, between 85 and 180 degrees (e.g., at least 90 degrees and up to 180 degrees) with an efficiency of at least 70 percent, and/or other degrees of flow turning and efficiencies as described herein. These ratios may be different for different modes of operation of an aircraft implementing a flow turning control system described herein. For example, different ratios of end wall height to reference exhaust height (e.g., between 0.5 and 1.0 for STOL operations, or between 1.0 and 2.0, preferably at least 1.5, for VTOL operations), flap radius to exhaust height (e.g., between 1.0 and 2.0 for STOL operations, or between 2.0 and 5.0, preferably between 2.0 and 2.5, for VTOL operations), flap length to exhaust height (e.g., between 2.0 and 10.0 for STOL and/or VTOL operations) may be used (e.g., based on design of the flow turning control system) to achieve the desired degrees of flow turning and desired efficiencies described herein. In these examples, actuation of the upper/exhaust flap 1812 and/or actuation of the main flap 1810 will not affect the ratios measured relative to the reference exhaust height as described above. It should be understood that in these examples actuation of the upper/ exhaust flap 1812 and/or actuation of the main flap 1810 will continue to affect the instantaneous exhaust height, and associated ratios measured relative to instantaneous exhaust height, as described herein. In these examples, adjustment of the flow turning may be achieved using control signals that actuate one or more of the upper flap and/or the lower flap to modify the instantaneous exhaust height. Further, in these examples, because the reference exhaust height is part of the design of the flow turning control system, the ratio of end wall height to reference exhaust height, the ratio of flap length to reference exhaust height, the ratio of flap radius to reference exhaust height, and/or other ratios described herein may remain constant during actuation of the upper/ exhaust flap 1812 and/or of the main flap 1810.

Figure 20A:
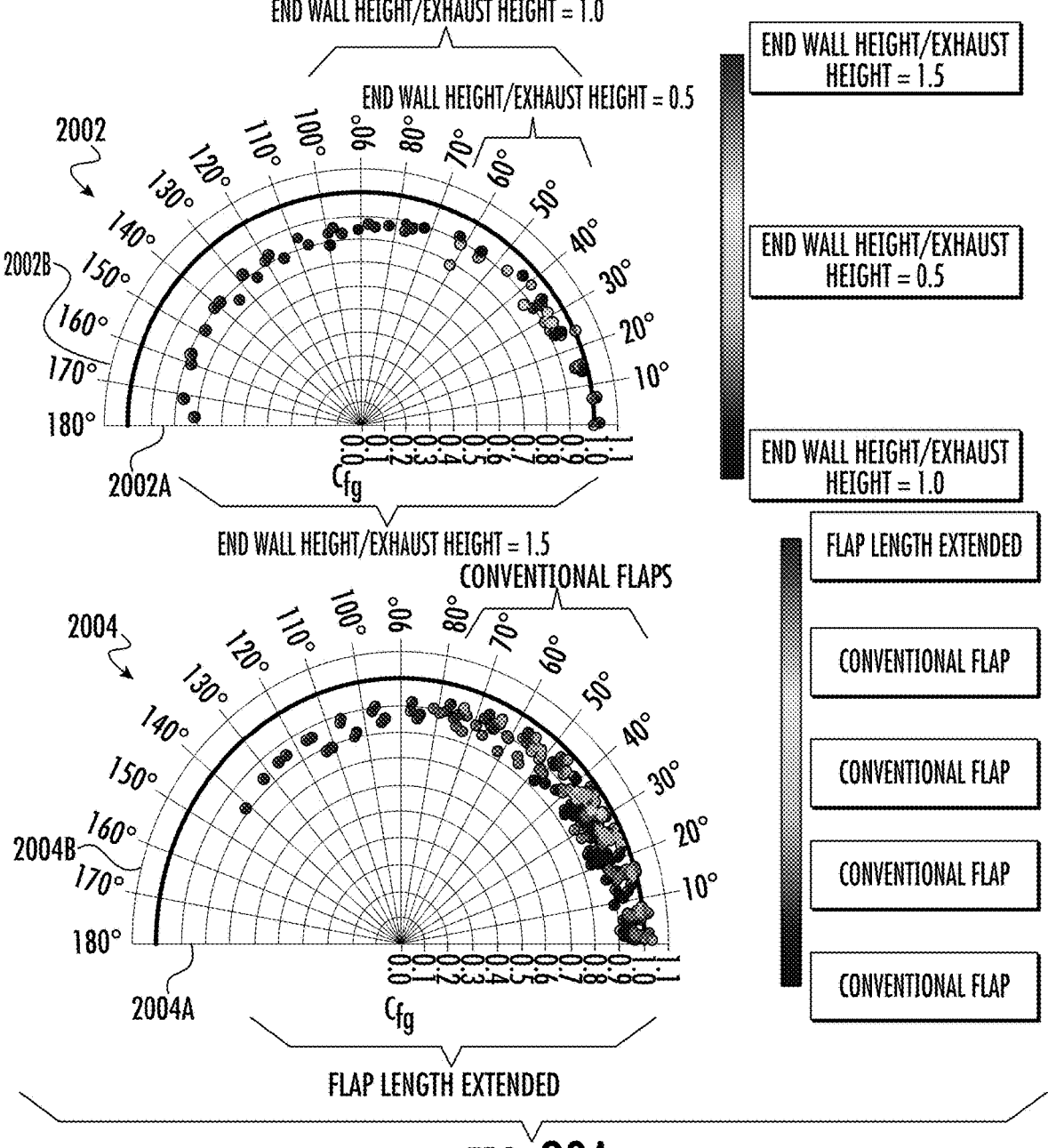
FIGS. 20A-20D illustrate example charts indicating performance parameters achieved by using different configurations of propulsors and exhaust ratios according to one or more arrangements.
Figure 20B:
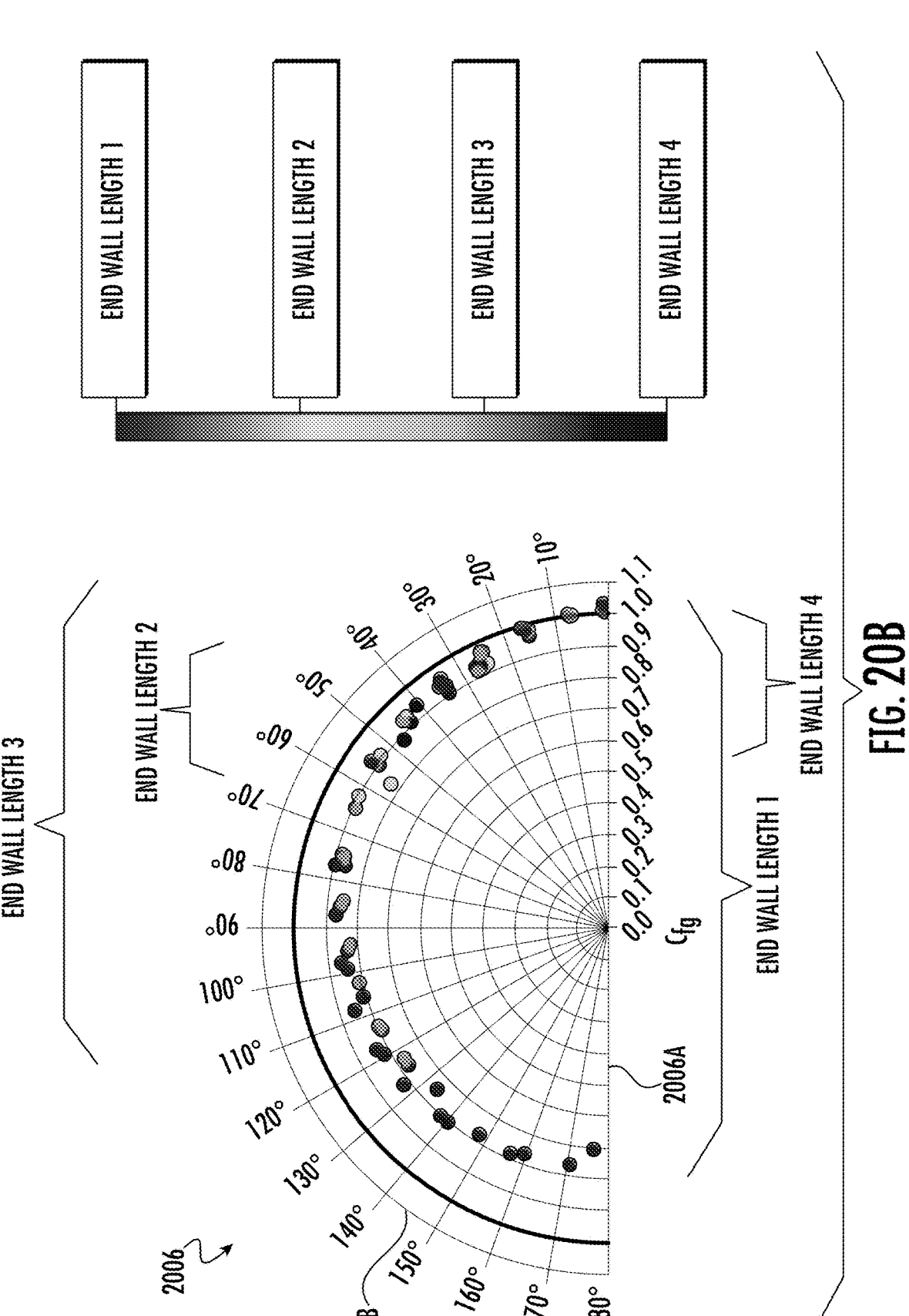

FIGS. 20A-20D illustrate example charts indicating per-formance parameters achieved by using different configu-rations of propulsors and exhaust ratios according to one or more arrangements. FIGS. 20A-20B specifically illustrate example charts indicating gross thrust coefficients and degrees of flow turning achieved by using different configu-rations of propulsors and exhaust ratios according to one or more arrangements as described herein. Referring to FIG. 20A, chart 2002 illustrates example results of optimizing the ratio of end wall height to exhaust height as described herein. A first axis 2002A of chart 2002 corresponds to a gross thrust coefficient (CFg) representing thrust efficiency (e.g., the ratio of actual thrust to ideal thrust) achieved by a propulsor optimizing the ratio of end wall height to exhaust height as described herein. A second axis 2002B of chart 2002 corresponds to the degree to which flow was successfully turned over a movable trailing edge of the propulsor. As shown in chart 2002, flow turning of, for example, between 45 degrees and 60 degrees (preferably 45 degrees, e.g., for STOL operations) with an efficiency of at least 90 percent, between 60 degrees and 85 degrees with an efficiency of at least 80 percent, between 85 and 180 degrees (e.g., at least 90 degrees and up to 180 degrees) with an efficiency of at least 70 percent, and/or other degrees of flow turning and efficiencies may be achieved. For example, flow turning of at least 90 degrees and up to approximately 145 degrees may be achieved, by optimizing the ratio of end wall height to exhaust height to approximately 1.5, with an efficiency of at least 80 percent. Also or alternatively, flow turning of approximately 180 degrees may, in some examples, be achieved by optimizing the ratio of end wall height to exhaust height to approximately 1.5, with an efficiency of approximately 70 percent. As described else- where herein, these results were unexpected given that conventional systems (such as the those used in the NACA study) have not achieved flow turning above 90 degrees with at least 70 percent efficiency regardless of whether the ratio of end wall height to exhaust height exceeded 1.0.

As shown in chart 2002, other ratios of end wall heights to exhaust heights may also be used to achieve a desired degree of flow turning with a desired efficiency (e.g., for different modes of operation). For example flow turning of 45 degrees may be achieved with an efficiency of at least 90 percent using a ratio of end wall height to exhaust height of 0.5, 1.0, or 1.5. In these examples, the efficiency of the flow turning offers improvements over conventional systems that might achieve the same degree of flow turning. For example, flow turning of 45 degrees with an efficiency of at least 90 percent may offer improvements, for CTOL and/or STOL aircraft, over conventional aircraft using conventional pro- pulsion systems.

Chart 2004 illustrates example results of extending a flap length of a propulsor (e.g., to optimize a ratio of flap length to exhaust height). A first axis 2004A of chart 2004 corre- sponds to the gross thrust coefficient. A second axis 2004B of chart 2004 corresponds to the degree to which flow was successfully turned over a movable trailing edge of the propulsor. As shown in chart 2004, flow turning of approxi- mately 140 degrees at approximately 88 percent may be achieved, in some examples, by extending a flap length (e.g., to optimize a ratio of flap length to exhaust height as described herein). Additionally, as shown in chart 2004, flow turning of approximately 90 degrees may be achieved with thrust efficiency of approximately 88 percent using the features described herein, while conventional propulsors may fail to achieve flow turning of approximately 90 degrees entirely.

Referring to FIG. 20B, chart 2006 illustrates example results of extending the end wall length to optimize end wall length and/or to optimize a ratio of end wall length to exhaust height. A first axis 2006A of chart 2006 corresponds to the gross thrust coefficient. A second axis 2006B of chart 2006 corresponds to the degree to which flow was success- fully turned over a movable trailing edge of the propulsor. As shown in chart 2006 flow turning between 85 and 180 degrees may be achieved with an efficiency of at least 70 65 percent. For example, flow turning of at least 90 degrees and up to approximately 145 degrees may be achieved, by optimizing the end wall length to end wall length 1, with an efficiency of at least 80 percent. Also or alternatively, flow turning of up to 180 degrees may be achieved, by optimizing the end wall length to end wall length 1, with an efficiency of at least 70 percent. End wall length 1 corresponds to an end wall length extending from the exhaust area of a propulsor to the end of the trailing edge of the main flap of the propulsor. Additionally or alternatively, flow turning of an efficiency exceeding 80 percent may be achieved using end walls of decreasing lengths (e.g., end wall lengths 2, 3, and 4) but, as chart 2006 shows, with diminishing degrees of flow turning. Chart 2006 indicates the benefits of optimizing end wall length to extend from the exhaust area of a propulsor to the end of the trailing edge of the main flap of the propulsor.

It should be understood that the example gross thrust coefficients and degrees of flow turning of FIGS. 20A-20B are merely illustrative of experiments in a certain set of test conditions. In some examples, the degree to which flow may be turned and/or the thrust efficiency may be improved beyond the values shown in FIG. 20A-20B using features as described herein. For example, with respect to the measure location used to produce the results in FIGS. 20A-20B, efficiencies were measured from a stator exit plane down- stream of a stator of the propulsive system, rather than from the exhaust plane. Accordingly, friction losses attributable to the duct between the stator exit plane and the exhaust plane are present in the results depicted in FIGS. 20A-20B. The efficiencies attributed to conventional systems are measured from the exhaust plane and thus may be artificially inflated relative to the results produced by utilizing features described herein. Put differently, the thrust efficiency shown in FIGS. 20A-20B for systems utilizing features described herein would be increased if, like the conventional systems, the efficiency was measured from the exhaust plane. There- fore, it should be understood that the thrust efficiency achieved in the examples shown in FIGS. 20A-20B offers improvements, in both the degree of flow turning that may be achieved and the efficiency at which such degrees of flow turning may be achieved, that exceed those of conventional systems beyond what is shown in FIGS. 20A-20B. Those skilled in the art with the benefit of this disclosure will appreciate that embodiments of this disclosure may also achieve greater degrees of flow turning, with greater effi- ciency, than those examples depicted in FIGS. 20A-20B.

Figure 20C:
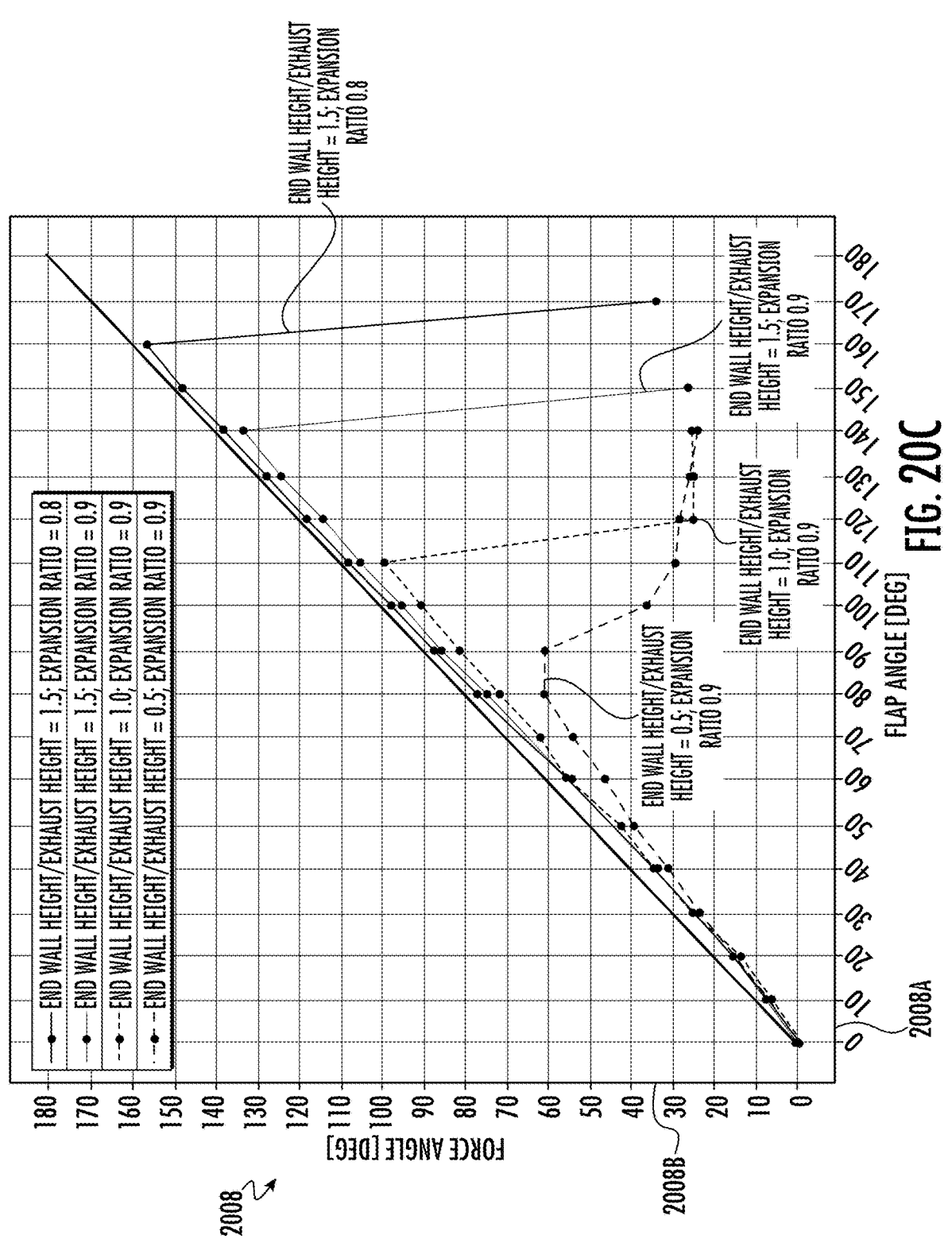
Figure 20D:
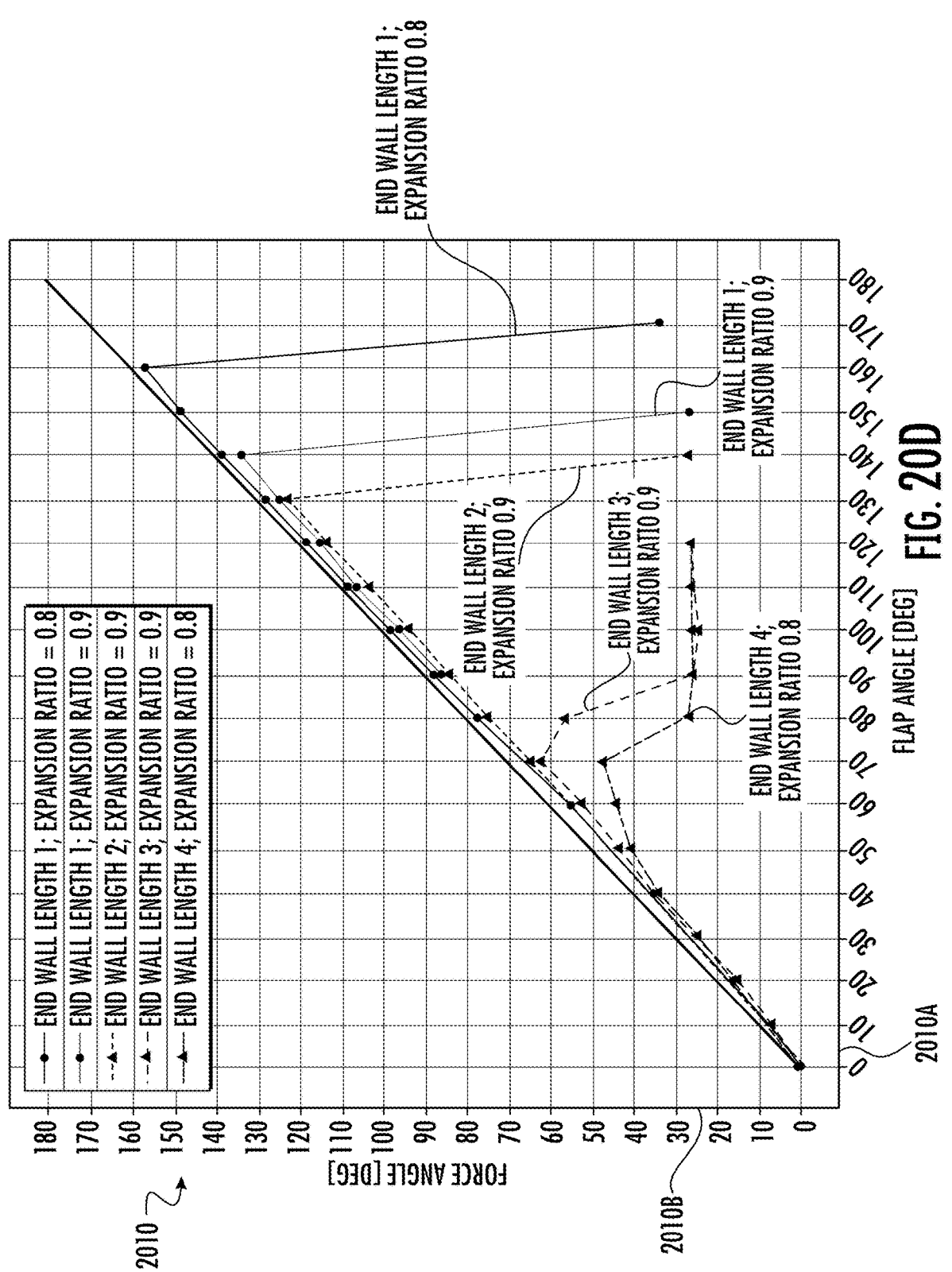

FIGS. 20C-20D specifically illustrate example charts indicating force angles achieved for different flap angles (e.g., corresponding to degrees of flow turning) by using different configurations of propulsors and exhaust ratios according to one or more arrangements as described herein. Referring to FIG. 20C, chart 2008 illustrates example results of optimizing the ratio of end wall height to exhaust height as described herein. A first axis 2008A of chart 2008 corresponds to the flap angle (i.e., the angle at which the flap of the propulsor is deflected from a horizontal axis of the propulsor). A second axis 2008B of chart 2008 corresponds to a force angle, or the resultant angle of force due to flow deflection, measured relative to the same horizontal axis of the propulsor as the flap angle. Those of skill in the art with the benefits of this disclosure will recognize that a force angle corresponds to lift achieved by a propulsor optimizing the ratio of end wall height to exhaust height as described herein.

Chart 2008 measures the effects of different ratios of end wall height to exhaust height on the stall angle (i.e., the angle at which lift is maximized and beyond which stall occurs) of the wing or flap of an aircraft implementing a flow control system as described herein. Those of skill in the art will recognize that the stall angle is the value of the flap angle on first axis 2008A at the point beyond which the force angle along second axis 2008B experiences a sharp drop. As shown in chart 2008, a ratio of end wall height to exhaust height of approximately 1.5 prevents stalling up to a flap angle of approximately 140 degrees when an expansion ratio of the propulsor is approximately 0.9, and prevents stalling up to a flap angle of approximately 160 degrees when an expansion ratio of the propulsor is approximately 0.8. These results illustrate the importance of optimizing the ratio of end wall height to exhaust height as described herein. Put differently, in order to maintain stable flight at degrees of flow turning between 90 and 180 degrees, the ratio of end wall height to exhaust height should be optimized to prevent stall at high degrees of flow turning. These results also illustrate the benefits of optimizing an expansion ratio of the propulsor to an expansion ratio of less than 1 as described herein. For example, as shown in chart 2008, an expansion ratio of 0.8 produced improved results as compared to an expansion ratio of 0.9. While other factors may influence the optimal expansion ratio, chart 2008 illustrates the value of optimizing the expansion ratio to achieve desired degrees of flow turning.

Referring to FIG. 20D, chart 2010 illustrates example results of extending the end wall length to optimize end wall length and/or to optimize a ratio of end wall length to exhaust height. A first axis 2010A of chart 2010 corresponds to the flap angle. A second axis 2010B of chart 2010 corresponds to the force angle. Chart 2010 measures the effects of different end wall lengths on the stall angle of the wings and/or flaps as described herein. Those of skill in the art will recognize that the stall angle is the value of the flap angle on first axis 2010A at the point beyond which the force angle along second axis 2008B experiences a sharp drop. As shown in chart 2010, use of an end wall with end wall length 1 prevents stalling up to a flap angle of approximately 140 degrees when an expansion ratio of the propulsor is approximately 0.9, and prevents stalling up to a flap angle of approximately 160 degrees when an expansion ratio of the propulsor is approximately 0.8. End wall length 1 corresponds to an end wall length extending from the exhaust area of a propulsor to the end of the trailing edge of the main flap of the propulsor. These results illustrate the benefits of optimizing the end wall length to extend from the exhaust area of a propulsor to the end of the trailing edge of the main flap of the propulsor (e.g., to match a height of the jet flow as it is turned over the trailing edge of the main flap) as described herein.

Aspects of this disclosure further relate to one or more non-transitory computer-readable mediums that comprise computer-readable instructions that when executed by a processor, cause the processor to perform at least one or more functions as disclosed herein, such as, but not limited to, controlling operation of one or more air-moving devices (e.g., a propulsor) and/or flow turning control systems, receiving input signals indicating an adjustment to the flow turning of a flow of air produced by an air-moving apparatus, causing adjustment to flow turning of the flow of air, actuating one or more movable flaps, and/or other functions. FIG. 21, for example, depicts a block diagram of example components of a control computer that may be part of or in communication with an air-moving apparatus and/or a flow turning control system in accordance with aspects of the present disclosure. FIG. 21 depicts one non-limiting example of a computer-readable medium according to some examples. Specifically, FIG. 21 illustrates a block diagram of control computer 2100 for an air-moving apparatus and/or a flow turning control system as described herein. Those skilled in the art will appreciate that the disclosures associated with FIG. 21 may be applicable to any system, aircraft, air-moving apparatus, air-moving apparatus control system, and/or flow turning control system disclosed herein and/or combinations thereof. Control computer 2100 may include one or more processors, such as processor 2102-1 and 2102-2 (generally referred to herein as "processors 2102" or "processor 2102"). Processors 2102 may communicate with each other or other components via an interconnection network or bus 2104. Processor 2102 may include one or more processing cores, such as cores 2106-1 and 2106-2 (referred to herein as "cores 2106" or more generally as "core 2106"), which may be implemented on a single integrated circuit (IC) chip.

Cores 2106 may have a shared cache 2108 and/or a private cache (e.g., caches 2110-1 and 2110-2, respectively and referred to herein as "caches 2110"). One or more caches 2108/2110 may locally cache data stored in a system memory, such as memory 2112, for faster access by components of the processor 2102. Memory 2112 may be in communication with the processors 2102 via a chipset 2116. Cache 2108 may be part of system memory 2112 in certain examples. Memory 2112 may include, but is not limited to, random access memory (RAM), read only memory (ROM), and include one or more of solid-state memory, optical or magnetic storage, and/or any other medium that can be used to store electronic information. Yet other examples may omit system memory 2112.

Control computer 2100 may include one or more I/O devices (e.g., I/O devices 2114-1 through 2114-3, each generally referred to as I/O device 2114). I/O data from one or more I/O devices 2114 may be stored at one or more caches 2108, 2110 and/or system memory 2112. Each of I/O devices 2114 may be permanently or temporarily configured to be in operative communication with a component of an apparatus, such as an air-moving apparatus and/or flow turning control system, using any physical or wireless communication protocol.

Although computer 2100 is shown on a single drawing, it will be appreciated with the benefit of this disclosure that one or more components may be "remote" with respect to another component. For example, in one example, one or more components may be in a separate housing from one or more other components. In some examples, one or more components of the computer 2100 may only be in wireless communication with other components of the computer 2100. In some examples, one or more components of computer 2100 may be located on or within a portion of an air-moving apparatus and/or flow turning control system, and yet other components may be located remote with respect to the air-moving apparatus and/or flow turning control system.

In certain embodiments, moving a control surface (e.g., a flap) of an aircraft, including any control surface disclosed herein to a position and/or orientation may be based, at least in part, on one or more calculations, determinations, inputs, and or outputs of computer 2100. As non-limiting examples, position and/or orientation of one or more control surfaces may be based on operational parameters such as the final angle and/or the final extended/retracted position that one or more flaps are moved to (e.g., articulated to) during a particular instance of implementing a position and/or orientation, whether one or more control surfaces are articulated at a variable rate, the variable or constant rate implemented, a desired speed or acceleration along one or more directions (inclusive of a reduction of acceleration or velocity), weather parameters, including but not limited to wind direction or speed, weight or weight distribution of the craft or portion of the craft, amongst others.

Although examples are described above, features of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The application may extend to the subject-matter of any of the following numbered statements:

Statement 1. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors;

a first movable flap attached to the array of propulsors aftward of the exhaust area and above the wing of the aircraft, wherein the first movable flap is configured to provide a ratio, between a height of the end wall and a height of the exhaust area, that is at least 1.5 and up to 2.0; and a second movable flap attached to the wing of the aircraft aftward of the exhaust area, wherein the second movable flap is configured to provide a ratio, between a length of the second movable flap and the height of the exhaust area, that is between 2 and 10;

wherein the flow turning control system enables selective flow turning of the flow of air over a trailing edge of the second movable flap of at least 90 degrees and up to 180 degrees; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

Statement 2. The aircraft of Statement 1, wherein the flow turning control system further enables the selective flow turning with a ratio between actual thrust and ideal thrust of at least 70 percent and up to 90 percent.

Statement 3. The aircraft of Statement 1 or 2, wherein the exhaust area comprises a contracting exhaust area.

Statement 4. The aircraft of any of the preceding Statements, wherein the height of the end wall comprises a first height at a first position of the end wall and a second height, different than the first height, at a second position of the end wall that is aftward of the first position.

Statement 5. The aircraft of Statement 4, wherein the second height exceeds the first height.

Statement 6. The aircraft of Statement 4 or 5, wherein the end wall comprises a variable height that increases from the first height to the second height in an aftward direction away from the exhaust area.

Statement 7. The aircraft of any of the preceding Statements, wherein the flow turning control system further comprises a first radius of curvature of the second movable flap at an articulatable edge of the second movable flap and a second radius of curvature of the second movable flap, different than the first radius of curvature, at a trailing edge of the second movable flap.

Statement 8. The aircraft of any of the preceding Statements, wherein the end wall comprises a boom positioned at an edge of the wing.

Statement 9. The aircraft of any of the preceding Statements, wherein the end wall comprises a portion of a fuselage of the aircraft.

Statement 10. The aircraft of any of the preceding Statements, wherein the end wall extends from an articulatable edge of the first movable flap to the trailing edge of the second movable flap.

Statement 11. The aircraft of any of the preceding Statements, wherein the end wall extends in a direction aftward of the exhaust area across an upper surface of the wing and across an upper surface of the second movable flap.

Statement 12. The aircraft of any of the preceding Statements, wherein the first movable flap is configured to extend, away from the exhaust area, a maximum distance that is less than a distance between the exhaust area and an articulatable edge of the second movable flap.

Statement 13. The aircraft of any of the preceding Statements, wherein the first movable flap is further configured to provide, by modifying the height of the exhaust area, a ratio between a flap radius of the second movable flap and the height of the exhaust area, that is at least 2 and up to 2.5.

Statement 14. The aircraft of any of the preceding Statements, wherein the flow turning control system further enables selective flow turning of the flow of air over the trailing edge of the second movable flap of at least 45 degrees and up to 60 degrees with a ratio between actual thrust and ideal thrust of at least 90 percent and up to 100 percent.

Statement 15. The aircraft of any of the preceding Statements, wherein the flow turning control system further enables selective flow turning of the flow of air over the trailing edge of the second movable flap of at least 60 degrees and up to 90 degrees with a ratio between actual thrust and ideal thrust of at least 80 percent and up to 100 percent.

Statement 16. The aircraft of any of the preceding Statements, wherein the height of the exhaust area is an instantaneous exhaust height that is based on a position, of the first movable flap, between a first maximum position of the first movable flap and a second maximum position, opposite the first maximum position, of the first movable flap.

Statement 17. An air-moving apparatus for an aircraft, the air-moving apparatus comprising:

an array of propulsors defining an exhaust area, wherein the array of propulsors is positioned on an upper surface of a wing of the aircraft and at a leading edge of the wing; and a flow turning control system configured to control turning of a flow of air propelled across the upper surface of the wing by the array of propulsors, the flow turning control system comprising:

an end wall defining a terminal end of the array of propulsors;

a first movable flap attached to the array of propulsors aftward of the exhaust area and above the wing of the aircraft, wherein the first movable flap is configured to provide, by modifying a height of the exhaust area, a ratio, between a height of the end wall and the height of the exhaust area, that is at least 1.5 and up to 2.0; and a second movable flap attached to the wing of the aircraft aftward of the exhaust area, wherein the second movable flap is configured to provide a ratio, between a length of the second movable flap and the height of the exhaust area, that is between 2 and 10;

wherein the flow turning control system enables selective flow turning of the flow of air over a trailing edge of the second movable flap of at least 90 degrees and up to 180 degrees.

Statement 18. The air-moving apparatus of Statement 17, wherein the flow turning control system further enables the selective flow turning with a ratio between actual thrust and ideal thrust efficiency of at least 70 percent and up to 90 percent.

Statement 19. The air-moving apparatus of Statement 17 or 18, wherein the height of the end wall comprises a first height at a first position of the end wall aligned with the exhaust area and a second height, different than the first height, at a second position of the end wall that is aftward of the first position.

Statement 20. The air-moving apparatus of any of Statements 17 to 19, wherein the end wall comprises:

a boom positioned at an edge of the wing; or a portion of a fuselage of the aircraft.

Statement 21. The air-moving apparatus of any of Statements 17 to 20, further configured to adjust the flow turning of the flow of air at least by actuating, based on at least one control signal, one or more of the first movable flap or the second movable flap.

Statement 22. The air-moving apparatus of any of Statements 17 to 21, wherein the first movable flap is further configured to provide, by modifying the height of the exhaust area, a ratio between a flap radius of the second movable flap and the height of the exhaust area, that is at least 2 and up to 2.5.

Statement 23. The air-moving apparatus of any of Statements 17 to 22, wherein the flow turning control system further enables selective flow turning of the flow of air over the trailing edge of the second movable flap of at least 45 degrees and up to 60 degrees with a ratio between actual thrust and ideal thrust of at least 90 percent and up to 100 percent.

Statement 24. The air-moving apparatus of any of Statements 17 to 23, wherein the flow turning control system further enables selective flow turning of the flow of air over the trailing edge of the second movable flap of at least 60 degrees and up to 90 degrees with a ratio between actual thrust and ideal thrust of at least 80 percent and up to 100 percent.

Statement 25. A method of aircraft operation, comprising:

propelling, using an array of propulsors positioned on an upper surface of a wing of an aircraft, a flow of air aftward of an exhaust area defined by the array of propulsors and across an upper surface of the wing; and selectively operating a flow turning control system configured to control turning of the flow of air, wherein the flow turning control system comprises:

an end wall defining a terminal end of the array of propulsors;

a first movable flap attached to the array of propulsors aftward of the exhaust area and above the wing of the aircraft; and a second movable flap attached to the wing of the aircraft aftward of the exhaust area and configured to provide a ratio, between a length of a second movable flap and a height of the exhaust area, that is between 2 and 10;

wherein selectively operating the flow turning control system comprises adjusting flow turning of the flow of air between at least 90 degrees and up to 180 degrees at least by:

modifying a position of the first movable flap such that a ratio, between the height of the exhaust area and a height of the end wall, is at least 1.5 and up to 2.0; and modifying a position of the second movable flap such that the flow of air is turned over a trailing edge of the second movable flap.

Statement 26. The method of Statement 25, further comprising turning the flow of air over the trailing edge of the second movable flap between at least 90 degrees and up to 180 degrees with a ratio, between actual thrust and ideal thrust, of at least 70 percent and up to 90 percent.

Statement 27. The method of Statement 25 or 26, wherein the end wall comprises a second height, exceeding a first height of the end wall, at a position away from the exhaust area and towards the second movable flap.

Statement 28. The method of any of Statements 25 to 27, wherein selectively operating the flow turning control system comprises transitioning between a forward flight mode and a hover flight mode.

Statement 29. The method of Statements 25 to 28, wherein selectively operating the flow turning control system further comprises adjusting flow turning of the flow of air between at least 45 degrees and up to 60 degrees with a ratio, between actual thrust and ideal thrust, of at least 90 percent and up to 100 percent at least by:

modifying the position of the first movable flap such that the ratio, between the height of the exhaust area and the height of the end wall, is at least 0.5 and up to 2.0.

Statement 30. The method of any of Statements 25 to 29, wherein selectively operating the flow turning control system further comprises adjusting flow turning of the flow of air between at least 60 degrees and up to 90 degrees with a ratio, between actual thrust and ideal thrust, of at least 80 percent and up to 100 percent at least by:

modifying the position of the first movable flap such that the ratio, between the height of the exhaust area and the height of the end wall, is at least 0.5 and up to 2.0.

Statement 31. A flow turning control system for an aircraft comprising an array of propulsors positioned on an upper surface of a wing of the aircraft and at a leading edge of the wing, the flow turning control system comprising:

an end wall configured to define a terminal end of the array of propulsors;

a first movable flap configured to attach to the array of propulsors aftward of an exhaust area defined by the array of propulsors and above the wing of the aircraft and configured to provide a ratio, between a height of the end wall and a height of the exhaust area, that is at least 1.5 and up to 2.0; and a second movable flap configured to attach to the wing of the aircraft aftward of the exhaust area and configured to provide a ratio, between a length of the second movable flap and the height of the exhaust area, that is between 2 and 10;

wherein the flow turning control system enables selective flow turning of a flow of air, propelled across the upper surface of the wing by the array of propulsors, over a trailing edge of the second movable flap of at least 90 degrees and up to 180 degrees.

Statement 32. The flow turning control system of Statement 31, further comprising a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

Statement 33. The flow turning control system of Statement 31 or 32, wherein the first movable flap is further configured to provide a ratio, between a flap radius of the second movable flap and the height of the exhaust area, of at least 2 and up to 2.5.

Statement 34. The flow turning control system of any of Statements 31 to 33, further comprising an opposite end wall configured to define an opposite terminal end of the array or propulsors.

Statement 35. The flow turning control system of any of Statements 31 to 34, wherein a height of the end wall increases along a length of the end wall in a direction aftward of the exhaust area.

Statement 36. The flow turning control system of any of Statements 31 to 35, wherein the end wall comprises a boom.

Statement 37. The flow turning control system of any of Statements 31 to 36, wherein the end wall comprises a portion of a fuselage of the aircraft.

Statement 38. The flow turning control system of any of Statements 31 to 37, wherein the flow turning control system further enables selective flow turning of the flow of air over the trailing edge of the second movable flap of at least 45 degrees and up to 60 degrees with a ratio between actual thrust and ideal thrust of at least 90 percent and up to 100 percent.

Statement 39. The flow turning control system of any of Statements 31 to 38, wherein the flow turning control system further enables selective flow turning of the flow of air over the trailing edge of the second movable flap of at least 60 degrees and up to 90 degrees with a ratio between actual thrust and ideal thrust of at least 80 percent and up to 100 percent.

Statement 40. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors, wherein the end wall has an end wall height providing a ratio, between the end wall height and a reference height of the exhaust area, that is at least 1.5 and up to 2.0;

a first movable flap attached to the array of propulsors aftward of the exhaust area and above the wing of the aircraft, wherein the reference height is measured between a trailing edge of the first movable flap in an undeflected position and the upper surface of the wing;

wherein the first movable flap is configured to modify an instantaneous exhaust height of the exhaust area that is based on a position, of the first movable flap, between a first maximum position of the first movable flap and a second maximum position, opposite the first maximum position, of the first movable flap; and a second movable flap attached to the wing of the aircraft aftward of the exhaust area, wherein the second movable flap has a length providing a ratio, between the length of the second movable flap and the reference height, that is between 2 and 10;

wherein the flow turning control system enables selective flow turning of the flow of air over a trailing edge of the second movable flap of:

at least 90 degrees and up to 180 degrees with a ratio between actual thrust and ideal thrust of at least 70 percent and up to 90 percent;

at least 60 degrees and up to 90 degrees with a ratio between actual thrust and ideal thrust of at least 80 percent and up to 100 percent; and at least 45 degrees and up to 60 degrees with a ratio between actual thrust and ideal thrust of at least 90 percent and up to 100 percent; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

Statement 41. The aircraft of Statement 40, wherein the exhaust area comprises a contracting exhaust area.

Statement 42. The aircraft of Statement 40 or 41, wherein end wall height comprises a first height at a first position of the end wall and a second height, different than the first height, at a second position of the end wall that is aftward of the first position.

Statement 43. The aircraft of any of Statements 40 to 42, wherein the end wall comprises one or more of:

a boom positioned at an edge of the wing; or a portion of a fuselage of the aircraft.

Statement 44. The aircraft of any of Statements 40 to 43, wherein the first movable flap is configured to extend, away from the exhaust area, a maximum distance that is less than a distance between the exhaust area and an articulatable edge of the second movable flap.

Statement 45. The aircraft of any of Statements 40 to 44, wherein the second movable flap has a flap radius providing a ratio, between the flap radius of the second movable flap and the reference height, that is at least 2.0 and up to 2.5.

Statement 46. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors, wherein the end wall has an end wall height providing a ratio, between the end wall height and a reference height of the exhaust area, that is at least 0.5 and up to 1.0;

a first movable flap attached to the array of propulsors aftward of the exhaust area and above the wing of the aircraft, wherein the reference height is measured between a trailing edge of the first movable flap in an undeflected position and the upper surface of the wing; and a second movable flap attached to the wing of the aircraft aftward of the exhaust area, wherein the second movable flap has a length providing a ratio, between the length of the second movable flap and the reference height, that is between 2 and 10;

wherein the flow turning control system enables selective flow turning of the flow of air over a trailing edge of the second movable flap of:

at least 90 degrees and up to 180 degrees with a ratio between actual thrust and ideal thrust of at least 70 percent and up to 90 percent;

at least 60 degrees and up to 90 degrees with a ratio between actual thrust and ideal thrust of at least 80 percent and up to 100 percent; and at least 45 degrees and up to 60 degrees with a ratio between actual thrust and ideal thrust of at least 90 percent and up to 100 percent; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

Statement 47. The aircraft of Statement 46, wherein the exhaust area comprises a contracting exhaust area.

Statement 48. The aircraft of Statement 46 or 47, wherein the end wall height comprises a first height at a first position of the end wall and a second height, different than the first height, at a second position of the end wall that is aftward of the first position.

Statement 49. The aircraft of any of Statements 46 to 48, wherein the end wall comprises one or more of:

a boom positioned at an edge of the wing; or a portion of a fuselage of the aircraft.

Statement 50. The aircraft of any of Statements 46 to 49, wherein the first movable flap is configured to extend, away from the exhaust area, a maximum distance that is less than a distance between the exhaust area and an articulatable edge of the second movable flap.

Statement 51. The aircraft of any of Statements 46 to 50, wherein the second movable flap has a flap radius providing a ratio, between the flap radius of the second movable flap and the reference height, that is at least 1 and up to 2.

Statement 52. The aircraft of any of Statements 46 to 51, wherein the first movable flap is configured to provide, by moving between a first position and a second position:

a ratio, between the end wall height and an instantaneous height of the exhaust area, between 0.5 and 1.0;

a ratio, between a flap radius of the second movable flap and the instantaneous height of the exhaust area, that is at least 1 and up to 2; and a ratio, between the length of the second movable flap and the instantaneous height of the exhaust area, that is between 2 and 10.

The invention claimed is:

1. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors;

a first movable flap attached to the array of propulsors aftward of the exhaust area and above the wing of the aircraft, wherein the first movable flap is configured to provide a ratio, between a height of the end wall and a height of the exhaust area, that is at least 1.5 and up to 2.0; and a second movable flap attached to the wing of the aircraft aftward of the exhaust area, wherein the second movable flap is configured to provide a ratio, between a length of the second movable flap and the height of the exhaust area, that is between 2 and 10;

wherein the flow turning control system enables selective flow turning of the flow of air over a trailing edge of the second movable flap of at least 90 degrees and up to 180 degrees; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

2. The aircraft of claim 1, wherein the flow turning control system further enables the selective flow turning with a ratio between actual thrust and ideal thrust of at least 70 percent and up to 90 percent.

3. The aircraft of claim 1, wherein the exhaust area comprises a contracting exhaust area.

4. The aircraft of claim 1, wherein the height of the end wall comprises a first height at a first position of the end wall and a second height, different than the first height, at a second position of the end wall that is aftward of the first position.

5. The aircraft of claim 1, wherein the flow turning control system further comprises a first radius of curvature of the second movable flap at an articulatable edge of the second movable flap and a second radius of curvature of the second movable flap, different than the first radius of curvature, at a trailing edge of the second movable flap.

6. The aircraft of claim 1, wherein the end wall comprises:

a boom positioned at an edge of the wing; or a portion of a fuselage of the aircraft.

7. The aircraft of claim 1, wherein the end wall extends from an articulatable edge of the first movable flap to the trailing edge of the second movable flap.

8. The aircraft of claim 1, wherein the end wall extends in a direction aftward of the exhaust area across an upper surface of the wing and across an upper surface of the second movable flap.

9. The aircraft of claim 1, wherein the first movable flap is configured to extend, away from the exhaust area, a maximum distance that is less than a distance between the exhaust area and an articulatable edge of the second movable flap.

10. The aircraft of claim 1, wherein the flow turning control system further enables at least one of:

selective flow turning of the flow of air over the trailing edge of the second movable flap of at least 45 degrees and up to 60 degrees with a ratio between actual thrust and ideal thrust of at least 90 percent and up to 100 percent; or selective flow turning of the flow of air over the trailing edge of the second movable flap of at least 60 degrees and up to 90 degrees with a ratio between actual thrust and ideal thrust of at least 80 percent and up to 100 percent.

11. The aircraft of claim 1, wherein the height of the exhaust area is an instantaneous exhaust height that is based on a position, of the first movable flap, between a first maximum position of the first movable flap and a second maximum position, opposite the first maximum position, of the first movable flap.

12. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors, wherein the end wall has an end wall height providing a ratio, between the end wall height and a reference height of the exhaust area, that is at least 1.5 and up to 2.0;

a first movable flap attached to the array of propulsors aftward of the exhaust area and above the wing of the aircraft, wherein the reference height is measured between a trailing edge of the first movable flap in an undeflected position and the upper surface of the wing;

wherein the first movable flap is configured to modify an instantaneous exhaust height of the exhaust area that is based on a position, of the first movable flap, between a first maximum position of the first movable flap and a second maximum position, opposite the first maximum position, of the first movable flap; and a second movable flap attached to the wing of the aircraft aftward of the exhaust area, wherein the second movable flap has a length providing a ratio, between the length of the second movable flap and the reference height, that is between 2 and 10;

wherein the flow turning control system enables selective flow turning of the flow of air over a trailing edge of the second movable flap of:

at least 90 degrees and up to 180 degrees with a ratio between actual thrust and ideal thrust of at least 70 percent and up to 90 percent;

at least 60 degrees and up to 90 degrees with a ratio between actual thrust and ideal thrust of at least 80 percent and up to 100 percent; and at least 45 degrees and up to 60 degrees with a ratio between actual thrust and ideal thrust of at least 90 percent and up to 100 percent; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

13. The aircraft of claim 12, wherein the exhaust area comprises a contracting exhaust area.

14. The aircraft of claim 12, wherein end wall height comprises a first height at a first position of the end wall and a second height, different than the first height, at a second position of the end wall that is aftward of the first position.

15. The aircraft of claim 12, wherein the first movable flap is configured to extend, away from the exhaust area, a maximum distance that is less than a distance between the exhaust area and an articulatable edge of the second movable flap.

16. An aircraft comprising:

an array of propulsors defining an exhaust area, wherein the array of propulsors is positioned on an upper surface of a wing of the aircraft and at a leading edge of the wing;

a flow turning control system configured to control turning of a flow of air propelled across the upper surface of the wing by the array of propulsors, the flow turning control system comprising:

an end wall defining a terminal end of the array of propulsors, wherein the end wall has an end wall height providing a ratio, between the end wall height and a reference height of the exhaust area, that is at least 0.5 and up to 1.0;

a first movable flap attached to the array of propulsors aftward of the exhaust area and above the wing of the aircraft, wherein the reference height is measured between a trailing edge of the first movable flap in an undeflected position and the upper surface of the wing; and a second movable flap attached to the wing of the aircraft aftward of the exhaust area, wherein the second movable flap has a length providing a ratio, between the length of the second movable flap and the reference height, that is between 2 and 10;

wherein the flow turning control system enables selective flow turning of the flow of air over a trailing edge of the second movable flap of:

at least 90 degrees and up to 180 degrees with a ratio between actual thrust and ideal thrust of at least 70 percent and up to 90 percent;

at least 60 degrees and up to 90 degrees with a ratio between actual thrust and ideal thrust of at least 80 percent and up to 100 percent; and at least 45 degrees and up to 60 degrees with a ratio between actual thrust and ideal thrust of at least 90 percent and up to 100 percent; and a non-transitory computer-readable medium comprising computer-executable instructions that, when executed by one or more processors, cause the one or more processors to:

receive an input signal indicating an adjustment to the flow turning of the flow of air; and cause adjustment to the flow turning of the flow of air at least by actuating, based on the input signal, one or more of the first movable flap or the second movable flap.

17. The aircraft of claim 16, wherein the exhaust area comprises a contracting exhaust area.

18. The aircraft of claim 16, wherein the end wall height comprises a first height at a first position of the end wall and a second height, different than the first height, at a second position of the end wall that is aftward of the first position.

19. The aircraft of claim 16, wherein the first movable flap is configured to extend, away from the exhaust area, a maximum distance that is less than a distance between the exhaust area and an articulatable edge of the second movable flap.

20. The aircraft of claim 16, wherein the first movable flap is configured to provide, by moving between a first position and a second position:

a ratio, between the end wall height and an instantaneous height of the exhaust area, between 0.5 and 1.0;

a ratio, between a flap radius of the second movable flap and the instantaneous height of the exhaust area, that is at least 1 and up to 2; and a ratio, between the length of the second movable flap and the instantaneous height of the exhaust area, that is between 2 and 10.

\*    \*    \*    \*    \*